United States Patent
Greenstein et al.

(10) Patent No.: US 11,805,232 B1
(45) Date of Patent: Oct. 31, 2023

(54) OPTICAL SYSTEMS WITH COMPACT IMAGE PROJECTOR

(71) Applicant: Lumus Ltd., Ness Ziona (IL)

(72) Inventors: Kobi Greenstein, Ness Ziona (IL); Tsion Eisenfeld, Ashkelon (IL); Netanel Goldstein, Ness Ziona (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 18/211,308

(22) Filed: Jun. 19, 2023

Related U.S. Application Data

(63) Continuation of application No. 18/074,571, filed on Dec. 5, 2022, now Pat. No. 11,729,359, which is a continuation of application No. 17/636,100, filed as application No. PCT/IL2020/051259 on Dec. 6, 2020, now Pat. No. 11,523,092.

(60) Provisional application No. 62/945,165, filed on Dec. 8, 2019.

(51) Int. Cl.
| | |
|---|---|
| *H04N 9/31* | (2006.01) |
| *G02B 7/02* | (2021.01) |
| *G02B 27/01* | (2006.01) |
| *G02B 27/09* | (2006.01) |

(52) U.S. Cl.
CPC .......... *H04N 9/3152* (2013.01); *G02B 7/021* (2013.01); *G02B 27/0176* (2013.01); *G02B 27/0955* (2013.01); *G02B 27/0172* (2013.01); *G02B 2027/0116* (2013.01)

(58) Field of Classification Search
CPC .. H04N 9/3152; G02B 7/021; G02B 27/0176; G02B 27/0955; G02B 27/0172; G02B 2027/0116

USPC ................ 359/811, 819, 829, 830
See application file for complete search history.

(56) References Cited

U.S. PATENT DOCUMENTS

| | | | |
|---|---|---|---|
| 7,872,217 B2 | 1/2011 | Kasahara | |
| 11,656,435 B2 * | 5/2023 | Watanabe | G02B 7/026 359/819 |
| 2007/0211339 A1 | 9/2007 | Furusato | |
| 2010/0110368 A1 | 5/2010 | Chaum | |
| 2017/0132757 A1 | 5/2017 | Thiebaud et al. | |
| 2018/0052277 A1 | 2/2018 | Schowengerdt et al. | |

FOREIGN PATENT DOCUMENTS

| | | |
|---|---|---|
| JP | 2009042838 | 2/2009 |

\* cited by examiner

*Primary Examiner* — Collin X Beatty
(74) *Attorney, Agent, or Firm* — Mark M. Friedman

(57) ABSTRACT

An optical system has a hollow mechanical body having first and second ends. An optical assembly has a plurality of optical components arranged in a stack configuration. Each of the optical components has a set of engagement configurations. For each pair of adjacent optical components in the stack configuration, at least some of the engagement configurations of a first optical component in the pair engage with at least some of the engagement configurations of a second optical component in the pair. Some of the engagement configurations of the optical component at a first end of the stack configuration engage with corresponding engagement configurations of the hollow mechanical body at the first end of the hollow mechanical body to position the other optical components of the stack configuration within the hollow mechanical body. An emissive display device is deployed at the second end of the hollow mechanical body.

11 Claims, 27 Drawing Sheets

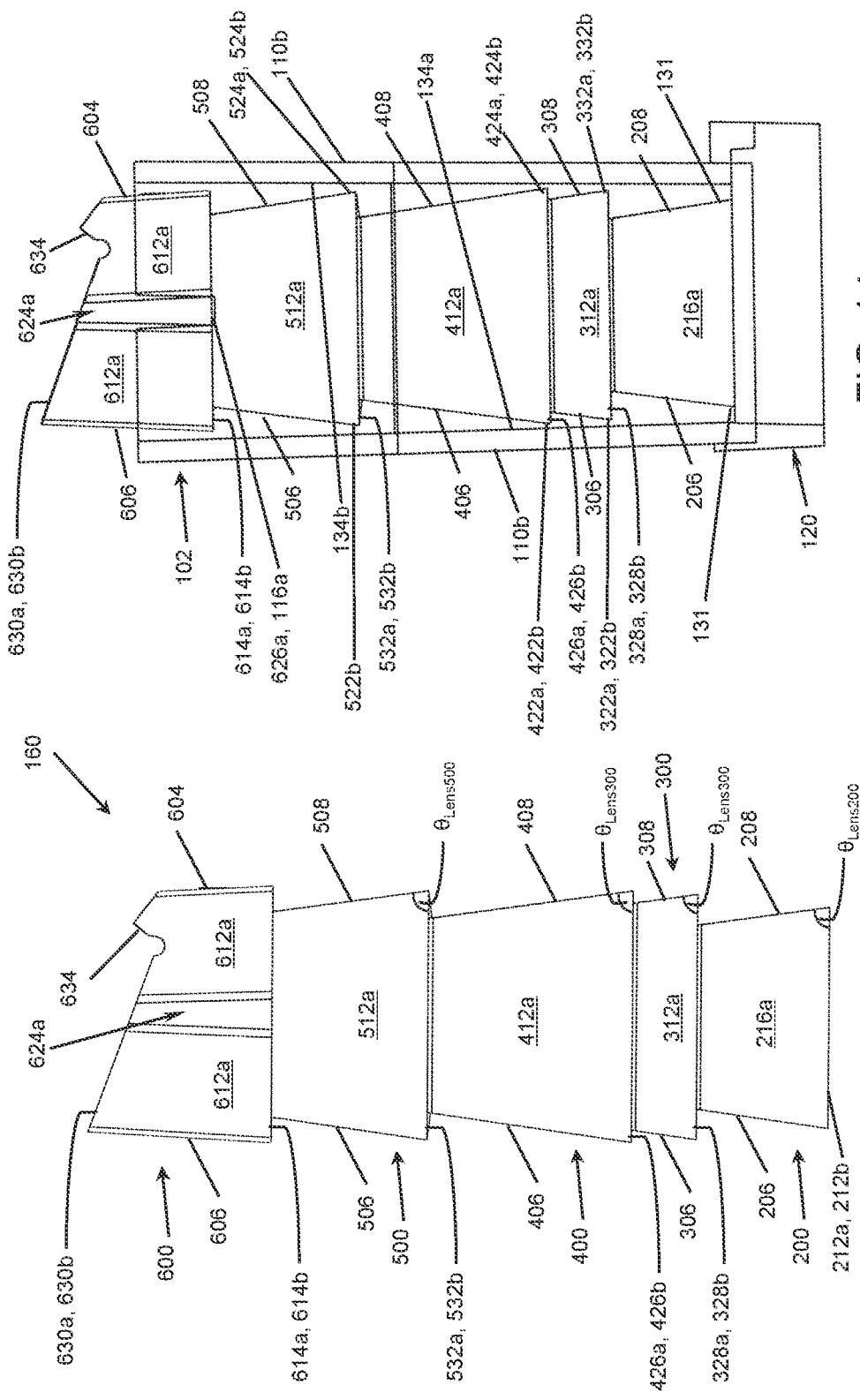

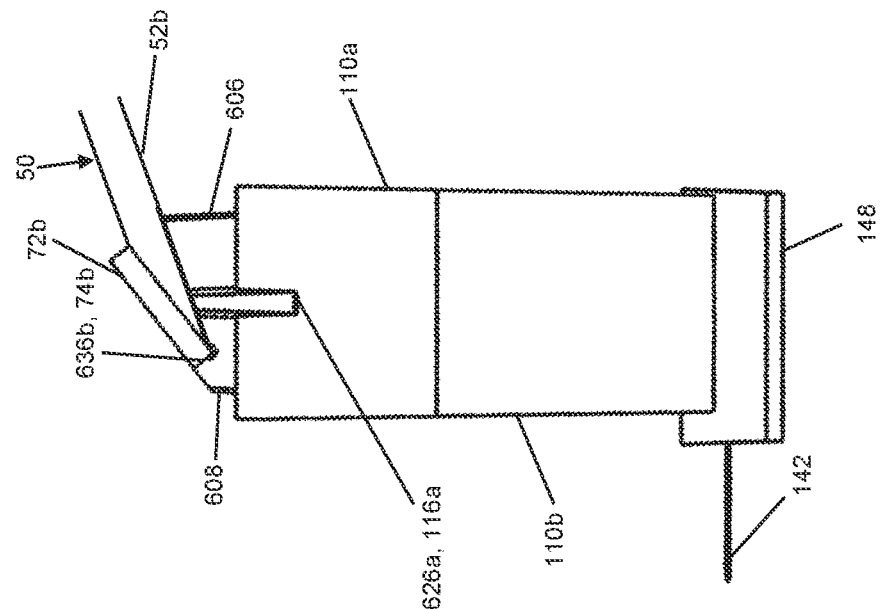
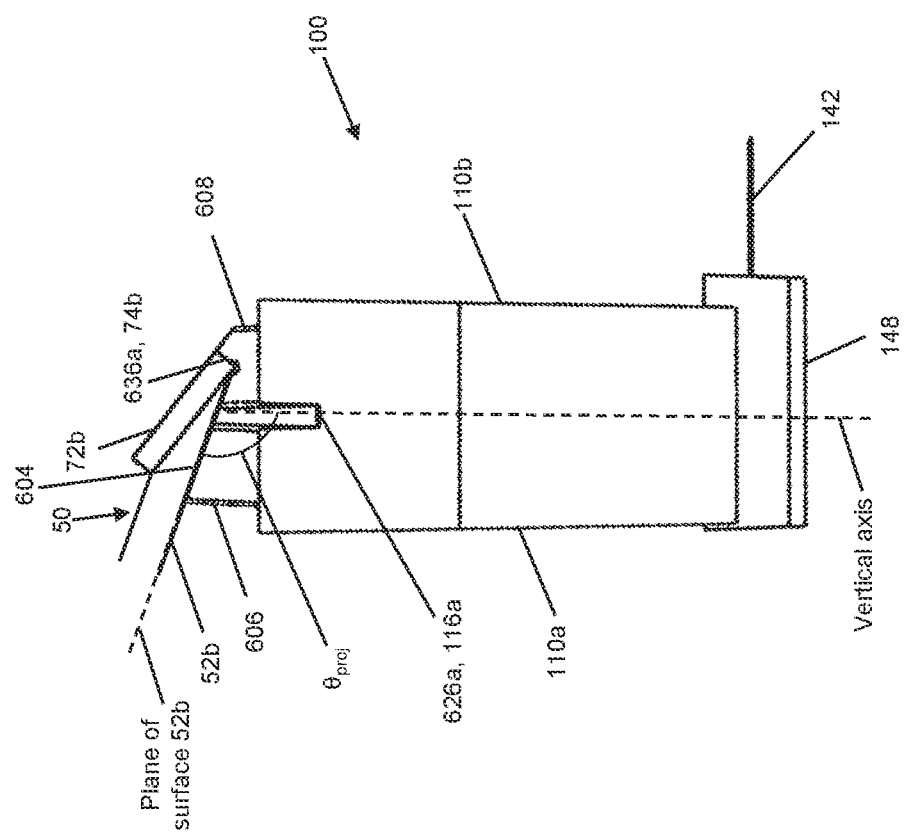

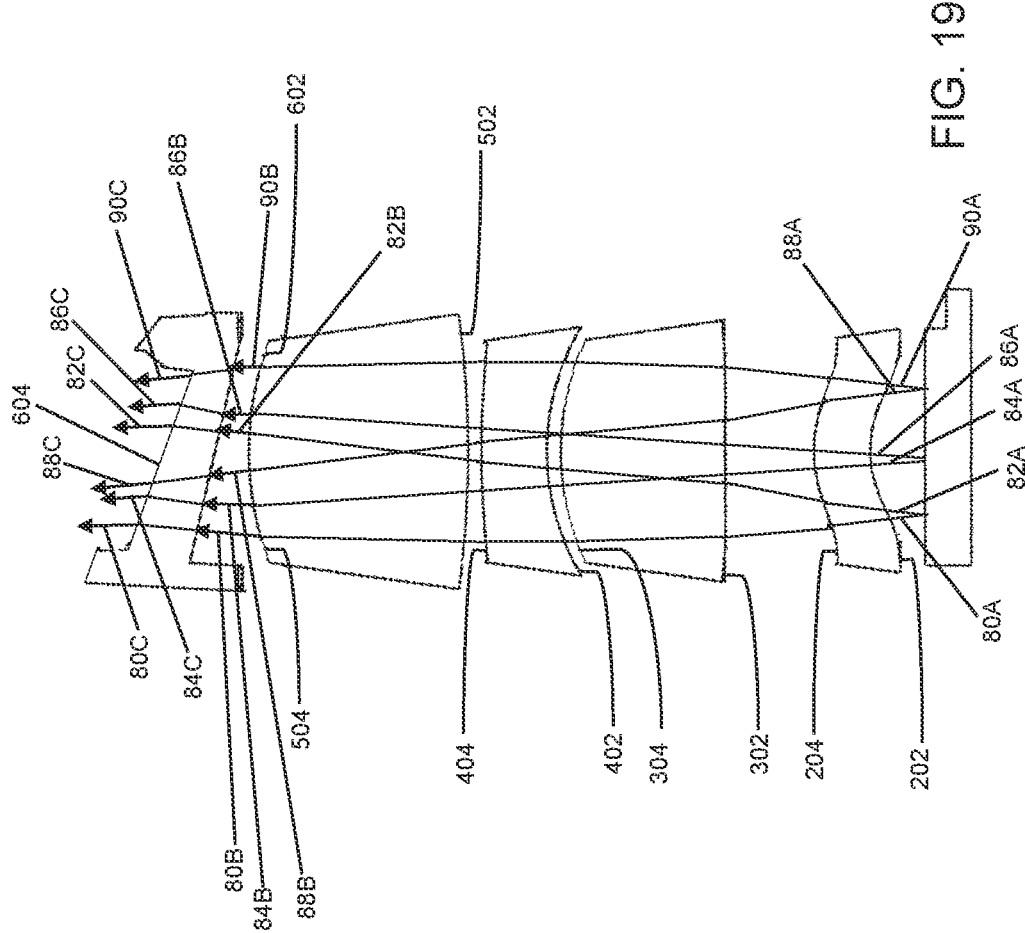

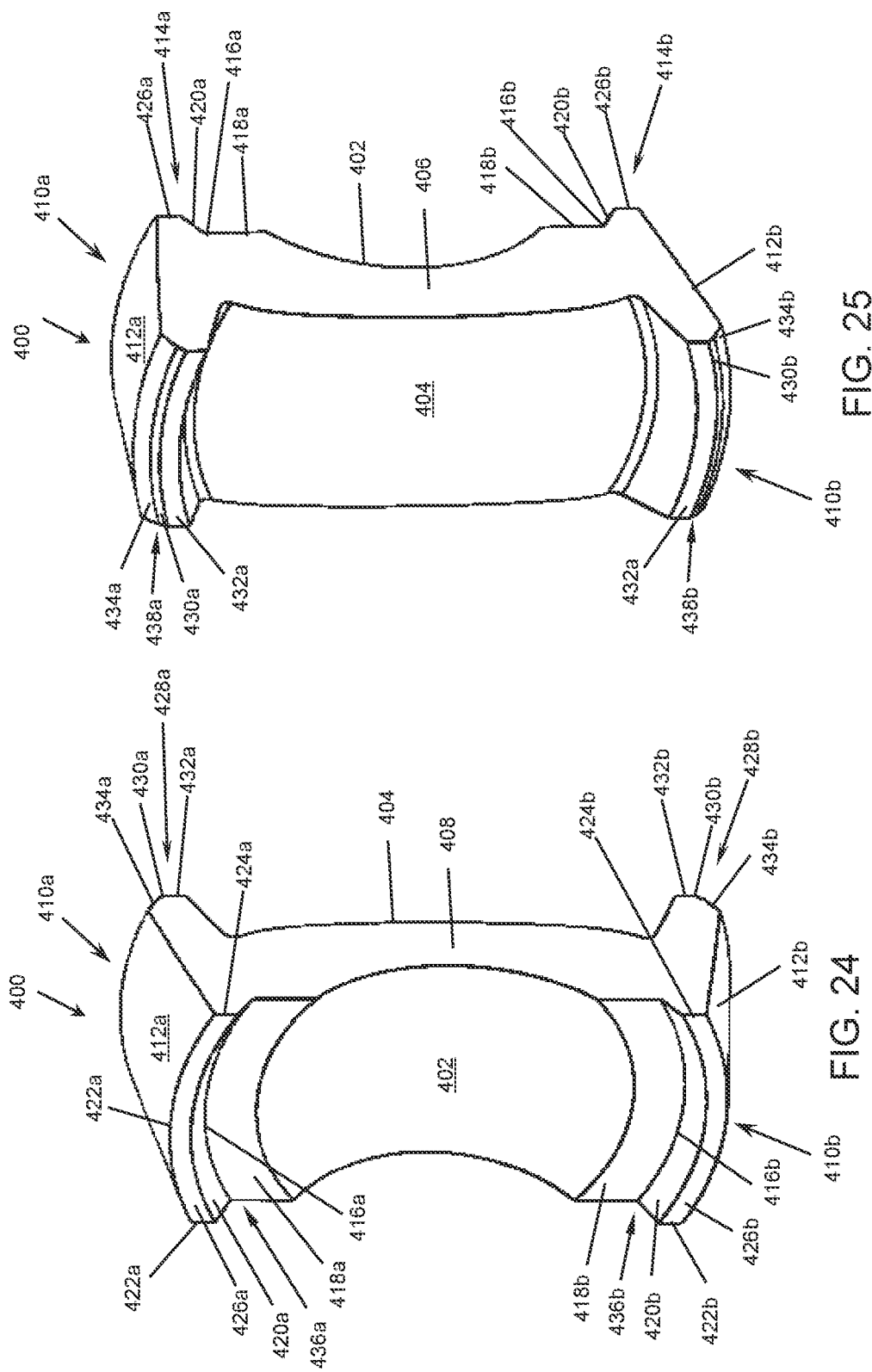

OPTICAL SYSTEMS WITH COMPACT IMAGE PROJECTOR

CROSS-REFERENCE TO RELATED APPLICATIONS

This application claims priority from U.S. Provisional Patent Application No. 62/945,165 filed Dec. 8, 2019, whose disclosure is incorporated by reference in its entirety herein.

TECHNICAL FIELD

The present invention relates to optical system and devices having image projectors and aperture expanding optical waveguides.

BACKGROUND OF THE INVENTION

Optical arrangements for near eye display (NED), head mounted display (HMD) and head up display (HUD) require large aperture to cover the area where the observer's eye is located (commonly referred to as the eye motion box—or EMB). In order to implement a compact device, the image that is to be projected into the observer's eye is generated by a small optical image generator (projector) having a small aperture that is multiplied to generate a large aperture.

An approach to aperture multiplication in one dimension has been developed based on a parallel-faced slab of transparent material within which the image propagates by internal reflection. Part of the image wavefront is coupled out of the slab, either by use of obliquely angled partial reflectors or by use of a diffractive optical element on one surface of the slab. Such a slab is referred herein as a light-guide optical element (LOE), light-guide substrate, light-transmitting substrate, or waveguide. The principles of such aperture multiplication are illustrated schematically in FIG. 1, which shows a light-guide optical element 10 having a pair of parallel major external surfaces (faces) 12a, 12b for guiding light by internal reflection (preferably total internal reflection). An image projector 11 (represented schematically as a rectangle) generates a projected image 14, as represented here schematically by a beam of illumination 14 including sample rays 14a and 14b which span the beam. The projected image 14 is coupled into the light-guide optical element 10 by an optical coupling-in configuration 16, as illustrated here schematically by a prism 16 (referred to interchangeably as a "wedge"), so as to generate reflected rays 18 which are trapped by internal reflection within the substrate, generating also rays 20. Here, the wedge 16 includes three major surfaces 17a, 17b and 17c, where the surface 17c is located next to (or is common with) a slant edge 15 of the LOE 10 (where the edge 15 is at an oblique angle $\alpha_{edge}$ to the faces 12a, 12b). The image 14 enters the wedge 16 through the surface 17a, and is then coupled into the LOE 10 via the surfaces 17c and 15.

The coupled-in image propagates along the substrate 10 by repeated internal reflection from the faces 12a, 12b, impinging on an optical coupling-out configuration 22, as illustrated here schematically by a sequence of partially reflecting surfaces 22 at an oblique angle ($\alpha_{sur}$) to the parallel faces 12a, 12b, where part of the image intensity is reflected so as to be coupled out of the substrate as rays 24a and 24b toward the pupil 25 of eye 26 of an observer that is located in the EMB 28 at a an eye relief (ER) distance 30 from the surface 12b. In order to minimize unwanted reflections which might give rise to ghost images, the partially reflecting surfaces 22 are preferably coated so as to have low reflectance for a first range of incident angles, while having the desired partial reflectivity for a second range of incident angles, where a ray with a small inclination to the normal to a partially reflective surface 22 (represented here as angle fire) is split in order to generate a reflected ray for coupling out, while a high inclination (to the normal) ray is transmitted with negligible reflection.

The projected image 14 is a collimated image, i.e., where each pixel is represented by a beam of parallel rays at a corresponding angle, equivalent to light from a scene far from the observer (the collimated image is referred to as being "collimated to infinity"). The image is represented here simplistically by rays corresponding to a single point in the image, typically a centroid of the image, but in fact includes a range of angles to each side of this central beam, which are coupled in to the substrate with a corresponding range of angles, and similarly coupled out at corresponding angles, thereby creating a field of view corresponding to parts of the image arriving in different directions to the eye 26 of the observer.

Several previously contemplated optical architectures employ image projectors that utilize microdisplays implemented as reflective-display devices or transmissive-display devices that emit polarized light in response to polarized illumination (such as liquid crystal on silicon—LCoS, and liquid crystal displays—LCD) in combination with a wedge coupling-in configuration. These optical architectures enable filling of the LOE with light waves from the image projector covering a large field of view (FOV), as the angle between the image projector and the LOE is generally determined by the wedge and can be designed to enable filling of the LOE (in FIG. 1 this angle is the angle between the surface 12a, 12b and the normal to the surface 17a). However, image projectors that employ reflective-display devices (e.g., LCoS) or transmissive-display devices (e.g., LCD) require illumination components for illuminating the display device with polarized illumination in order to generate the polarized image light waves, and optical components for directing the polarized illumination to the display device and for outputting the polarized image illumination (and in certain cases depolarizing the polarized image illumination) for injection into the LOE. The illumination components include, for example, one or more LEDs, laser-diodes, beam combiners, optical fibers, and the like. The optical components include, for example, one or more polarization selective beamsplitters, polarizers, collimating optics coupled to polarization selective beamsplitters. These illumination components and optical components typically have a relatively high manufacturing cost, and also result in a heavier and bulkier image projector and overall optical system, which may be undesirable in situations in which the optical system is deployed as part of a near eye display (NED) device or head mounted display (HMD) device, in particular when the optical system is implemented in an eye-glasses form factor. In addition, use of wedge-type optical coupling-in configurations together with image projectors that utilize emissive-display devices may introduce ghost images and/or chromatic aberrations, thereby reducing the quality of the image that is coupled out of the LOE.

SUMMARY OF THE INVENTION

The present invention is an optical system having a light-guide optical element and a compact image projector, and a method for constructing the compact image projector. Certain preferred embodiments according to one aspect of the present invention provide a compact and lightweight image projector by utilizing an emissive-display device together with optical components arranged in a stack within a hollow mechanical body (i.e., a housing). The optical components are preferably manufactured in plastic, glass or polymer material by utilizing specially designed molds and using, for example, casting, injection molding techniques, or any other relevant molding process. The molds used to manufacture the optical components define engagement configurations of the optical components which promote a mechanical interlocking engagement between adjacent optical components of the stack. Other embodiments according to another aspect of the present invention provide optical coupling-in configurations that reduce the ghost images in the image that is output by the optical system. In yet another aspect of the present invention, ghost images that may arise from components of image projector are reduced by modifying the sidewalls of the optical components (and/or the mechanical body that houses/retains the optical components) of the image projector. Further embodiments according to yet another aspect of the present invention provide an image projector that includes an optical component that compensates for effects of chromatic aberration introduced by the light-guide optical element and/or the optical coupling-in configuration.

According to the teachings of an embodiment of the present invention, there is provided an optical system. The optical system comprises: a hollow mechanical body including first and second ends; an optical assembly including a plurality of optical components arranged in a stack configuration, each of the optical components including a set of engagement configurations, and for each pair of adjacent optical components in the stack configuration at least some of the engagement configurations of a first optical component in the pair are configured to engage with at least some of the engagement configurations of a second optical component in the pair, and some of the engagement configurations of the optical component at a first end of the stack configuration are configured to engage with corresponding engagement configurations of the hollow mechanical body at the first end of the hollow mechanical body so as to position the other optical components of the stack configuration within the hollow mechanical body; and an emissive display device deployed at the second end of the hollow mechanical body.

Optionally, the engagement configurations of the optical component at the first end of the stack configuration includes at least a pair of outwardly projecting flanges, and the engagement configurations at the first end of the hollow mechanical body includes a pair of channels configured to receive the projecting flanges.

Optionally, the hollow mechanical body further includes an inner sidewall configuration, and at least one of the optical components includes at least one rotation limiting configuration, and the rotation limiting configuration and the inner sidewall configuration cooperate to limit an amount of rotation of the optical assembly about one or more rotational axes.

Optionally, the second end of the hollow mechanical body includes: a receiving portion for receiving the emissive display device, and an outwardly projecting sidewall configuration.

Optionally, the optical system further comprises: a cover member deployed at the outwardly projecting sidewall configuration of the second end of the hollow mechanical body.

Optionally, the hollow mechanical body is tapered from the first end to the second end.

Optionally, the one of the optical components has a substantially wedge-shaped cross-section.

Optionally, the plurality of optical components includes a set of lenses.

Optionally, the set of lenses includes exactly four lenses.

Optionally, the set of lenses includes fewer than four lenses.

Optionally, the set of lenses includes more than four lenses.

Optionally, the emissive display device includes an organic light emitting diode display.

Optionally, the emissive display device includes micro light emitting diode display.

Optionally, the optical component at the first end of the stack configuration is adhesively attached to the first end of the hollow mechanical body.

Optionally, the engagement configuration of the optical component at the first end of the stack configuration maintains the other optical components within the hollow mechanical body without the use of adhesive applied to any of the other optical components.

Optionally, the other optical components are coaxially positioned within the hollow mechanical body.

Optionally, at least one of the optical components of the optical assembly is constructed from a plastic material.

Optionally, all of the optical components of the optical assembly are constructed from a plastic material.

Optionally, the hollow mechanical body is constructed from a plastic material.

Optionally, the emissive display device is configured to generate light corresponding to an image, and the optical assembly is configured to receive light from the emissive display device and output image light for coupling into a light-transmitting substrate.

Optionally, the optical system further comprises: a light-guide substrate having at least two major surfaces parallel to each other and a light-wave input aperture optically coupled to the first of the optical components via an optical coupling-in configuration.

Optionally, the first of the optical components has a prism-shaped cross-section and is configured to modify image light from the emissive display device prior to the image light reaching the optical coupling-in configuration so as to at least partially compensate for chromatic aberration.

Optionally, the hollow mechanical body further includes an inner sidewall configuration that is configured to reduce reflections of light transmitted by the optical components from interior portions of the hollow mechanical body.

There is also provided according to an embodiment of the teachings of the present invention an optical system. The optical system comprises: a hollow mechanical body including first and second ends; an optical assembly including a base optical element and a plurality of lens optical elements arranged in a stack configuration with the base optical element at a first end of the stack configuration and the lens optical elements deployed within the hollow mechanical body, each of the optical elements of the optical assembly including a set of engagement configurations, and for each pair of adjacent optical elements in the stack configuration at least some of the engagement configurations of a first optical element in the pair are configured to engage with at least some of the engagement configurations of a second optical element in the pair, and some of the engagement configurations of the base optical element are configured to engage with corresponding engagement configurations at the first end of the hollow mechanical body so as to position the lens optical elements within the hollow mechanical body; and an emissive display device deployed at the second end of the hollow mechanical body configured to generate light corresponding to an image for propagating through the optical assembly.

Optionally, the optical system further comprises: a light-guide substrate having at least two major surfaces parallel to each other and an optical coupling region, and the base optical element is optically coupled to the optical coupling region and to an optical coupling-in configuration configured for coupling image light from the optical assembly into the light-guide substrate.

Optionally, the base optical element has a prism-shaped cross-section and is configured to modify image light from the emissive display device prior to the image light reaching the optical coupling-in configuration so as to at least partially compensate for chromatic aberration.

There is also provided according to an embodiment of the teachings of the present invention a method for constructing an optical system. The method comprises: obtaining a hollow mechanical body that includes a first end and a second end, the first end having a set of engagement configurations; molding a plurality of optical components using a corresponding plurality of molds that define a shape of the optical components, each shape including a set of engagement configurations; deploying the optical components in a stack configuration with at least a portion of the stack configuration within the hollow mechanical body, and for each pair of adjacent optical components in the stack configuration at least some of the engagement configurations of a first optical component in the pair engage with at least some of the engagement configurations of a second optical component in the pair, and some of the engagement configurations of the optical component at a first end of the stack configuration engage with the engagement configurations at the first end of the hollow mechanical body so as to maintain the portion of the stack within the hollow mechanical body; and deploying an emissive display device at the second end of the hollow mechanical body.

Optionally, the molding includes casting or injecting a plastic material into the molds.

Optionally, obtaining the hollow mechanical body includes: obtaining a mold defining a shape the hollow mechanical body, and casting or injecting a material into the mold defining the shape the hollow mechanical body.

Optionally, the method further comprises: applying adhesive between the optical component at the first end of the stack configuration and at least one portion of the first end.

Optionally, the hollow mechanical body is tapered from the first end to the second end.

Optionally, the second end of the hollow mechanical body includes a receiving portion for receiving the emissive display device, and an outwardly projecting sidewall configuration, the method further comprising: deploying a cover member at the outwardly projecting sidewall configuration of the second end of the hollow mechanical body.

Optionally, the optical component at the first end of the stack configuration and the cover member cooperate to seal the hollow mechanical body so as to substantially prevent environmental debris from contacting the optical components deployed within the hollow mechanical body.

Optionally, the method further comprises: adhesively attaching a mounting adapter to the emissive display device; and adhesively attaching the mounting adapter to a portion of the second end of the hollow mechanical body.

Optionally, the method further comprises: aligning the emissive display device with the optical components prior to adhesive attachment of the mounting adapter to the portion of the second end of the hollow mechanical body.

Optionally, the molds have parting lines that produce sidewall geometries of the respective optical components that reduce reflections of light, transmitted by the optical components, from interior portions of the hollow mechanical body.

Optionally, the hollow mechanical body further includes an inner sidewall configuration that is configured to reduce reflections of light, transmitted by the optical components, from interior portions of the hollow mechanical body.

There is also provided according to an embodiment of the teachings of the present invention an optical system. The optical system comprises: an image projector for producing light-waves corresponding to an image, the image projector including: an emissive display device configured to generate light corresponding to the image, and an optical assembly configured to receive light from the emissive display device and output image light; a light-transmitting substrate having a plurality of surfaces including two parallel major external surfaces and an edge non-parallel to the major external surfaces, the light-transmitting substrate configured to guide light by internal reflection between the major external surfaces; and a plate including a first and a second major external surface and a pair of edges, the first major external surface of the plate overlying the edge of the light-transmitting substrate, the second major external surface of the plate including an optical coupling-in configuration associated with the image projector and configured to couple image light from the image projector into the light-transmitting substrate, and at least one of the edges of the plate including an absorber to substantially prevent light originating from the image projector from reflecting from the at least one of the edges of the plate.

Optionally, the second surface of the plate is a reflective surface that forms the optical coupling-in configuration.

Optionally, the reflective surface is formed by applying a reflective coating to the second surface of the plate.

Optionally, the reflective surface is formed by applying a dielectric coating to the second surface of the plate.

Optionally, the reflective surface is formed by applying a metallic coating to the second surface of the plate.

Optionally, the light that is substantially prevented from reflecting from the edges of the plate includes light that is reflected by the optical coupling-in configuration.

Optionally, the optical system further comprises: an optical coupling-out configuration associated with the light-transmitting substrate configured to couple out a proportion of the light guided between the major external surfaces of the light-transmitting substrate.

Optionally, the optical coupling-out configuration includes a plurality of partially reflective surfaces deployed within the light-transmitting substrate obliquely to the major external surfaces of the light-transmitting substrate.

Optionally, the optical coupling-out configuration includes a diffractive element associated with one of the major external surfaces of the light-transmitting substrate.

There is also provided according to an embodiment of the teachings of the present invention an optical system. The optical system comprises: an image projector for producing light-waves corresponding to an image, the image projector including: an emissive display device configured to generate light corresponding to the image, and an optical assembly configured to receive light from the emissive display device and output image light; a light-transmitting substrate having a plurality of surfaces including two parallel major external surfaces and an edge non-parallel to the major external surfaces, the light-transmitting substrate configured to guide light by internal reflection between the major external surfaces; and an optical coupling-in configuration associated with the image projector and configured to couple image light from the image projector into the light-transmitting substrate, the optical coupling-in configuration including: a reflective surface deployed at the edge of the light-transmitting substrate, and an angular selective reflective surface deployed within the light-transmitting substrate obliquely to the major external surfaces of the light-transmitting substrate, the angular selective reflective surface configured to: transmit light that is incident to the angular selective reflective surface at a first range of incident angles such that the transmitted light is guided by internal reflection between the major external surfaces of the light-transmitting substrate, and reflect light that is incident to the angular selective reflective surface at a second range of incident angles.

Optionally, the angular selective reflective surface is parallel to the reflective surface.

Optionally, the reflective surface is formed by applying a reflective coating to the edge of the light-transmitting substrate.

Optionally, the angular selective reflective surface is formed by applying a dielectric coating to a surface within the light-transmitting substrate.

Optionally, the optical system further comprises: an optical coupling-out configuration associated with the light-transmitting substrate configured to couple out a proportion of the light guided between the major external surfaces of the light-transmitting substrate.

Optionally, the optical coupling-out configuration includes a plurality of mutually parallel partially reflective surfaces deployed within the light-transmitting substrate obliquely to the major external surfaces of the light-transmitting substrate.

Optionally, the angular selective reflective surface is non-parallel to the partially reflective surfaces.

Optionally, the optical coupling-out configuration includes a diffractive element associated with one of the major external surfaces of the light-transmitting substrate.

There is also provided according to an embodiment of the teachings of the present invention an optical system. The optical system comprises: an image projector for producing light-waves corresponding to an image, the image projector including: an emissive display device configured to generate light corresponding to the image, and an optical assembly configured to receive light from the emissive display device and output image light, the optical assembly including a base optical element and a plurality of lens optical elements arranged in a stack configuration; a light-transmitting substrate having a plurality of surfaces including at least a pair of major external surfaces configured to guide light by internal reflection between the major external surfaces; and an optical coupling-in configuration associated with the base optical element and a coupling-in region of the light-transmitting substrate, and configured to couple image light from the image projector into the light-transmitting substrate, the base optical element has a prism-shaped cross-section and is configured to modify the image light prior to the image light reaching the optical coupling-in configuration so as to at least partially compensate for chromatic aberration.

Optionally, the plurality of surfaces of the light-transmitting substrate further includes an edge non-parallel to the major external surfaces, the optical system further comprising a plate including a first and a second major external surface and a pair of edges, the first major external surface of the plate overlying the edge of the light-transmitting substrate, the optical coupling-in configuration including a reflective surface deployed at the second major external surface of the plate, and at least one of the edges of the plate including an absorber to substantially prevent light, originating from the image projector, from reflecting from the at least one of the edges of the plate.

Optionally, the plurality of surfaces of the light-transmitting substrate further includes an edge non-parallel to the major external surfaces, and the optical coupling-in configuration includes: a reflective surface deployed at the edge of the light-transmitting substrate, and an angular selective reflective surface deployed within the light-transmitting substrate obliquely to the major external surfaces of the light-transmitting substrate, the angular selective reflective surface configured to: transmit light that is incident to the angular selective reflective surface at a first range of incident angles such that the transmitted light is guided by internal reflection between the major external surfaces of the light-transmitting substrate, and reflect light that is incident to the angular selective reflective surface at a second range of incident angles.

Optionally, the optical system further comprises: an optical coupling-out configuration associated with the light-transmitting substrate configured to couple out a proportion of the light guided between the major external surfaces of the light-transmitting substrate.

Optionally, the optical coupling-out configuration includes a plurality of partially reflective surfaces deployed within the light-transmitting substrate obliquely to the major external surfaces of the light-transmitting substrate.

Optionally, the optical coupling-out configuration includes a diffractive element associated with one of the major external surfaces of the light-transmitting substrate.

There is also provided according to an embodiment of the teachings of the present invention an optical system. The optical system comprises: an image projector for producing light-waves corresponding to an image, the image projector including: an emissive display device configured to generate light corresponding to the image, and an optical assembly configured to receive light from the emissive display device and output image light, the optical assembly including a plurality of optical components arranged in a stack configuration and having a mechanical interlocking engagement between each pair of adjacent optical components of the optical assembly; a light-transmitting substrate having a plurality of surfaces including two parallel major external surfaces and an edge non-parallel to the major external surfaces, the light-transmitting substrate configured to guide light by internal reflection between the major external surfaces; and an optical coupling-in configuration associated with the image projector and configured to couple image light from the image projector into the light-transmitting substrate.

Optionally, the optical system further comprises: an optical coupling-out configuration associated with the light-transmitting substrate configured to couple out a proportion of the light guided between the major external surfaces of the light-transmitting substrate.

Optionally, the optical coupling-out configuration includes a plurality of partially reflective surfaces deployed within the light-transmitting substrate obliquely to the major external surfaces of the light-transmitting substrate.

Optionally, the optical coupling-out configuration includes a diffractive element associated with one of the major external surfaces of the light-transmitting substrate.

The term "light-transmitting substrate" as used herein in the description and claims refers to any light-transmitting body, preferably light-transmitting solid bodies, formed from transparent material, which are referred to interchangeably herein as "light-guide optical elements", "light-guides" or "optical waveguide".

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 13 is a top view of the assembled optical assembly of the image projector;

FIG. 14 is a top view corresponding to FIG. 5, showing the assembled optical assembly deployed within the hollow mechanical body;

FIG. 17 is a top view of the image projector of FIGS. 3 and 4, optically coupled to a light-guide optical element and an optical coupling-in configuration implemented as a plate, according to an embodiment of the present invention;

FIG. 18 is a bottom view corresponding to FIG. 17;

FIG. 19 is a cross-sectional view of a microdisplay device that emits image light and the optical power applying portions of the optical components of the optical assembly, and schematically showing the traversal of light from the microdisplay device through the optical components of the optical assembly;

FIGS. 24 and 25 are isometric views illustrating a third lens of the optical assembly according to a non-limiting implementation of the image projector, taken from a front side and a back side of the third lens, respectively;

DESCRIPTION OF THE PREFERRED EMBODIMENTS

Figure 1:
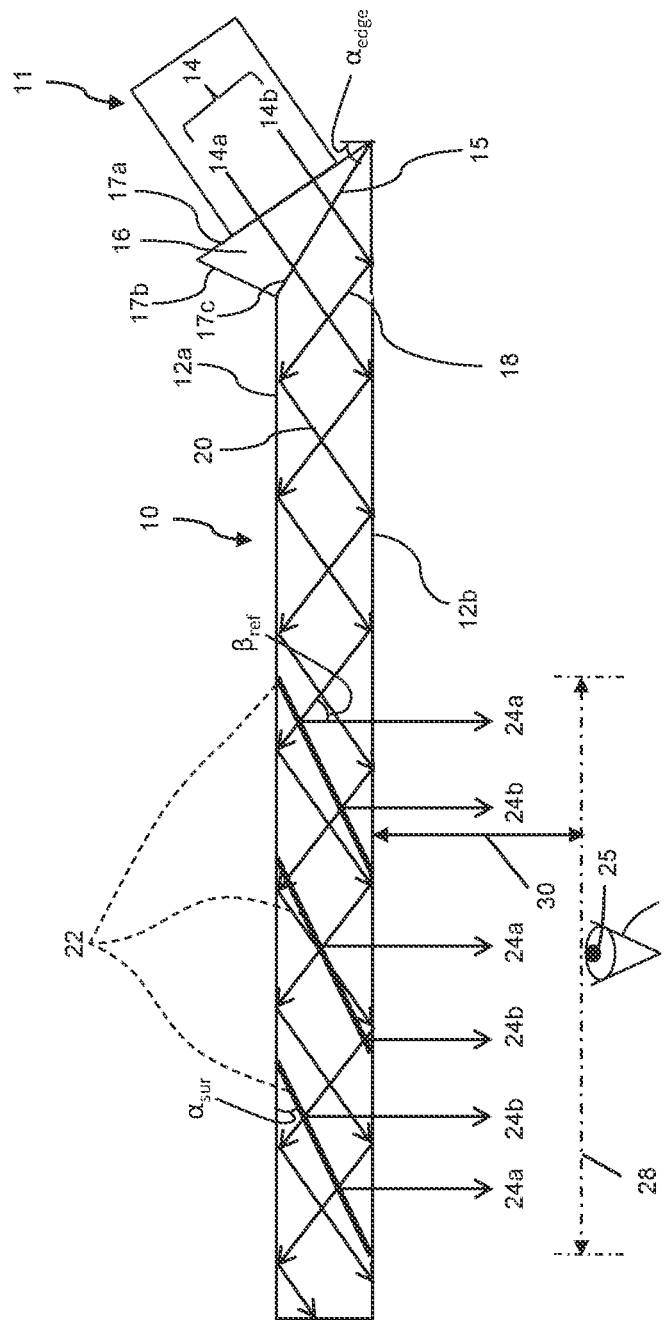
FIG. 1 is a schematic side view, described above, of a prior art light-guide optical element employing partially-reflective surfaces, for use in a near-eye display.

The present invention is an optical system having a light-guide optical element and a compact image projector, and a method for constructing the compact image projector.

The principles and operation of the optical systems and the method according to present invention may be better understood with reference to the drawings accompanying the description.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions such as, for example, top and bottom, upper and lower, front and back, and the like. These directional references are exemplary only to illustrate the invention and embodiments thereof.

Figure 2:
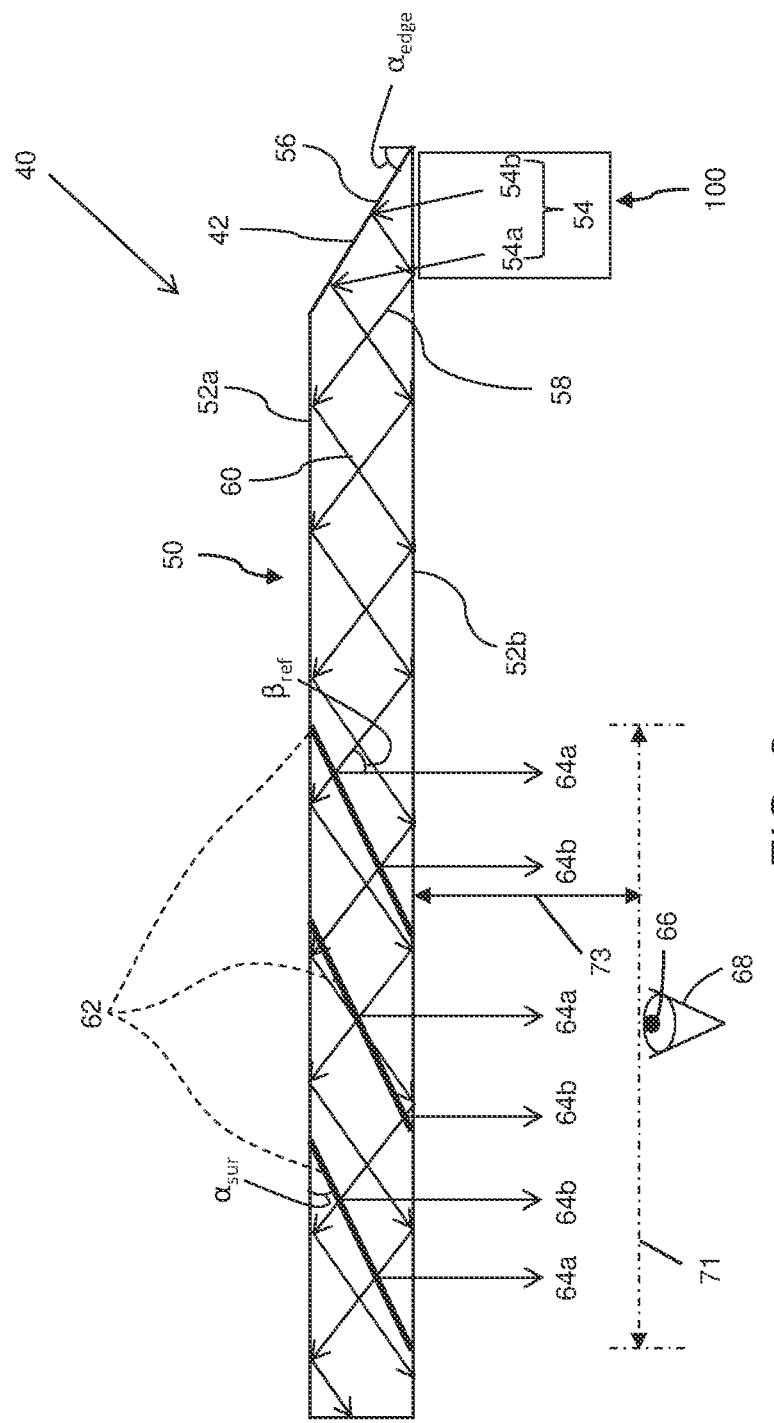
FIG. 2 is a schematic side view of an optical system having an image projector that generates image light that is coupled into a light-guide optical element by an optical coupling-in configuration, according to an embodiment of the present invention.

Referring now to the drawings, FIG. 2 illustrates an optical system, generally designated 40, constructed and operative according to embodiments of the present invention. Generally speaking, the optical system 40 includes an LOE 50, an optical coupling-in configuration 42 associated with a coupling-in region of the LOE 50, and an image projecting optical arrangement (referred to hereinafter as an image projector) 100 associated with the optical coupling-in configuration 42 and the LOE 50. Before describing the structure and operation of the optical system 40 and its various components and subcomponents in more detail, it is first noted that the present invention encompasses a number of different aspects believed to be of innovative significance each in its own right. One aspect of the present invention relates to the structure of the components of the image projector 100 and to the construction (manufacturing) of the image projector 100. Another aspect of the present invention relates to the design of the optical components of the image projector 100 (and in certain embodiments, the design of a hollow mechanical body that maintains the optical components) to reduce the presence of ghost images and/or stray light rays. Another aspect of the present invention relates to the use of the image projector 100 with reflective-type optical coupling-in configurations that reduce the presence of ghost images and/or stray light rays. Another aspect of the present invention relates to particular components of the image projector that, when used in combination with reflective-type optical coupling-in configurations, compensate for effects of chromatic aberration introduced by the LOE 50 and/or the optical coupling-in configuration. In certain embodiments according to one or more aspects of the present invention, the image projector 100 may also be associated with a portion of the LOE 50. The various aspects of the present invention presented herein are of independent utility, and there is believed to be particular synergy when certain aspects of the present invention are used in combination with each other.

Turning now to the structural details of the LOE 50 illustrated in FIG. 2, it is noted that the LOE 50 is generally similar to the LOE 10 of FIG. 1. The LOE 50 is formed from transparent material (i.e., the LOE is a light-transmitting substrate) and has a pair of planar parallel faces (referred to interchangeably as "major external surfaces") 52a, 52b for guiding light by internal reflection (preferably total internal reflection). The LOE 50 is deployed with one of the parallel faces 52b in facing relation to the eye 68, where the eye 68 is located in the EMB 71 at an ER 73 from the face 52b. An image 54 (represented here schematically by a beam of illumination 54 including sample rays 54a and 54b which span the beam) propagates along the substrate by repeated internal reflection from the faces 52a, 52b, impinging on an optical coupling-out configuration associated with the LOE 50, implemented as a sequence of parallel partially reflecting surfaces 62 deployed within the LOE 50 at an oblique angle to the parallel faces 52a, 52b, where part of the image intensity is reflected so as to be coupled out of the LOE 50 (substrate) as rays 64a and 64b toward the pupil 66 of the eye 68. It is noted that the partially reflective surfaces 62 are merely illustrative of one non-limiting optical coupling-out configuration suitable for use with the LOE 50, and other optical coupling configurations can be used to couple image light out of the LOE 50. The optical coupling-out configuration may be any optical coupling arrangement which deflects part of the image propagating within the LOE 50 by internal reflection to an angle such that the deflected part of the image exits the LOE 50. Other examples of such suitable optical coupling arrangements include, but are not limited to, one or more diffractive optical elements deployed on either of the faces 52a, 52b.

The image 54 is generated by the image projector 100, and is injected (coupled) into the LOE 50 by the optical coupling-in configuration 42. In contrast to the image projector 11 of FIG. 1 which typically employs a reflective-display device (e.g. LCoS) or a transmissive-display device (e.g., LCD) for generating image light, the image projector 100 of the present invention employs an emissive-display device that generates the image light that is to be coupled into the LOE 50. In preferred embodiments, the coupling-in optical configuration 42 utilizes a reflective surface for coupling the image light waves into the LOE 50. In FIG. 2, the reflective surface may be implemented as a reflective coating applied to the slant edge (surface) 56 of the LOE 50 that is oblique to the major surfaces 52a, 52b. As will be discussed in further detail, certain embodiments of according to an aspect of the present invention utilize a reflective-type coupling-in optical configuration with the image projector 100 in order to reduce ghost images, thereby improving the quality of the image that is coupled out of the LOE 50. Nevertheless, the image projector 100 of the present invention may be deployed together with a wedge-type of coupling-in optical configuration, such as the wedge 16 of FIG. 1.

Figure 4:
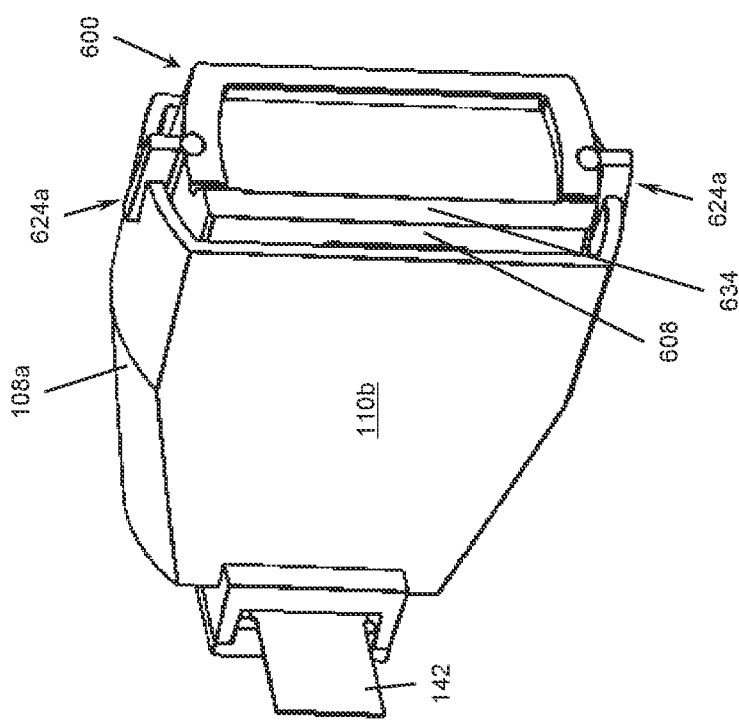
FIGS. 3 and 4 are isometric views illustrating an image projector, constructed and operative according to an embodiment of the present invention.
Figure 3:
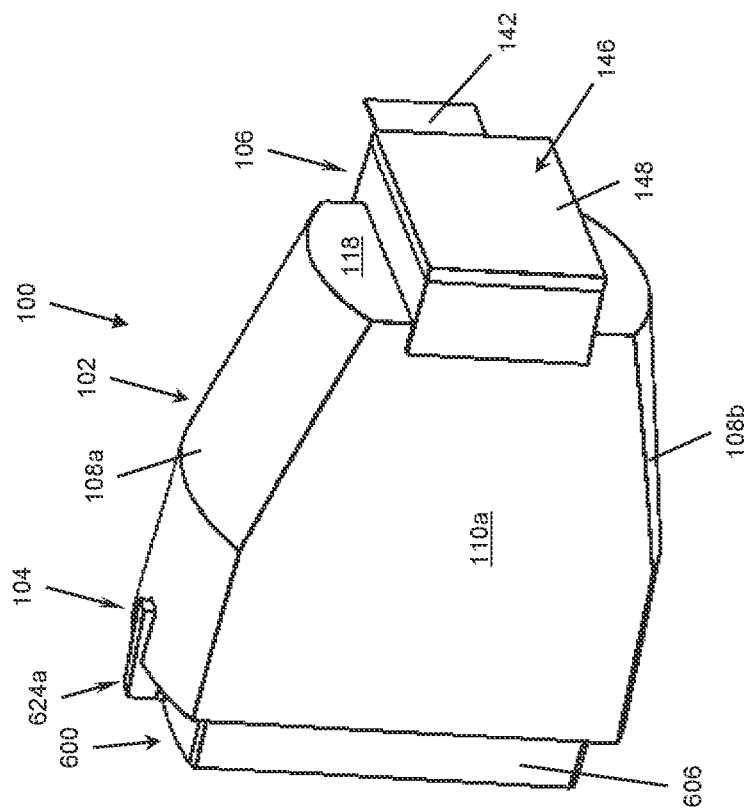
Figure 5:
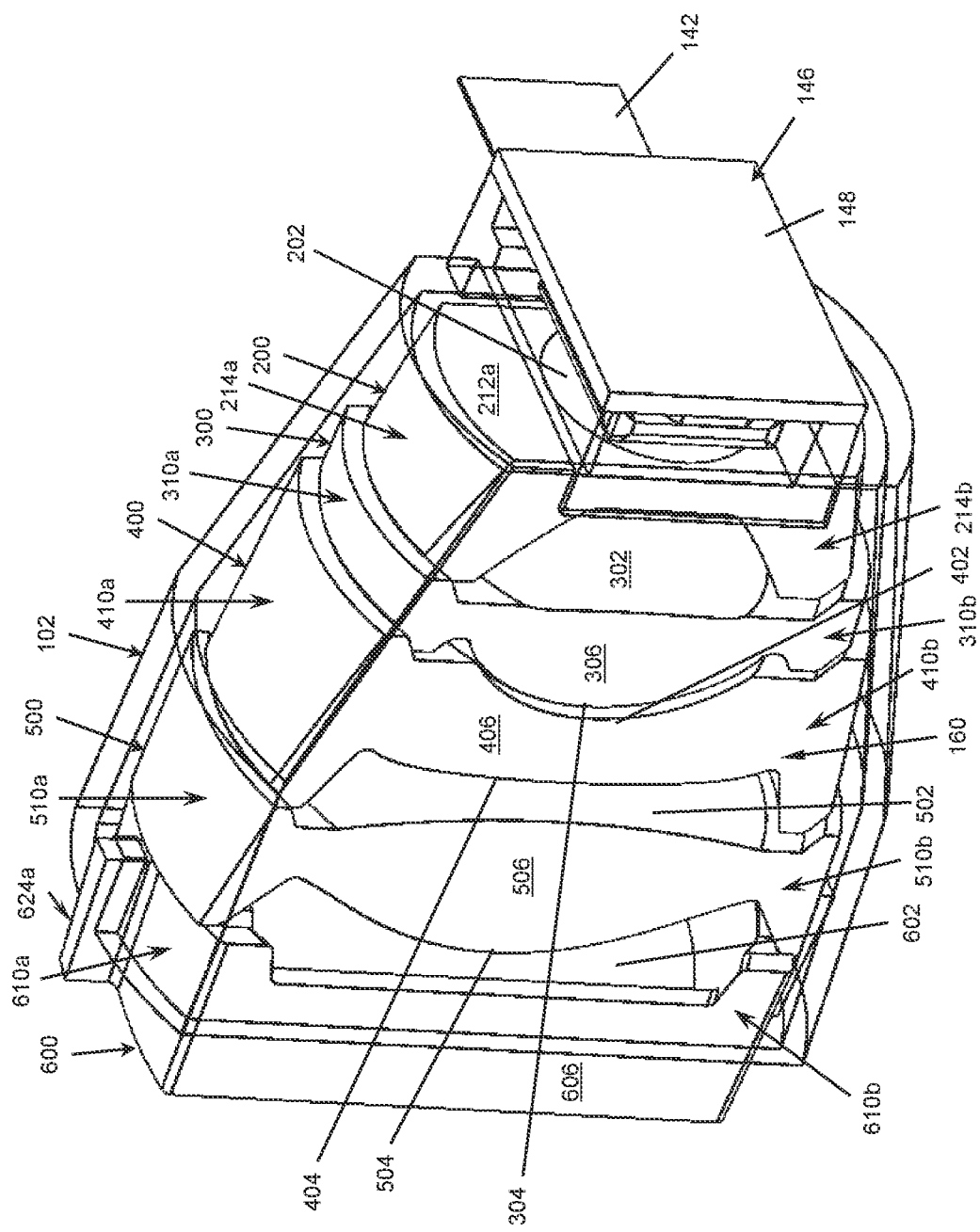
FIGS. 5 and 6 are isometric views corresponding to FIGS. 3 and 4, respectively, showing a hollow mechanical body of the image projector as transparent to illustrate an optical assembly of the image projector deployed within the hollow mechanical body.
Figure 6:
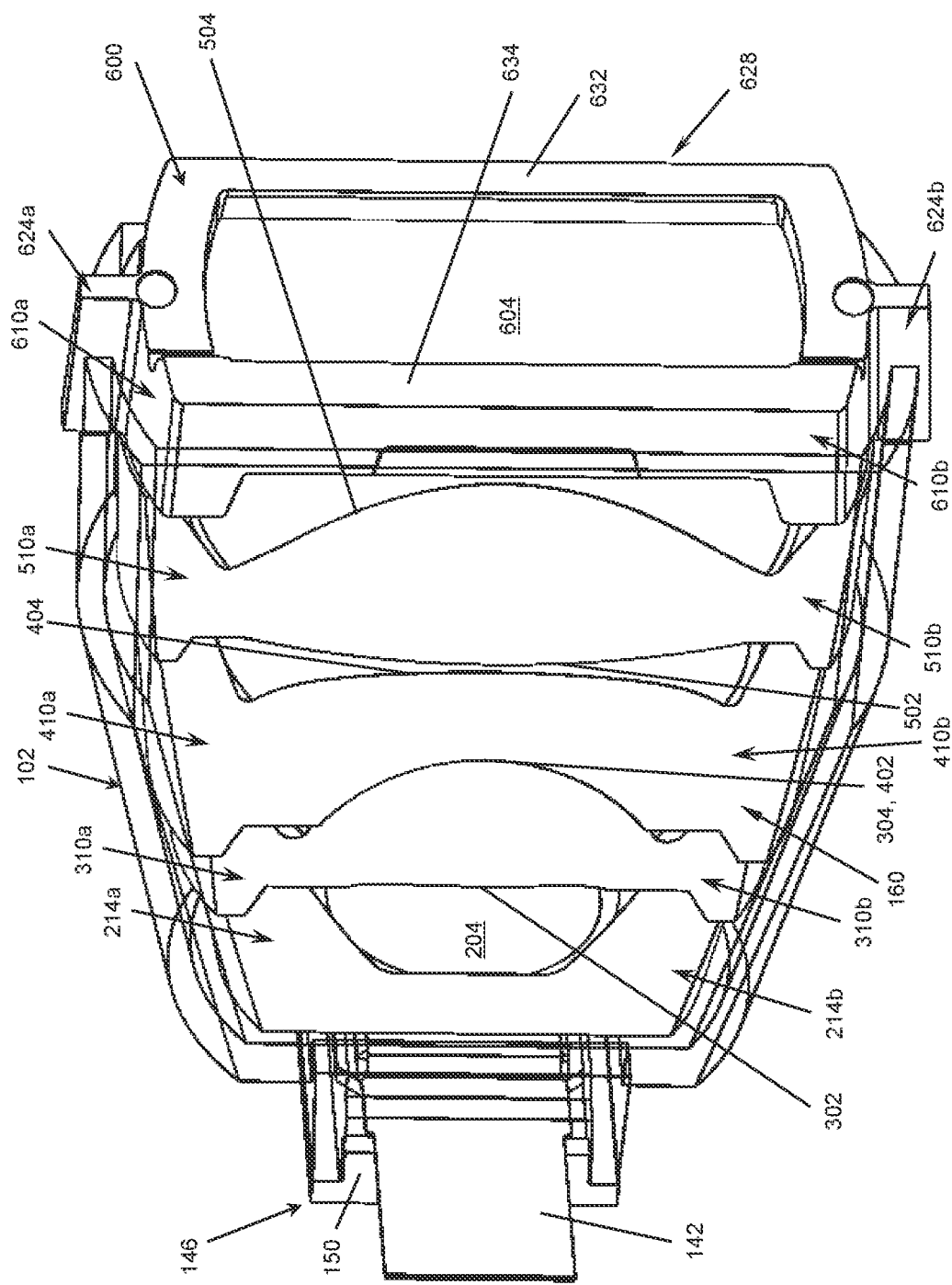
Figure 7:
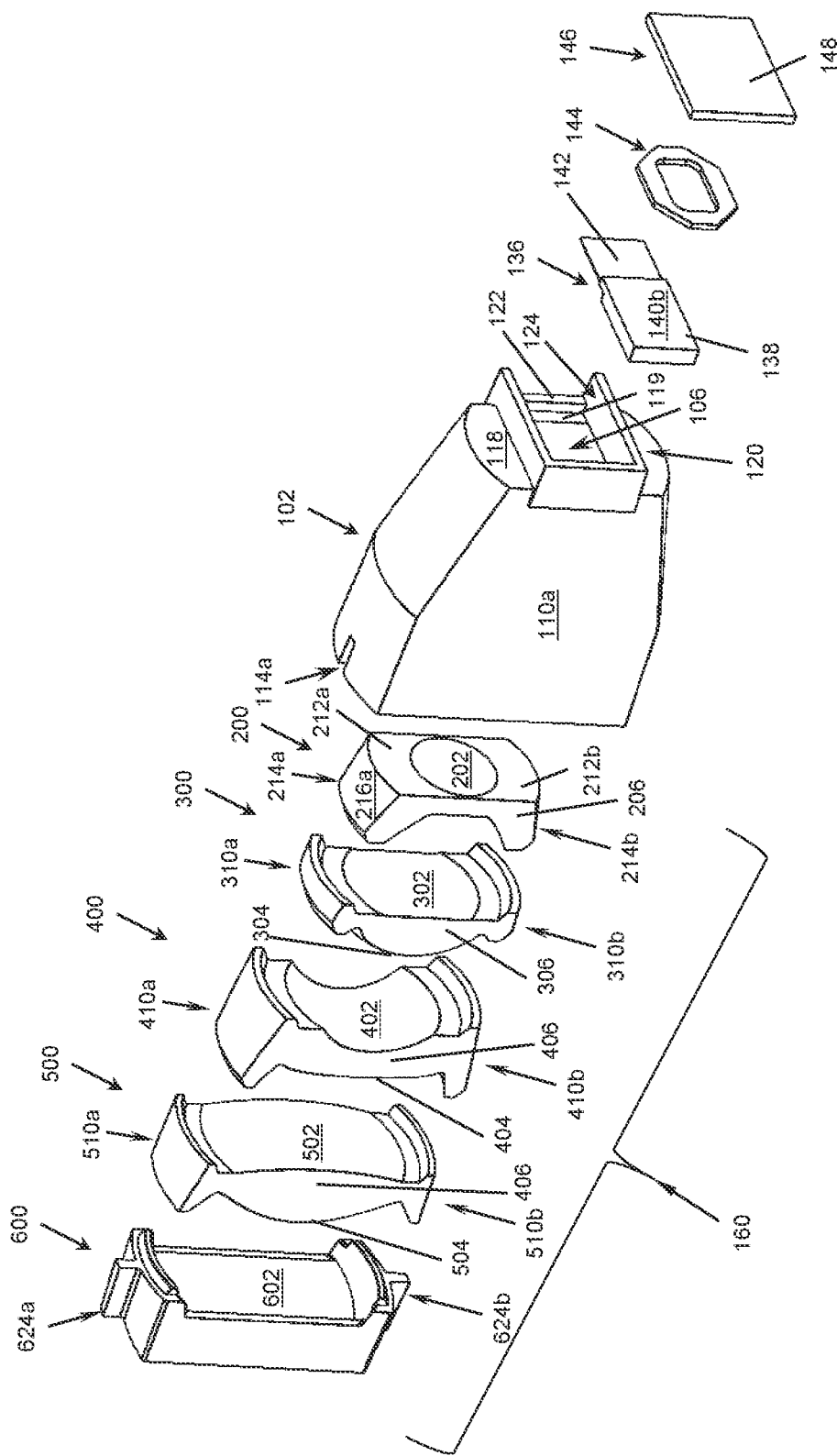
FIGS. 7 and 8 are isometric exploded views corresponding to FIGS. 3 and 4, respectively, illustrating the components of the image projector.
Figure 8:
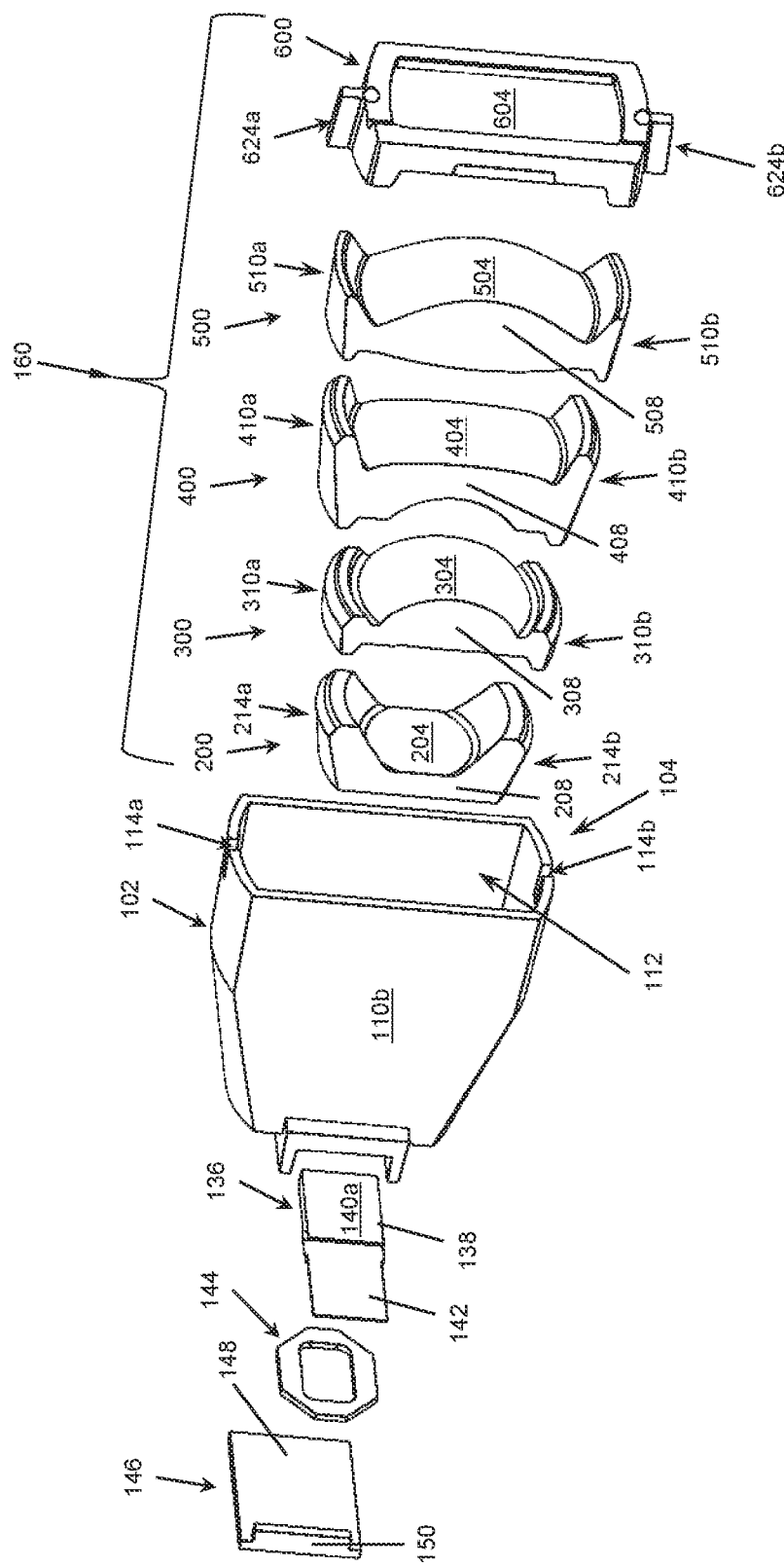
Figure 9:
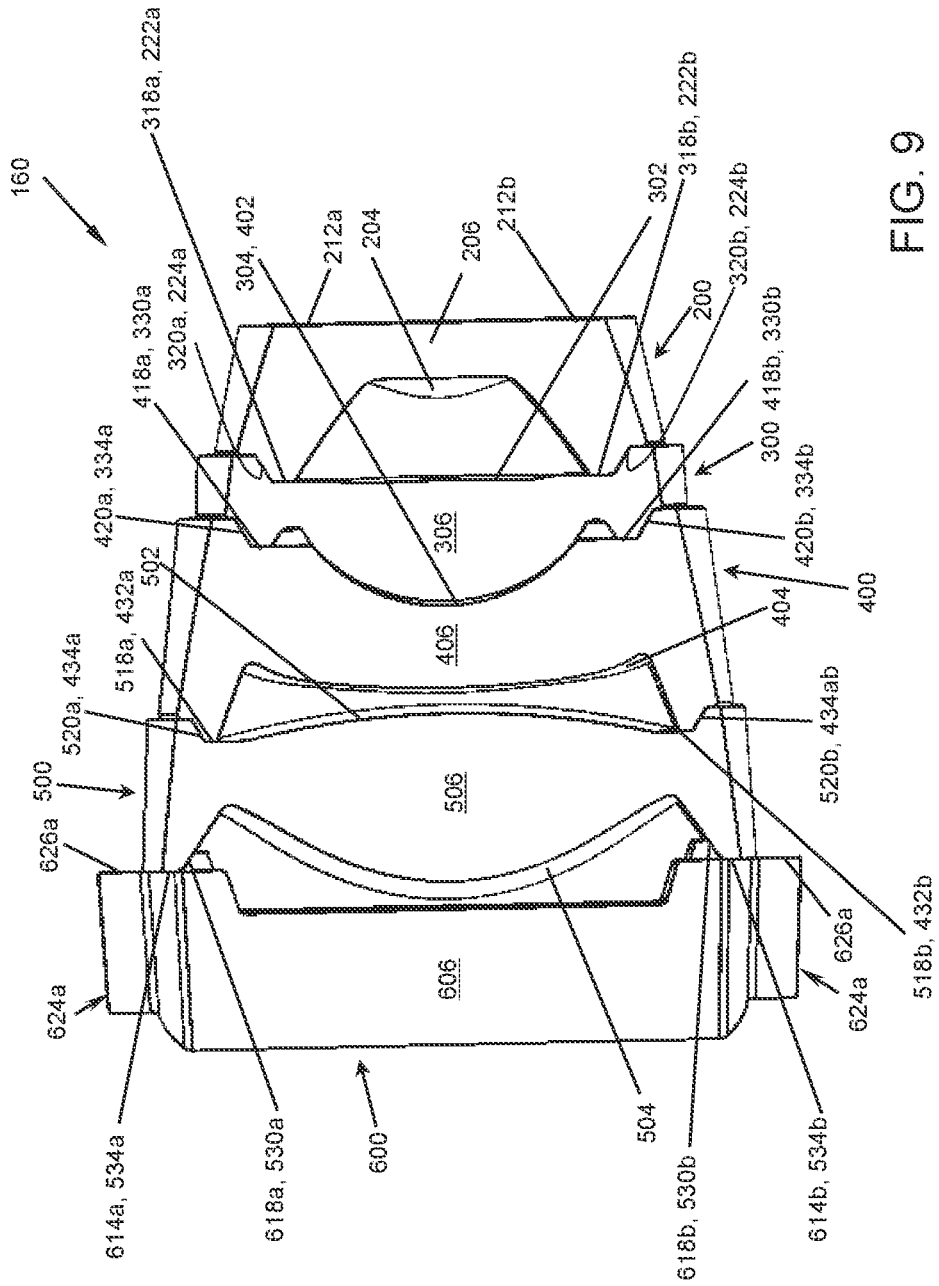
FIG. 9 is a first side view of the optical assembly of the image projector of FIG. 3 showing the engagement between of the components of the optical assembly.
Figure 10:
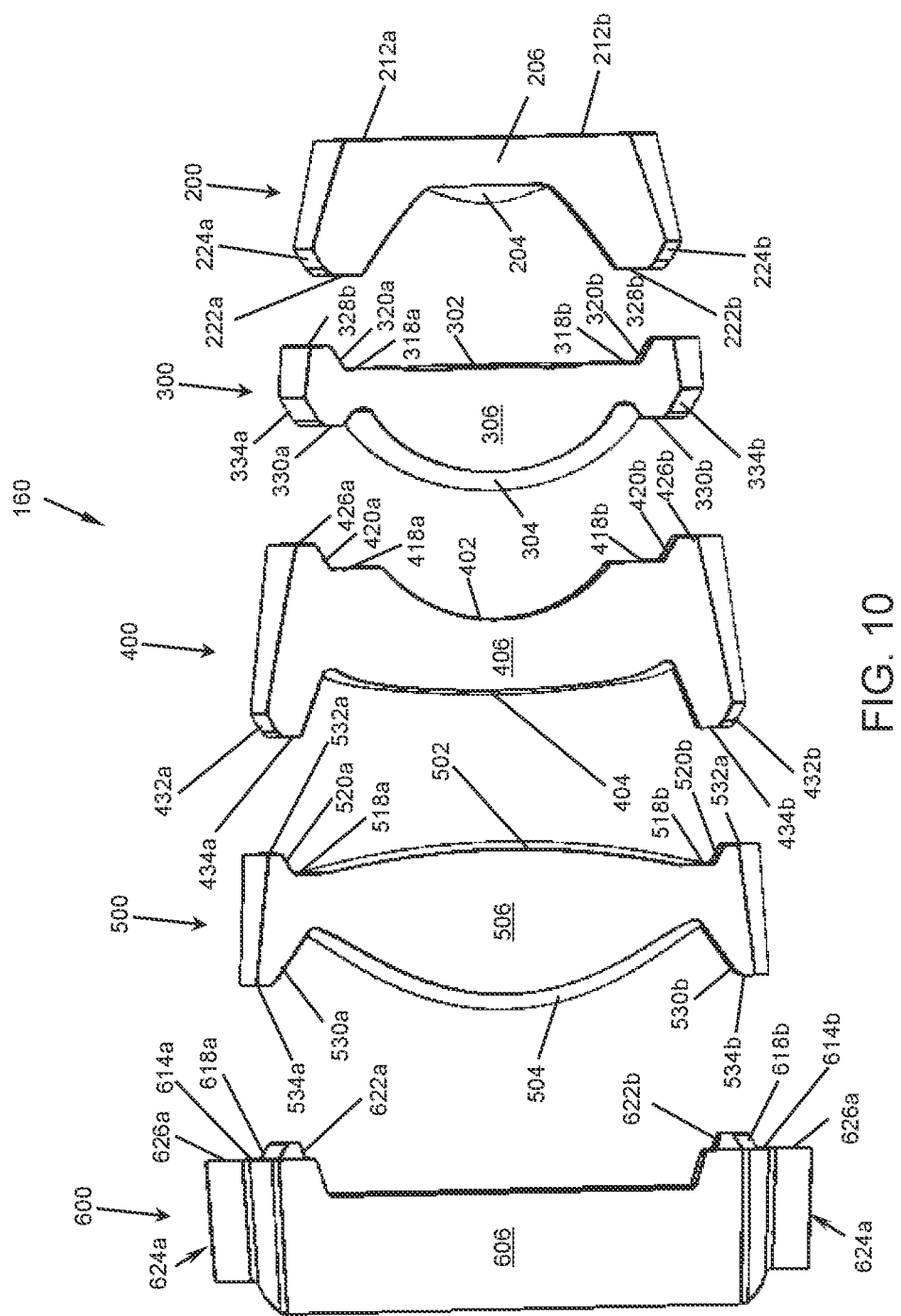
FIG. 10 is an exploded view corresponding to FIG. 9, showing the components of the optical assembly.
Figure 11:
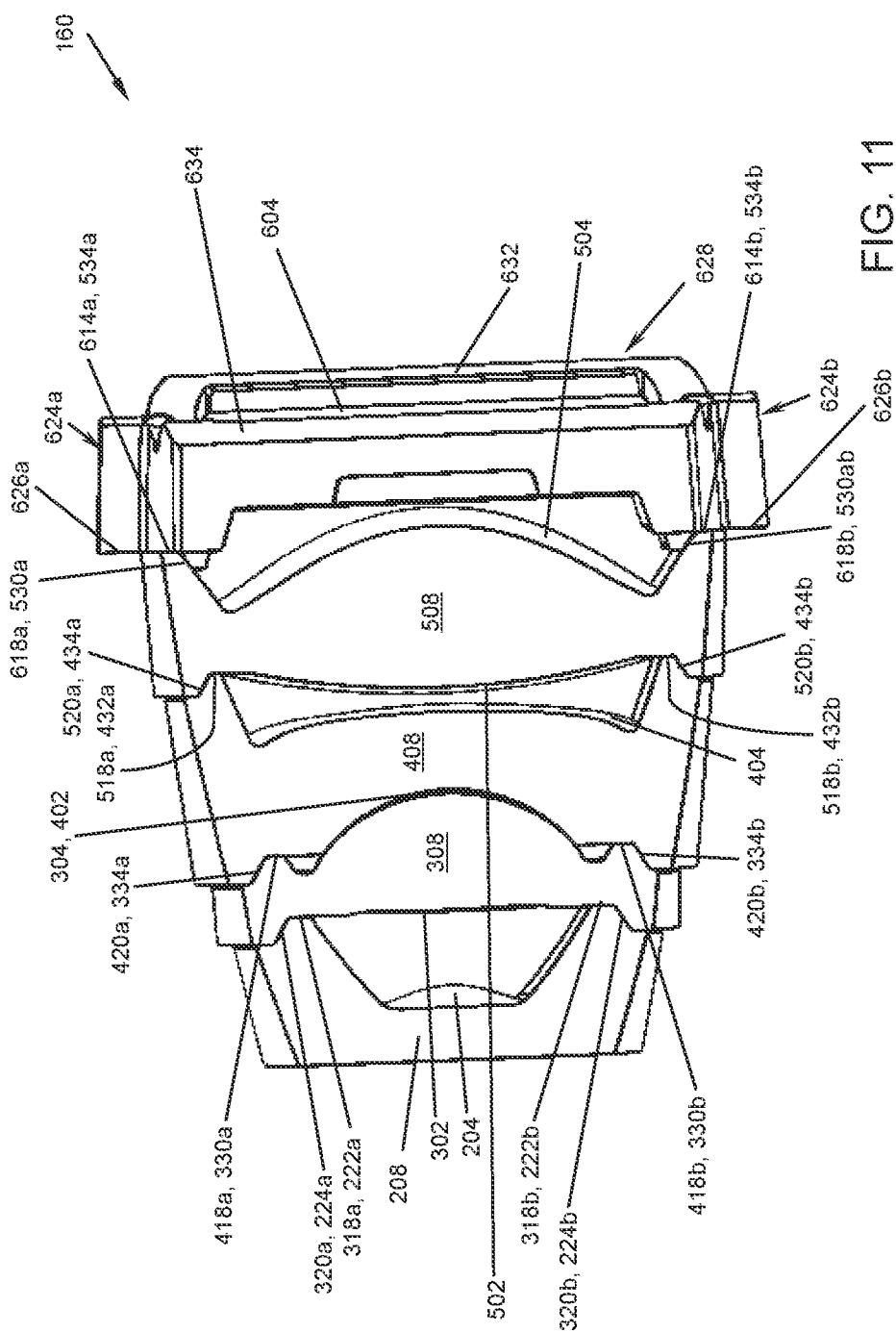
FIG. 11 is a second side view corresponding to FIG. 9.
Figure 12:
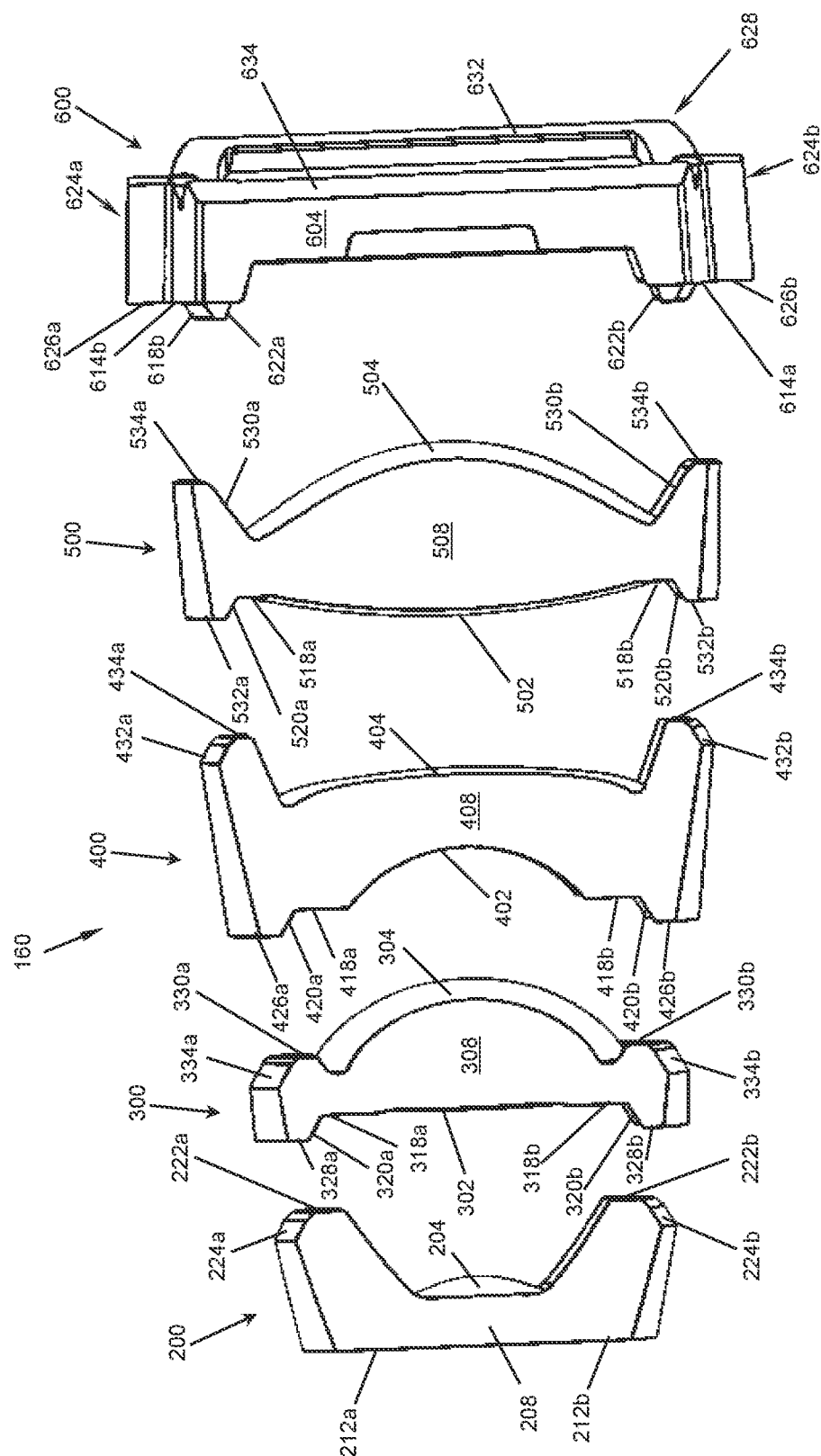
FIG. 12 is an exploded view corresponding to FIG. 11, showing the components of the optical assembly.
Figure 15:
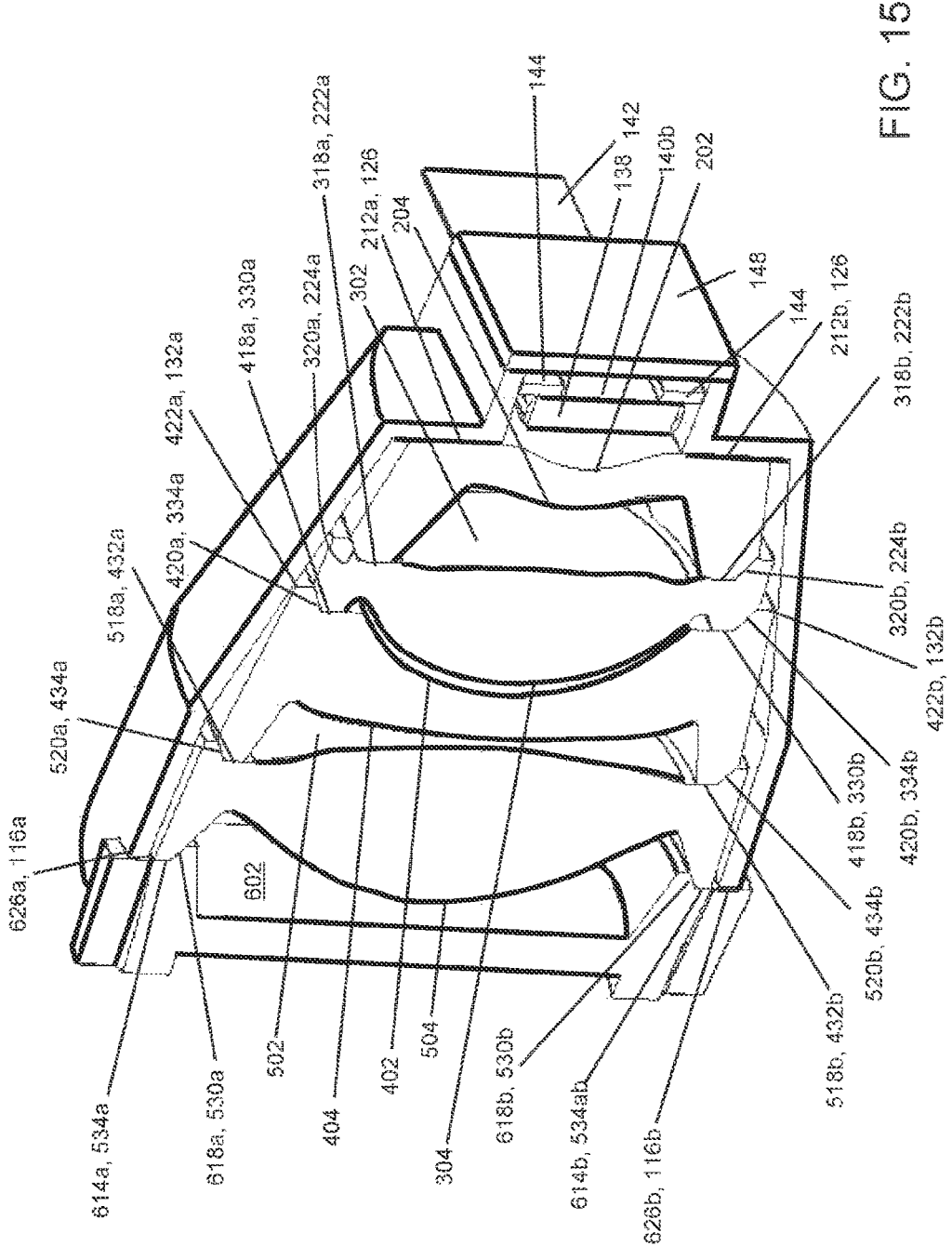
FIGS. 15 and 16 are central-vertical-plane and central-horizontal-plane cross-sectional views, respectively, taken through the image projector of FIG. 3.

Turning now collectively to FIGS. 3-32, there are shown various views of the image projector 100 (also in and of itself an optical system) and its corresponding components, according to embodiments of certain aspects of the present invention. Generally speaking, the image projector 100 includes a hollow mechanical body 102 (also referred to as a "barrel" due to its general barrel-like shape), an optical assembly 160 deployed within the barrel 102, a microdisplay device 136, and a cover member 146. FIGS. 3 and 4 are different isometric views that illustrate the assembled image projector 100, and FIGS. 5, 6 and 14 are various views that illustrate the assembled image projector 100 with the barrel 102 shown as transparent to more clearly illustrate the deployment of the optical assembly 160 within the barrel 102.

With particular reference to FIGS. 7, 8 and 30-32, the barrel 102 has opposing open ends 104, 106, with the opening of one of the ends 104 being generally larger than the opening at the other of the ends 106. These ends 104, 106 may be referred to interchangeably as a wide end 104 and narrow end 106. The barrel 102 includes several surfaces, including a pair of curved external surfaces 108a, 108b (referred to respectively as upper and lower external surfaces) and a pair of opposing planar (or nearly planar) external surfaces 110a, 110b. In certain non-limiting implementations, the surfaces 110a, 110b are parallel to each other. In other non-limiting implementations, the surfaces 110a, 110b are not parallel to each other and taper out gradually when moving from the narrow end 106 to the wide end 104. A fifth surface 118 is formed at the narrow end 106, and forms part of a receiving portion 120 that is configured to receive the microdisplay device 136. In certain preferred but non-limiting implementations, the barrel 102 is constructed from a material that is not transparent to light waves emitted by the microdisplay device 136.

The microdisplay device 136 is an emissive-display device that includes an emissive-display 138, which may be implemented, for example, as an organic light emitting diode (OLED) display device, a microLED display device, or any other self-emitting microdisplay device that can generate image light without using an external light source, such as a back light or front light. Although not shown in the drawings, the microdisplay device 136 may include a polarizer as part of the emissive-display 138 in order to produce polarized image light waves. In certain embodiments, an electronic interfacing element 142 is electrically connected at one end thereof to, and extends laterally from, the emissive-display 138. The electronic interfacing element 142 includes, or can be used to provide an electronic interface to, an electrical connector, implemented, for example, as a cable or wire-bundle (e.g., ribbon cable), or any other type of connector that is capable of providing an electronic and/or data connection between electronic components, so as to provide electrical connection between the emissive-display 138 and one or more electronic elements, including, but not limited to power supplying devices, display driver electronics, one or more computerized storage (e.g., memory, such as a volatile or non-volatile memory), and/or one or more computerized processor implemented, for example, as a microprocessor, microcontroller, field-programmable gate array (FPGA), digital signal processor (DSP), application-specific integrated circuit (ASIC), field-programmable logic array (FPLA), and the like.

The external surfaces 108a, 108b are generally sloped or curved such that the barrel 102 is tapered from the wide end 104 to the narrow end 106 along the surfaces 108a, 108b. In addition, the surfaces 110a, 110b also generally taper from the wide end 104 to the narrow end 106 due to the difference in the size of the openings at the ends 104, 106. Portions of the interior (i.e., inner) sidewalls of the barrel 102 form an inner sidewall configuration 128 that includes several regions, including two upper regions 130a, 132a on the interior portions of the barrel 102 opposite the upper external surface 108a, and two lower regions 130b, 132b on the interior portions of the barrel 102 opposite the lower external surface 108b. The slope (curvature) of the regions 132a, 132b is larger than the slope (curvature) of the regions 130a, 130b, corresponding to the increased degree of tapering of the barrel 102 at the regions 132a, 132b. The barrel 102 further includes inner sidewalls 134a, 134b that are opposite the external surfaces 110a, 110b.

Turning now to FIGS. 7-12, the optical assembly 160 includes a plurality of optical components (also referred to as optical elements), including a set of lens optical elements (i.e., lenses) 200, 300, 400, 500, and a base optical element 600 (referred to interchangeably as the "base"). Although four lenses are illustrated here, other configurations of the image projector 100 are possible which utilize fewer than four lenses or more than four lenses. As will be discussed, the lenses 200, 300, 400, 500 cooperate to perform various optical functions, including reduction of chromatic and/or spherical aberration, image size reduction, collimation, and the like.

As illustrated in FIGS. 5, 6, 9, 10, and 13-16, the optical components 200, 300, 400, 500, 600 of the optical assembly 160 are arranged in a stack configuration. The stack configuration is deployed such that the optical components 200, 300, 400, 500 are positioned within the hollow portion (i.e., the inside) of the barrel 102, as illustrated in FIGS. 5, 6 and 14-16, with the lens 200 positioned at one end of the stack configuration at or near the narrow end 106 of the barrel 102, and with the base 600 positioned at the other end of the stack configuration at or near the wide end 104 of the barrel 102. A portion of the base 600 is also deployed within the hollow portion of the barrel 102.

As will be discussed in greater detail below, each of the optical components 200, 300, 400, 500, 600 of the optical assembly 160 has a set of engagement configurations formed from an arrangement of one or more surfaces, grooves, beveled grooves, edges, beveled edges, segments of surfaces, or other similar such types of mechanical structures. In the present embodiments, some of the optical components have a set of two engagement configurations, while other of the optical components have a set of four engagements configurations. In particular, the optical component 200 at one end of the stack configuration has a pair of engagement configurations deployed on a back side of the optical component. The optical component 600 at the other end of the stack configuration has a first pair of engagement configurations deployed on a front side of the optical component and a second pair of engagement configurations projecting upward and downward from respective upper and lower surfaces of the optical component. The remaining optical components in the stack configuration (i.e., the optical components 300, 400, 500 positioned between the optical components 200, 600 at the two ends of the stack configuration) each have a first pair of engagement configurations deployed on a front side of the optical component and a second pair of engagement configurations deployed on a back side of the optical component. For each pair of adjacent optical components in the stack configuration, at least some of the engagement configurations of each of the optical components in the pair are correspondingly configured so as to engage with each other. In other words, at least some of the engagement configurations of a first optical component in the pair are configured to engage with at least some of the engagement configurations of a second optical component in the pair, and the at least some of the engagement configurations of the second first optical component in the pair are configured to engage with the at least some of the engagement configurations of the first optical component in the pair. These engagement configurations of pairs of adjacent optical components are correspondingly configured, and engage with each other so as to promote an interlocking engagement between the adjacent optical components. The interlocking engagement between adjacent optical components is a mechanical engagement, meaning that no adhesive is used between the optical components to interconnect the optical components of the optical assembly 160.

The base optical element 600 is formed from a material that is transparent to light waves emitted by the microdisplay device 136 (i.e., the base 600 is light-transmitting). The base 600 performs both optical and mechanical functions, in particular, some of the engagement configurations of the base 600 are further configured to engage with the adjacent optical component (e.g., optical component 500) in the stack configuration, while the remaining engagement configurations of the base 600 are configured to engage with corresponding engagement configurations of the barrel 102 located at the wide end 104. The engagement between the base 600 and the barrel 102 enables the base 600 to maintain the lenses 200, 300, 400, 500 within the barrel 102. The optical functions performed by the base 600 will be described in detail in subsequent sections of the present disclosure.

The structure and the general optical functions of the optical components of the optical assembly 160 will now be described in more detail, with initial reference to FIGS. 7-12 and 20-29. In general, each one of the lenses 200, 300, 400, 500 is formed as a single unitary member that is comprised of two portions: a lensing portion (in the form of a pair of optical surfaces and the optical region between (i.e., bounded by) the optical surfaces) that applies optical power to incoming light, and one or more attachment portions (having engagement configurations) for interconnecting and attaching the lenses together and with the base 600. The base 600 is also formed as a single unitary member that is comprised of two portions: an optical power applying portion (in the form of a pair of optical surfaces and the optical region between (i.e., bounded by) the optical surfaces) that changes the traversal angle of incoming light (slightly differently for each wavelength), and attachment portions (having engagement configurations) for engaging with the lens 500 and the barrel 102, and for attaching the optical assembly 160 to the LOE 50 and/or optical coupling-in configuration 42.

As will be discussed, for each optical component of the optical assembly 160, the optical surfaces of that optical component are on opposing sides of the optical component, referred to as a front side and back side. Within the context of this document, the front side of an optical component of the optical assembly 160 generally refers to the side of the optical component that is closest to the narrow end 106 of the barrel 102 (and by equivalence, closest to the microdisplay device 136, farthest from the wide end 104 of the barrel 102, and farthest from the major surface 52b of the LOE 50). Also within the context of this document, the back side (also referred to as a "rear side") of an optical component of the optical assembly 160 generally refers to the side of the optical component that is closest to the wide end 104 of the barrel 102 (and by equivalence, closest to the major surface 52b of the LOE 50, farthest from the narrow end 106 of the barrel 102, and farthest from the microdisplay device 136).

Figure 21:
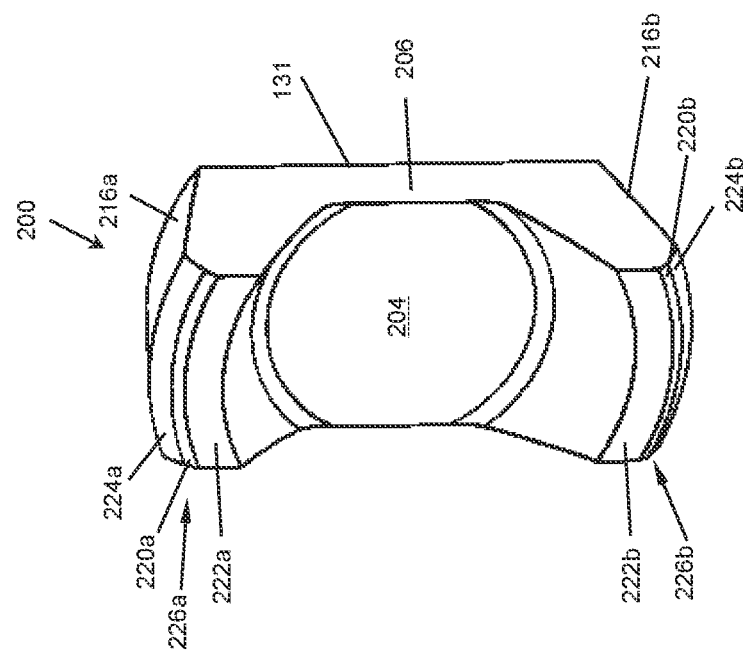
FIGS. 20 and 21 are isometric views illustrating a first lens of the optical assembly according to a non-limiting implementation of the image projector, taken from a front side and a back side of the first lens, respectively.
Figure 20:
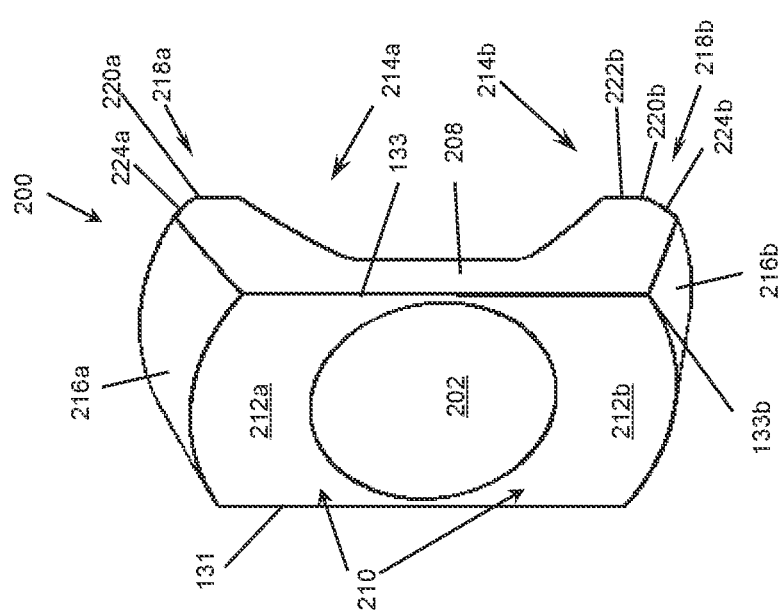

With continued reference to FIGS. 7-12 and 20-29, and with particular reference to FIGS. 20 and 21, the lens 200 includes two generally opposing optical surfaces 202, 204 on the front side and the back side of the lens 200, respectively. In this non-limiting example implementation, the surface 202 is a concave surface and the surface 204 is a convex surface, and the surface profiles of both of the surfaces 202, 204 are aspheric. Other surface profiles are contemplated herein, including, for example, spheric. The surface profiles of the lenses may depend on various factors, including, for example, the particular application of the image projector, the number of lenses in the optical assembly, and the material from which the lenses are manufactured. The surface 202 is concave with respect to a generally planar surface 210 on a front side of the lens 200. The surface 210 includes upper and lower surface portions 212a, 212b. The surfaces 202, 204, together with portions of a pair of side surfaces 206, 208, generally define the lensing portion of the lens 200 that applies optical power to incoming light from the microdisplay device 136. When deployed as part of the image projector 100, the surface 202 is in facing relation with the microdisplay device 136. The lens 200 is generally configured as a field lens, which performs various optical functions, including functions for reducing the size of the image generated by the microdisplay device 136 and/or counteracting the effects of field curvature aberration.

The lens 200 has a pair of legs 214a, 214b (or "branches") which extend toward the back side of the lens 200 and outward from opposing peripheral portions of the lens 200. In the non-limiting orientation of the optical assembly 160 shown in the drawings, the legs 214a, 214b extend from the respective upper and lower peripheral portions of the lens 200 (and therefore may be referred to within this context as "upper leg" 214a and "lower leg" 214b). The legs 214a, 214b generally flare outward from the center of the lens 200 along the vertical axis in the orientation of FIGS. 20 and 21, so as to generally correspond to the curvature or slope of the regions 132a, 132b of the inner sidewall configuration 128 of the barrel 102, as can be seen in the cross-sectional view illustrated in FIG. 15. The legs 214a, 214b are generally flap-type structures, having major curved surfaces 216a, 216b, that extend tangentially outward from the top and bottom peripheral portions of the lens 200. The side surfaces 206, 208 generally flare outward from the center of the lens 200, along the horizontal axis in the orientation of FIGS. 20 and 21, such that the surfaces 216a, 216b form isosceles trapezoid shapes in the top (and bottom) view of the lens 200, as illustrated in FIGS. 13 and 14.

The legs 214a, 214b terminate at corresponding terminating regions 218a, 218b at upper and lower portions on the back side of the lens 200. Parts of the terminating regions 218a, 218b form respective upper and lower engagement configurations 226a, 226b of the lens 200. The terminating regions 218a, 218b include corresponding beveled edges 220a, 220b. The beveled edge 220a is formed from a pair of (preferably coplanar) surfaces 222a, 224a, and the beveled edge 220b is formed from a pair of surfaces 222b, 224b. It is noted that the surface 224a also forms an edge with the major upper curved surface 216a of the leg 214a, and the surface 224b also forms an edge with the major lower curved surface 216b of the leg 214b. The beveled edges 220a, 220b (and the surfaces 222a, 224a and 222b, 224b from which they are formed) form the engagement configurations 226a, 226b of the lens 200, and are configured to engage with corresponding engagement configurations of the lens 300. The curved surfaces 216a, 216b have an arcuate profile (i.e., have an arc shape) in at least one dimension, in particular in the dimension spanning between the surfaces 206, 208. The beveled edges 220a, 220b also have an arcuate profile in the same dimension as the arcuate profile of the surfaces 216a, 216b. It follows that the surfaces 222a, 224a and 222b, 224b (that respectively form the beveled edges 220a and 220b) also have arcuate profiles in the same dimension as the arcuate profiles of the beveled edges 220a, 220b.

When inserted in the barrel 102, the lens 200 is deployed such that the coplanar upper and lower surface portions 212a, 212b contact (or are in proximate contact with) an inner sidewall (surface) 126 of the barrel 102 that is generally opposite the external surface 118.

The lens 200 further includes a pair of side edges, designated 131 and 133. The edge 131 is formed from the intersection of the surfaces 206, 210, and the edge 133 is formed from the intersection of the surfaces 208, 210. The edges 131, 133 are terminated at opposing ends by the surfaces 216a, 216b to form respective terminating corner regions. In certain embodiments, the edges 131, 133 (and/or the terminating corner regions) can be used to restrict or limit rotation of the lens 200 (and the other lenses of the optical assembly 160) within the barrel 102.

Figures 22, 23:
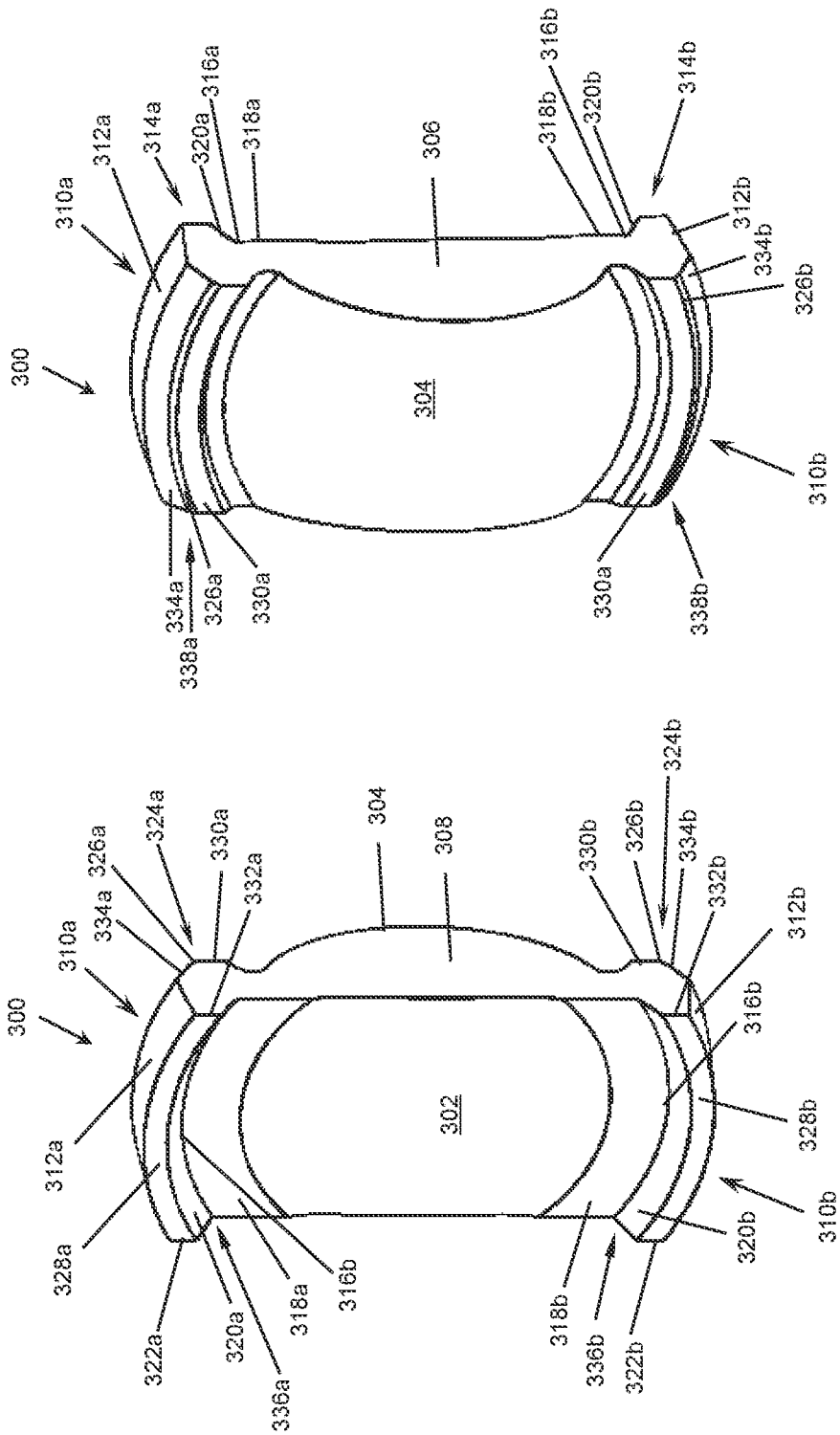
FIGS. 22 and 23 are isometric views illustrating a second lens of the optical assembly according to a non-limiting implementation of the image projector, taken from a front side and a back side of the second lens, respectively.

With continued reference to FIGS. 7-12 and 20-29, and with particular reference to FIGS. 22 and 23, the lens 300 includes two generally opposing optical surfaces 302, 304 on the front side and the back side of the lens 300, respectively. The lens 300 is deployed with the surface 302 in facing relation to the surface 204 of the lens 200. The surfaces 302, 304, together with a pair of side surfaces 306, 308, generally define the lensing portion of the lens 300 that applies optical power to incoming light. In this non-limiting example implementation, the lens 300 is a biconvex lens and the surface profiles of both of the surfaces 302, 304 are aspheric. As can be seen, however, the degree of curvature of the surface 304 is significantly greater than that of the surface 302. As will be discussed, the lens 300 operates together with the lens 400 to act like an achromatic doublet that reduces the effects of chromatic aberration.

The lens 300 has a pair of legs 310a, 310b (or "branches") that extend outward from opposing peripheral portions of the lens 300. In the non-limiting orientation of the optical assembly 160 shown in the drawings, the legs 310a, 310b extend from the respective upper and lower peripheral portions of the lens 300 (and therefore may be referred to within this context as "upper leg" 310a and "lower leg" 310b). The legs 310a and 310b are generally flap-type structures, having major curved surfaces 312a, 312b, that extend tangentially outward from the top and bottom peripheral portions of the lens 300. The side surfaces 306, 308 generally flare outward from the center of the lens 300 along the horizontal axis in the orientation of FIGS. 22 and 23, such that the surfaces 312a, 312b form isosceles trapezoid shapes in the top (and bottom) view of the lens 300, as illustrated in FIGS. 13 and 14.

The leg 310a generally extends in two opposing directions (one toward the lens 200 and the other toward the lens 400) and terminates at two terminating regions 314a, 324a. Similarly, the leg 310b generally extends in two opposing directions (one toward the lens 200 and the other toward the lens 400) and terminates at two terminating regions 314b, 324b. The terminating regions 314a, 314b are formed on the respective upper and lower portions of the front side of the lens 300, and the terminating regions 324a, 324b are formed on the respective upper and lower portions of the back side of the lens 300.

Parts of the terminating regions 314a, 314b form respective upper and lower first engagement configurations 336a, 336b of the lens 300 that are configured to engage with the corresponding engagement configurations 226a, 226b of the lens 200. The terminating regions 314a, 314b include corresponding beveled grooves 316a, 316b. The beveled groove 316a is formed from a pair of surfaces 318a, 320a formed on the front side of the lens 300, and the beveled groove 316b is formed from a pair of surfaces 318b, 320b. The surfaces 318a, 318b are preferably coplanar surfaces. The beveled grooves 316a, 316b have an arcuate profile (i.e., have an arc shape) in at least one dimension, in particular in the dimension spanning between the surfaces 306, 308. It follows that the surfaces 318a, 320a and 318b, 320b (that respectively form the beveled grooves 316a and 316b) also have arcuate profiles in the same dimension as the arcuate profiles of the beveled grooves 316a, 316b.

The beveled grooves 316a, 316b (and the surfaces 318a, 320a, 318b, 320b from which they are formed) form the upper and lower first engagement configurations 336a, 336b of the lens 300, and are configured to engage with corresponding engagement configurations 226a, 226b of the lens 200. In particular, the arcuate profile of the beveled groove 316a matches the arcuate profile of the beveled edge 220a, and the beveled edge 220a is configured to fit in the beveled groove 316a, such that portions of the surfaces 222a and 224a contact portions of the surfaces 318a and 320a, respectively. Likewise, the arcuate profile of the beveled groove 316b matches the arcuate profile of the beveled edge 220b, and the beveled edge 220b is configured to fit in the beveled groove 316b, such that portions of the surfaces 222b and 224b contact portions of the surfaces 318b and 320b, respectively. Within the context of this document, portions of two surfaces are said to be in contact if those portions sit flush against each other. Such contact between two surfaces may also be considered as two surfaces abutting each other. The regions at which such surfaces contact each other are referred to herein as interface regions.

It is noted that in this non-limiting example configuration, each of the terminating regions 314a, 314b includes two pairs of edges, designated 322a, 332a and 322b, 332b. The edge 322a is formed from the intersection of the surfaces 328a, 306, and the edge 332a is formed from the intersection of the surfaces 328a, 308. The surface 328a is a generally planar surface having an arcuate profile that shares edges with both the surfaces 320a and 312a. Similarly, edge 322b is formed from the intersection of the surfaces 328b, 306, and the edge 332b is formed from the intersection of the surfaces 328b, 308. The surface 328b is a generally planar surface (coplanar with the surface 328a) having an arcuate profile that shares edges with both the surfaces 320b and 312b.

The edges 322a, 332a are terminated at an upper end by the surface 312a to form respective terminating corner regions. Similarly, the edges 322b, 332b are terminated at a lower end by the surface 312b to form respective terminating corner regions. In certain embodiments, the edges 322a, 332a, 322b, 332b (and/or the terminating corner regions) can be used to restrict or limit rotation of the lens 300 (and the other lenses of the optical assembly 160) within the barrel 102.

Parts of the terminating regions 324a, 324b form respective upper and lower second engagement configurations 338a, 338b of the lens 300 that are configured to engage with corresponding engagement configurations of the lens 400. The terminating regions 324a, 324b include corresponding beveled edges 326a, 326b. The beveled edge 326a is formed from a pair of surfaces 330a, 334a, and the beveled edge 326b is formed from a pair of surfaces 330b, 334b. The surfaces 330a, 330b are preferably coplanar surfaces, and are formed on the back side of the lens 300. The beveled edges 326a, 326b (and the surfaces 330a, 334a, 330b, 334b from which they are formed) form the upper and lower second engagement configurations 338a, 338b of the lens 300, and are configured to engage with corresponding engagement configurations of the lens 400. The beveled edges 326a, 326b have an arcuate profile (i.e., have an arc shape) in at least one dimension, in particular in the dimension spanning between the surfaces 306, 308. It follows that the surfaces 330a, 334a and 330b, 334b (that respectively form the beveled edges 326a and 326b) also have arcuate profiles in the same dimension as the arcuate profiles of the beveled edges 326a, 326b. It is noted that in this non-limiting example configuration, the surface 334a also forms an edge (a beveled edge) with the major upper surface of the leg 310a, and the surface 334b also forms an edge (a beveled edge) with the major lower surface of the leg 310b.

With continued reference to FIGS. 7-12 and 20-29, and with particular reference to FIGS. 24 and 25, the lens 400 includes two generally opposing optical surfaces 402, 404 on the front side and the back side of the lens 400, respectively. The lens 400 is deployed with the surface 402 in facing relation to the surface 304 of the lens 300. The surfaces 402, 404, together with a pair of side surfaces 406, 408, generally define the lensing portion of the lens 400 that applies optical power to incoming light. In this non-limiting example implementation, the lens 400 is concave-convex (i.e., the surface 402 is concave, and the surface 404 is convex), and the surface profiles of the surfaces 402 and 404 are aspheric and spheric, respectively. As mentioned, in the present example the lens 400 operates together with the lens 300 to act like an achromatic doublet that reduces the effects of chromatic aberration. Preferably, the surfaces 304, 402, while not being identical inverted versions of each other, are generally correspondingly configured such that the surface 304 generally fits within the concavity created by the surface 402.

The lens 400 has a pair of legs 410a, 410b (or "branches") that extend outward from opposing peripheral portions of the lens 400. In the non-limiting orientation of the optical assembly 160 shown in the drawings, the legs 410a, 410b extend from the respective upper and lower peripheral portions of the lens 400 (and therefore may be referred to within this context as "upper leg" 410a and "lower leg" 410b). The legs 410a, 410b are generally flap-type structures, having major curved surfaces 412a, 412b, that extend tangentially outward from the top and bottom peripheral portions of the lens 400. The curved surfaces 412a, 412b have an arcuate profile (i.e., have an arc shape) in at least one dimension, in particular in the dimension spanning between the surfaces 406, 408. The side surfaces 406, 408 generally flare outward from the center of the lens 400 along the horizontal axis in the orientation of FIGS. 24 and 25, such that the surfaces 412a, 412b form isosceles trapezoid shapes in the top (and bottom) view of the lens 400, as illustrated in FIGS. 13 and 14.

The leg 410a generally extends in two opposing directions (one toward the lens 300 and the other toward the lens 500) and terminates at two terminating regions 414a, 428a. Similarly, the leg 410b generally extends in two opposing directions (one toward the lens 300 and the other toward the lens 500) and terminates at two terminating regions 414b, 428b. In the present non-limiting example configuration of the image projector 100, the legs 410a, 410b extend further in the direction toward the lens 500 than in the direction toward the lens 300. The terminating regions 414a, 414b are formed on the respective upper and lower portions of the front side of the lens 400, and the terminating regions 428a, 428b are formed on the respective upper and lower portions of the back side of the lens 400.

Parts of the terminating regions 414a, 414b form respective upper and lower first engagement configurations 436a, 436b of the lens 400 that are configured to engage with corresponding engagement configurations 338a, 338b of the lens 300. The terminating regions 414a, 414b include corresponding beveled grooves 416a, 416b. The beveled groove 416a is formed from a pair of surfaces 418a, 420a, and the beveled groove 416b is formed from a pair of surfaces 418b, 420b. The surfaces 418a, 418b are preferably coplanar surfaces, and are formed on the front side of the lens 400. The beveled grooves 416a, 416b have an arcuate profile (i.e., have an arc shape) in at least one dimension, in particular in the dimension spanning between the surfaces 406, 408. It follows that the surfaces 418a, 420a and 418b, 420b (that respectively form the beveled grooves 416a and 416b) also have arcuate profiles in the same dimension as the arcuate profiles of the beveled grooves 416a, 416b.

The beveled grooves 416a, 416b (and the surfaces 418a, 420a, 418b, 420b from which they are formed) form the first engagement configurations 436a, 436b of the lens 400, and are configured to engage with corresponding engagement configurations 338a, 338b of the lens 300. In particular, the arcuate profile of the beveled groove 416a matches the arcuate profile of the beveled edge 326a, and the beveled edge 326a is configured to fit in the beveled groove 416a, such that portions of the surfaces 330a and 334a contact portions of the surfaces 418a and 420a, respectively. Likewise, the arcuate profile of the beveled groove 416b matches the arcuate profile of the beveled edge 326b, and the beveled edge 326b is configured to fit in the beveled groove 416b, such that portions of the surfaces 330b and 334b contact portions of the surfaces 418b and 420b, respectively.

It is noted that in this non-limiting example configuration, each of the terminating regions 414a, 414b includes two pairs of edges, designated 422a, 424a and 422b, 424b. The edge 422a is formed from the intersection of the surfaces 426a, 406, and the edge 424a is formed from the intersection of the surfaces 426a, 408. The surface 426a is another surface of the terminating region 414a that forms an edge (beveled edge) with the surface 420a. Similarly, the edge 422b is formed from the intersection of the surfaces 426b, 406, the edge 424b is formed from the intersection of the surfaces 426b, 408. The surface 426b is another surface of the terminating region 414b that forms an edge (beveled edge) with the surface 420b. The surfaces 426a, 426b are preferably coplanar surfaces, and are formed on the front side of the lens 400.

The edges 422a, 424a are terminated at an upper end by the surface 412a to form respective terminating corner regions. Similarly, the edges 422b, 424b are terminated at a lower end by the surface 412b to form respective terminating corner regions. In certain embodiments, the edges 422a, 424a, 422b, 424b (and/or the terminating corner regions) can be used to restrict or limit rotation of the lens 400 (and the other lenses of the optical assembly 160) within the barrel 102.

Parts of the terminating regions 428a, 428b form respective upper and lower second engagement configurations 438a, 438b of the lens 400 that are configured to engage with corresponding engagement configurations of the lens 500. The terminating regions 428a, 428b include corresponding beveled edges 430a, 430b. The beveled edges 430a, 430b are formed from respective pairs of surfaces 432a, 434a and 432b, 434b. The surfaces 432a, 432b are preferably coplanar surfaces, and are formed on the back side of the lens 400. The beveled edges 430a, 430b (and the surfaces 432a, 434a, 432b, 434b from which they are formed) form the upper and lower second engagement configurations 438a, 438b of the lens 400, and are configured to engage with corresponding engagement configurations of the lens 500. The beveled edges 430a, 430b have an arcuate profile (i.e., have an arc shape) in at least one dimension, in particular in the dimension spanning between the surfaces 406, 408. It follows that the surfaces 432a, 434a and 432b, 434b (that respectively form the beveled edges 430a and 430b) also have arcuate profiles in the same dimension as the arcuate profiles of the beveled edges 430a, 430b.

Figure 27:
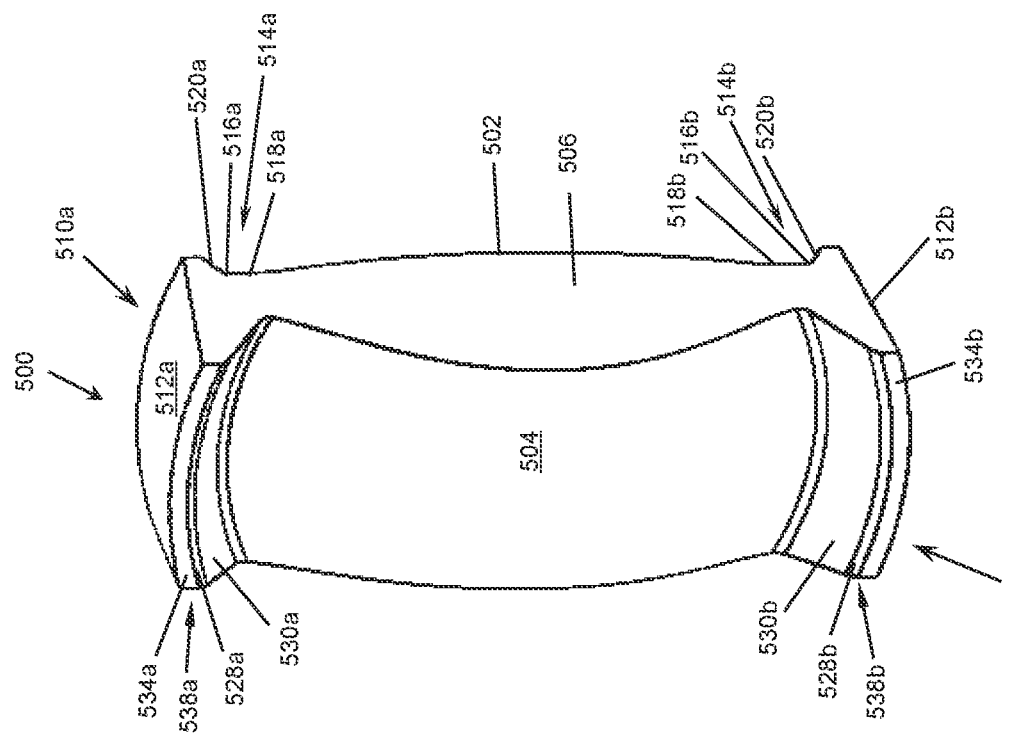
FIGS. 26 and 27 are isometric views illustrating a fourth lens of the optical assembly according to a non-limiting implementation of the image projector, taken from a front side and a back side of the fourth lens, respectively.
Figure 26:
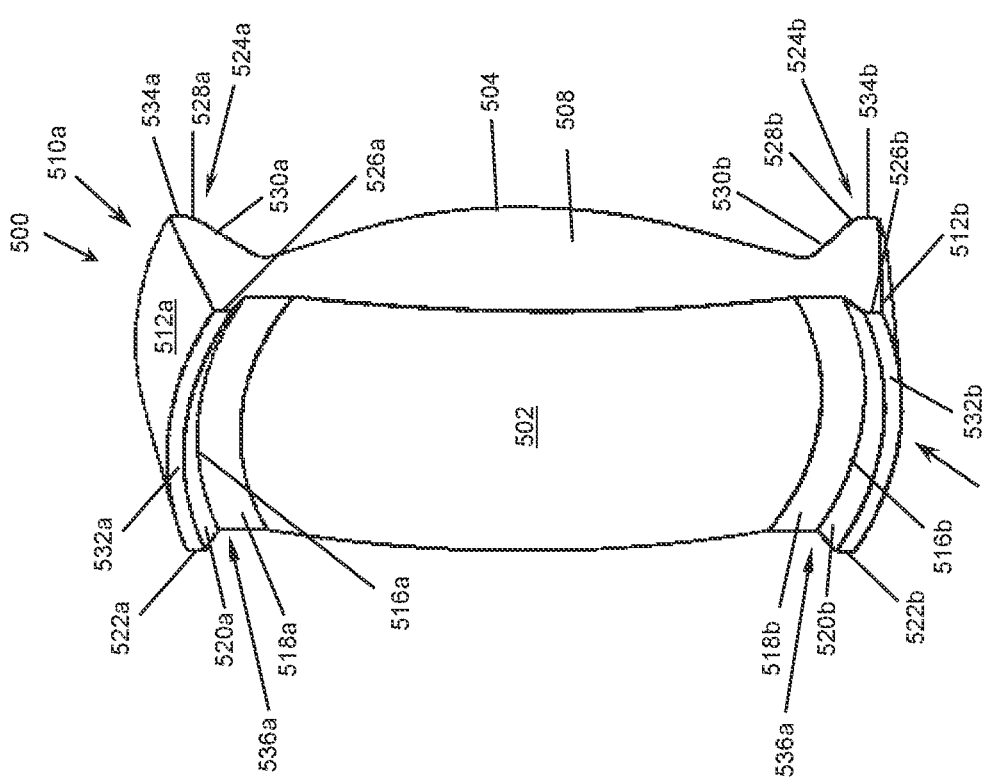

With continued reference to FIGS. 7-12 and 20-29, and with particular reference to FIGS. 26 and 27, the lens 500 includes two generally opposing optical surfaces 502, 504 on the front side and the back side of the lens 500, respectively. The lens 500 is deployed with the surface 502 in facing relation to the surface 404 of the lens 400. The surfaces 502, 504, together with a pair of side surfaces 506,

508, generally define the lensing portion of the lens 500 that applies optical power to incoming light. In this non-limiting example implementation, the lens 500 is biconvex and the surface profiles of the surfaces 502 and 504 are aspheric and spheric, respectively. The lens 200 is generally configured as a collimating lens, and performs the primary collimating function of the optical assembly 160 by collimating the image light produced by the microdisplay device 136.

The lens 500 has a pair of legs 510a, 510b (or "branches") which extend outward from opposing peripheral portions of the lens 500. In the non-limiting orientation of the optical assembly 160 shown in the drawings, the legs 510a, 510b extend from the respective upper and lower peripheral portions of the lens 500 (and therefore may be referred to within this context as "upper leg" 510a and "lower leg" 510b). The legs 510a, 510b are generally flap-type structures, having major curved surfaces 512a, 512b, that extend tangentially outward from the top and bottom peripheral portions of the lens 500. The curved surfaces 512a, 512b have an arcuate profile (i.e., have an arc shape) in at least one dimension, in particular in the dimension spanning between the surfaces 506, 508. The side surfaces 506, 508 generally flare outward from the center of the lens 500 along the horizontal axis in the orientation of FIGS. 26 and 27, such that the surfaces 512a, 512b form isosceles trapezoid shapes in the top (and bottom) view of the lens 500, as illustrated in FIGS. 13 and 14.

The leg 510a generally extends in two opposing directions (one toward the lens 400 and the other toward the base 600) and terminates at two terminating regions 514a, 524a. Similarly, the leg 510b generally extends in two opposing directions (one toward the lens 400 and the other toward the base 600) and terminates at two terminating regions 514b, 524b. In the present non-limiting example configuration of the image projector 100, the legs 510a, 510b extend further in the direction toward the base 600 than in the direction toward the lens 400. The terminating regions 514a, 514b are formed on the respective upper and lower portions of the front side of the lens 500, and the terminating regions 524a, 524b are formed on the respective upper and lower portions of the back side of the lens 500.

Parts of the terminating regions 514a, 514b form respective upper and lower first engagement configurations 536a, 536b of the lens 500 that are configured to engage with corresponding engagement configurations 438a, 438b of the lens 400. The terminating regions 514a, 514b include corresponding beveled grooves 516a, 516b. The beveled groove 516a is formed from a pair of surfaces 518a, 520a, and the beveled groove 516b is formed from a pair of surfaces 518b, 520b. The surfaces 518a, 518b are preferably coplanar surfaces, and are formed on the front side of the lens 500. The beveled grooves 516a, 516b have an arcuate profile (i.e., have an arc shape) in at least one dimension, in particular in the dimension spanning between the surfaces 506, 508. It follows that the surfaces 518a, 520a and 518b, 520b (that respectively form the beveled grooves 516a and 516b) also have arcuate profiles in the same dimension as the arcuate profiles of the beveled grooves 516a, 516b.

The beveled grooves 516a, 516b (and the surfaces 518a, 520a, 518b, 520b from which they are formed) form the first engagement configurations 536a, 536b of the lens 500, and are configured to engage with corresponding engagement configurations 438a, 438b of the lens 400. In particular, the arcuate profile of the beveled groove 516a matches the arcuate profile of the beveled edge 430a, and the beveled edge 430a is configured to fit in the beveled groove 516a, such that portions of the surfaces 432a and 434a contact portions of the surfaces 518a and 520a, respectively. Likewise, the arcuate profile of the beveled groove 516b matches the arcuate profile of the beveled edge 430b, and the beveled edge 430b is configured to fit in the beveled groove 516b, such that portions of the surfaces 432b and 432b contact portions of the surfaces 518b and 520b, respectively.

It is noted that in this non-limiting example configuration, each of the terminating regions 514a, 514b includes two pairs of edges, designated 522a, 526a and 522b, 526b. The edge 522a is formed from the intersection of the surfaces 532a, 506, and the edge 526a is formed from the intersection of the surfaces 532a, 508. The surface 532a is a generally planar surface formed on the front side of the lens 500 and having an arcuate profile that shares edges with both the surfaces 520a and 512a. Similarly, the edge 522b is formed from the intersection of the surfaces 532b, 506, and the edge 526b is formed from the intersection of the surfaces 532b, 508. The surface 532b is a generally planar surface (coplanar with the surface 532a) formed on the front side of the lens 500 and having an arcuate profile that shares edges with both the surfaces 520b and 512b.

The edges 522a, 526a are terminated at an upper end by the surface 512a to form respective terminating corner regions. Similarly, the edges 522b, 526b are terminated at a lower end by the surface 512b to form terminating corner regions. In certain embodiments, the edges 522a, 526a, 522b, 526b (and/or the terminating corner regions) can be used to restrict or limit rotation of the lens 500 (and the other lenses of the optical assembly 160) within the barrel 102.

Parts of the terminating regions 524a, 524b form respective upper and lower second engagement configurations 538a, 538b of the lens 500 that are configured to engage with corresponding engagement configurations of the base 600. The terminating regions 524a, 524b include corresponding beveled edges 528a, 528b. The beveled edges 528a, 528b are formed from respective pairs of surfaces 530a, 534a and 530b, 534b. The surfaces 534a, 534b are preferably coplanar, and are formed on the back side of the lens 500. The beveled edges 528a, 528b (and the surfaces 530a, 534a, 530b, 534b from which they are formed) form second engagement configurations of the lens 500, and are configured to engage with corresponding engagement configurations of the base 600. The beveled edges 528a, 528b have an arcuate profile (i.e., have an arc shape) in at least one dimension, in particular in the dimension spanning between the surfaces 506, 508. It follows that the surfaces 530a, 534a and 530b, 534b (that respectively form the beveled edges 528a and 528b) also have arcuate profiles in the same dimension as the arcuate profiles of the beveled edges 528a, 528b.

As can be seen in FIGS. 5, 6, 9, 10 and 13-15, the optical components 200, 300, 400, 500, 600 are arranged front to back in the stack configuration, meaning that the front side or back side of a given optical component is in facing relation with the back side or front side of the adjacent optical component in the stack. In addition, the lenses 200, 300, 400, 500 are arranged in a nested configuration. FIGS. 13 and 14 show a particular feature of the nested configuration, in which the surfaces 206, 306, 406, 506 and the surfaces 208, 308, 408, 508 lay in two sets of parallel planes (i.e., the surfaces 206, 306, 406, 506 are parallel to each other, and the surfaces 208, 308, 408, 508 are parallel to each other and oblique to the planes of the surfaces 206, 306, 406, 506). FIGS. 5, 6, 9, 10 and 15 show another particular feature of the nested configuration, in which the legs of the lenses 200, 300, 400, 500 generally increasingly expand outward when moving from the narrow end 106 to the wide end 104 of the barrel 102 (i.e., the legs 510a, 510b of the lens 500 expand wider than the legs 410a, 410b of the lens 400, which expand wider than the legs 310a, 310b of the lens 300, which expand wider than the legs 214a, 214b of the lens 200). As a byproduct, portions of the relevant terminating regions of the lens 200 fit inside portions of the relevant terminating regions of the lens 300, portions of the relevant terminating regions of the lens 300 fit inside portions of the relevant terminating regions of the lens 400, and portions of the relevant terminating regions of the lens 400 fit inside portions of the relevant terminating regions of the lens 500. This gradual increase in the degree of outward expansion of the legs of the lenses, and the fitting between the portions of the terminating regions, promotes an overall contour at the major surfaces 216a, 216b, 312a, 312b, 412a, 412b, 512a, 512b of the lenses of optical assembly 160, that generally corresponds to the contour of the interior portion of the barrel 102 (i.e., the regions 130a, 130b, 132a, 132b).

In certain preferred embodiments, each of the lenses 200, 300, 400, 500 is symmetric about the central optical axis of the optical assembly 160. In FIG. 13, the optical axis is the vertical axis that is centered on the lenses 200, 300, 400, 500 (i.e., the axis that is normal to the surfaces 212a, 212b, 328a, 328b, 426a, 426b, 532a, 532b and that passes through the center of each of the lenses 200, 300, 400, 500). Looking at the cross-section of the image projector 100 taken in the plane parallel to the optical axis (illustrated in FIG. 16), the lenses 200, 300, 400, 500 are planar truncated lenses with two-fold symmetry about the optical axis. Looking at the cross-section of the image projector 100 taken in the plane normal to the optical axis (illustrated in FIG. 15), it can be seen that the lenses 200, 300, 400, 500 do not have such symmetry about the axis orthogonal to the optical axis. In fact, and as described above, the pairs of optical surfaces for each of the lenses 200, 300, 400, 500 are non-identical (and in most cases have different surface profiles), which precludes having such symmetry. The variation in the geometries of the optical surfaces of the lenses lends to an aspect ratio for each lens that is significantly different from unity. Within the context of this document, the aspect ratio of a lens is generally defined as the ratio of the lens width to the lens length, where the length is measured as roughly the distance between the legs of the lens, and where the width is measured as roughly the distance between the pair of side surfaces of the lens. A particularly suitable range of aspect ratios that have been found to provide good image uniformity at the image projector 100 output is 0.3-0.5, 0.1-0.3, 0.3-0.5, 0.1-0.35 for the lenses 200, 300, 400, 500, respectively.

Figure 29:
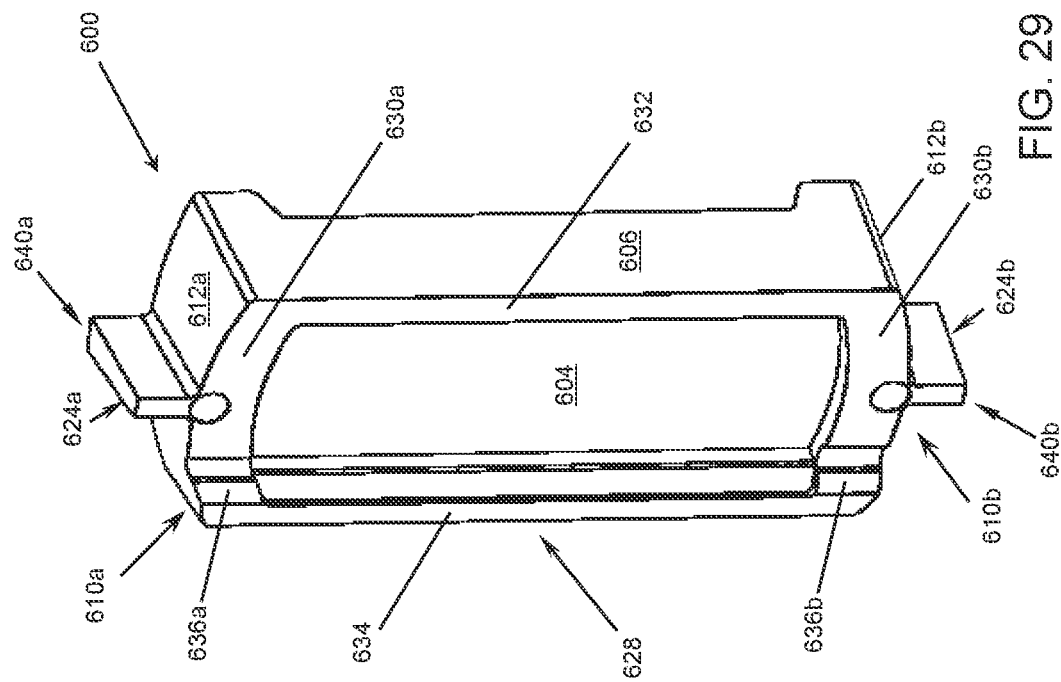
FIGS. 28 and 29 are isometric views illustrating a base optical component of the optical assembly according to a non-limiting implementation of the image projector, taken from a front side and a back side of the base optical component, respectively.
Figure 28:
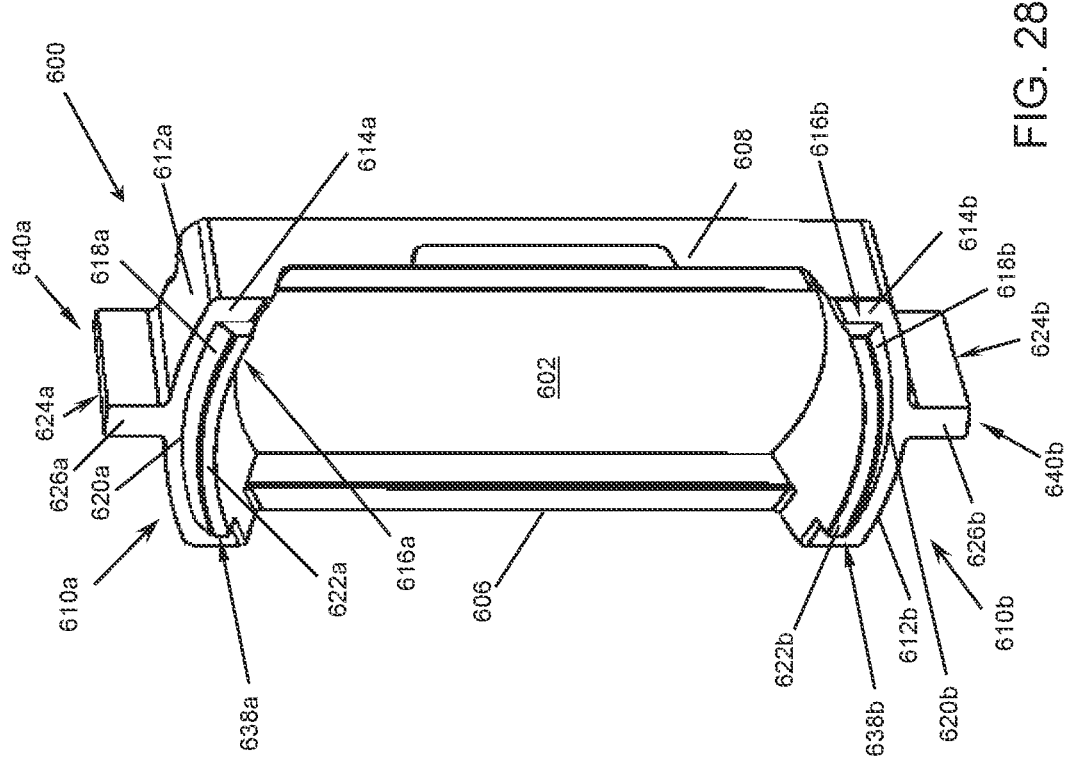
Figure 31:
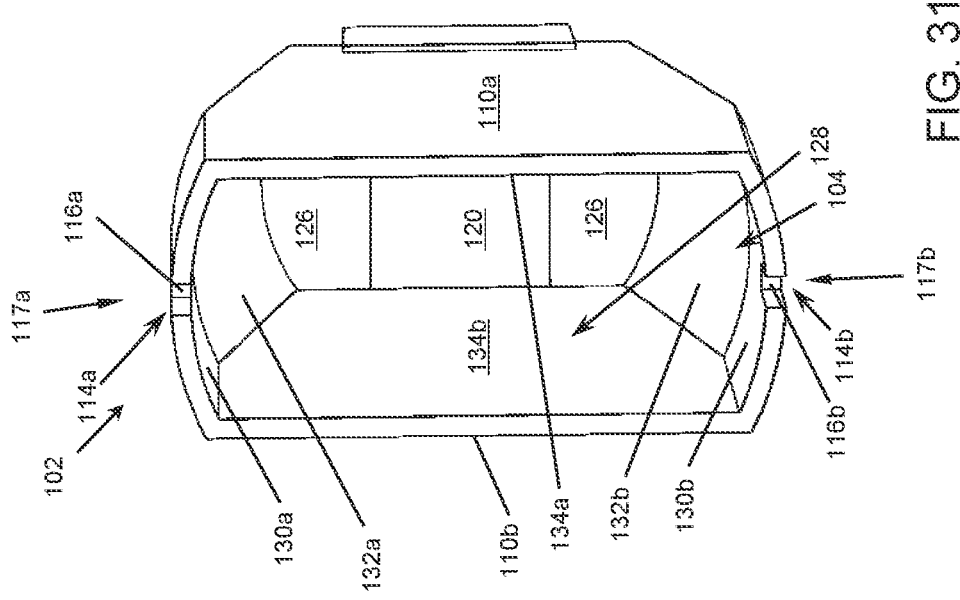
FIGS. 30 and 31 are isometric views illustrating the hollow mechanical body for retaining the optical assembly according to a non-limiting implementation of the image projector, taken from in front of and behind the hollow mechanical body, respectively.
Figure 30:
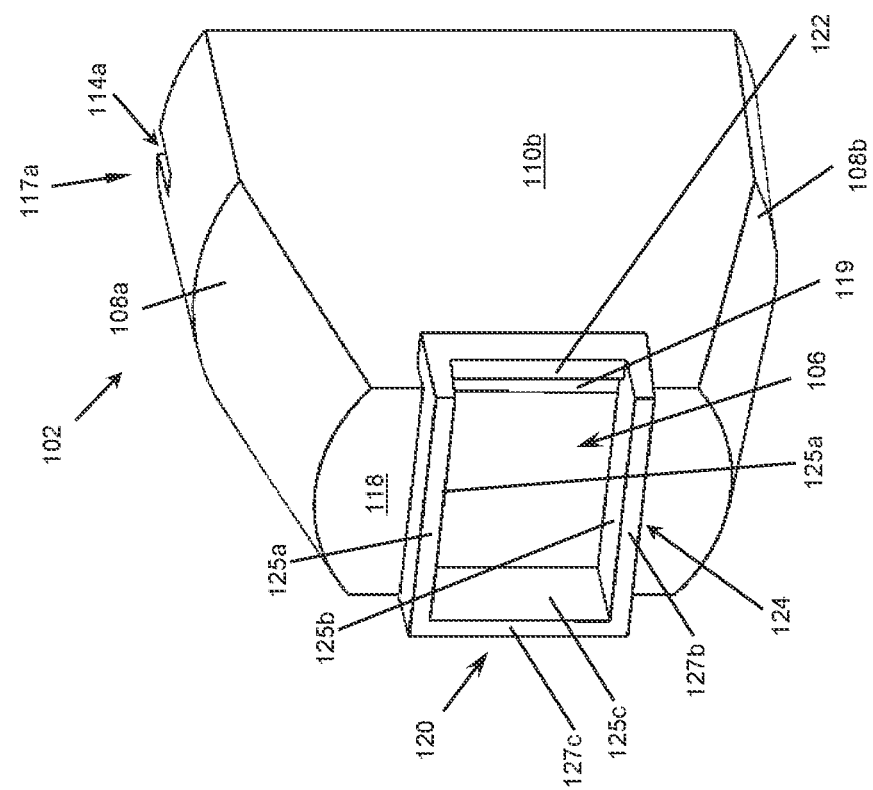
Figure 32:
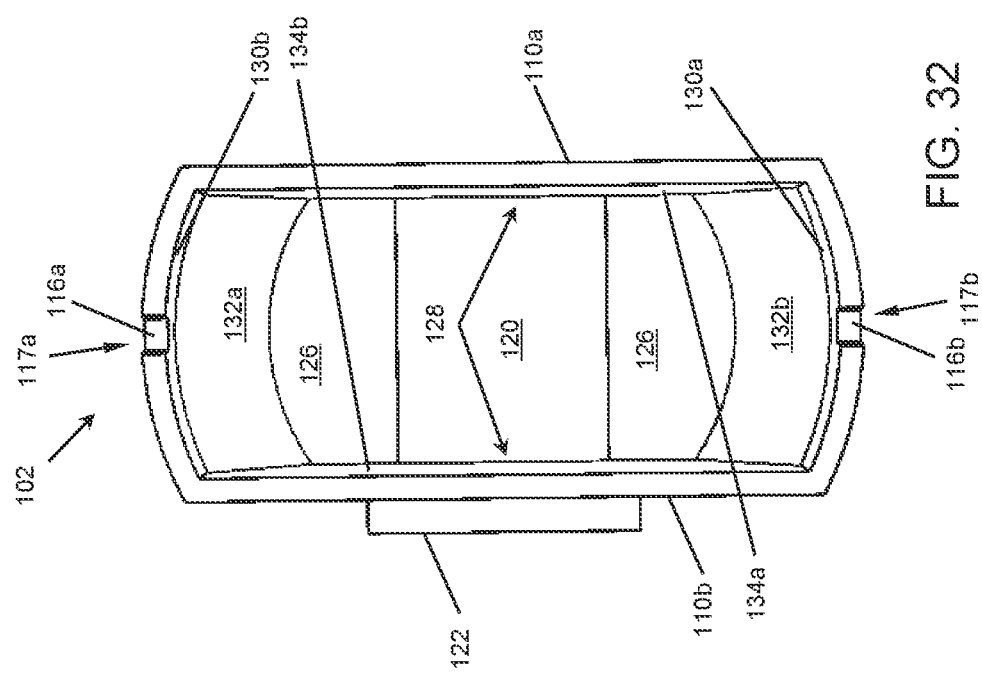
FIG. 32 is a plan view corresponding to FIG. 31, taken from a wide end of the hollow mechanical body.

With continued reference to FIGS. 7-12 and 20-29, and with particular reference to FIGS. 28 and 29, the base 600 includes two planar optical surfaces 602, 604 on the front side and the back side of the base 600, respectively. The base 600 is deployed with the surface 602 in facing relation to the surface 504 of the lens 500, and with the surface 604 in facing relation with one of the major surfaces 52b of the LOE 50. The surface 602 is preferably at an oblique angle relative to the surface 210 (of the lens 200) and the surface 126 (of the barrel 102).

The base 600 performs optical functions for compensating or counteracting chromatic aberration introduced by the LOE 50 and the optical coupling-in configuration 42 (when, for example, implemented as a reflective-type optical coupling-in configuration), in accordance with another aspect of the present invention, as well as mechanical functions for maintaining the lenses of the optical 160 within the barrel 102.

The optical functions according to this aspect of the present invention will be discussed here briefly, and will be discussed in more detail in subsequent sections of the present disclosure. By way of introduction, chromatic aberration is an effect of an optical element, such as a prism, to fail to direct all colors of light to the same point. The refractive index of the optical element varies with respect to the wavelength of light, such that when white light impinges on the optical element, the individual color component wavelengths of the white light are dispersed, spatially separating the component colors.

Figure 16:
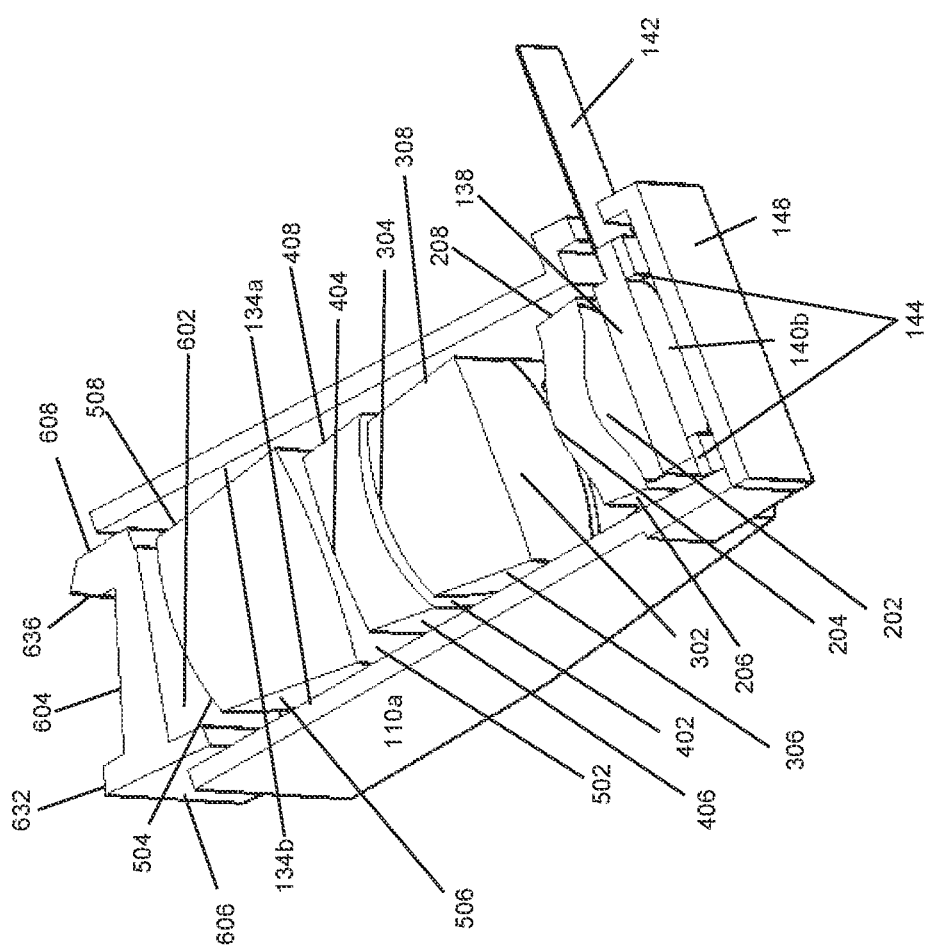

When deploying an LOE and the optical coupling-in configuration (for example as part of a NED or HMD device) the LOE and the optical coupling-in configuration may be positioned at an oblique angle relative to the eye of the viewer. This can partly be seen in FIG. 1, in which the surfaces 17c and 15 (of the coupling prism 16 and LOE 10) are obliquely angled relative to the EMB 28. Although not explicitly clear from FIG. 1, the major external surface 12b may also be positioned oblique to the EMB 28 (a phenomena colloquially referred to as "face curve"). In such scenarios, the LOE and the optical coupling-in configuration exhibit prismatic properties, which may cause chromatic aberration, whereby the image (that is coupled out of the LOE by the optical coupling-out configuration, e.g., the partially reflecting surfaces) is distorted due to the non-symmetric coupling-in and coupling-out angles of the FOV. In addition, the light waves emanating from the image projector that are coupled into the LOE and that are coupled out toward the eye are chromatically aberrated. In order to counteract chromatic aberration, the base 600 is designed as a prism (or wedge) in a cross-sectional plane. This is illustrated in FIGS. 16 and 19, where it can be seen that the surface 604 is oblique to the surface 602. In this configuration, the surface 604 is deployed parallel to the major surface 52b of the LOE 50, and the oblique angle of the surface 604 (relative to the surface 602) defines (in part) the overall angle at which the image projector 100 is deployed relative to the LOE 50. This image projector deployment angle (labeled as Oproj in FIG. 17) is measured as the angle between the central optical axis of the lenses of the optical assembly 160 (which is the vertical axis in FIG. 17, and is generally along the normal to the plane of the microdisplay device 136) and the plane of the major external surface 52b. Details of the optical functions of the base 600 for counteracting chromatic aberration will be described in further detail below. It is generally noted that the aforementioned oblique angles associated with the surfaces 602, 604 are designed relative to the LOE 50.

Continuing now with the description of the structure of the base 600, a pair of planar side surfaces (sidewalls) 606, 608 bound and extend between the surfaces 602, 604. The side surface 606 is generally wider (or broader) than the side surface 608 due to the inclination of the surface 604 relative to the surface 602. For this reason, the surfaces 606 and 608 may be referred to interchangeably as a broad surface and a narrow surface, respectively.

The base 600 generally includes upper and lower peripheral portions 610a, 610b that sit at opposing ends of the base 600. Curved surfaces 612a, 612b form the outer surfaces of the peripheral portions 610a, 610b. These curved surfaces 612a, 612b are referred to as "upper curved surface" 612a and "lower curved surface" 612b. The curvature of the curved surfaces 612a, 612b generally corresponds to the curvature of the regions 130a, 130b of the barrel 102. Planar surfaces 614a, 614b (preferably coplanar surfaces) are formed on the front side of the peripheral portions 610a, 610b.

A pair of protrusions 616a, 616b extend outward from the surfaces 614a, 614b (in the direction toward the lens 500 when the optical assembly 160 is assembled). The protrusions 616a, 616b are interchangeably referred to as "upper protrusion" 616a and "lower protrusion" 616b. Portions of the protrusions 616a, 616b, together with the surfaces 614a, 614b, form respective upper and lower 638a, 638b first engagement configurations of the base 600 that are configured to engage with corresponding engagement configurations 538a, 538b of the lens 500.

The protrusions 616a and 616b are formed by the pairs of surfaces 618a, 622a and 618b, 622b, respectively. A pair of beveled grooves 620a and 620b are formed from the pair of surfaces 614a, 618a and 614b, 618b, respectively. The beveled grooves 620a, 620b have an arcuate profile (i.e., have an arc shape) in at least one dimension, in particular in the dimension spanning between the surfaces 606, 608. It follows that the surfaces 614a, 618a and 614b, 618b (that respectively form the beveled grooves 620a and 620b) also have arcuate profiles in the same dimension as the arcuate profiles of the beveled grooves 620a, 620b.

The beveled grooves 620a, 620b (and the surfaces 614a, 618a, 614b, 618b from which they are formed) form the upper and lower first engagement configurations 638a, 638b of the base 600, and are configured to engage with corresponding engagement configurations 538a, 538b of the lens 500. In particular, the arcuate profile of the beveled groove 620a matches the arcuate profile of the beveled edge 528a, and the beveled edge 528a is configured to fit in the beveled groove 620a, such that portions of the surfaces 530a and 534a contact portions of the surfaces 618a and 614a, respectively. Likewise, the arcuate profile of the beveled groove 620b matches the arcuate profile of the beveled edge 528b, and the beveled edge 528b is configured to fit in the beveled groove 620b, such that portions of the surfaces 530b and 534b contact portions of the surfaces 618b and 614b, respectively.

A flange 624a projects upwardly from a center region of the curved surface 612a. The flange 616a is configured to slideably engage with a channel 114a in the upper part of a receiving portion 112 of the wide end 104 of the barrel 102. In the drawings, the channel 114a is illustrated as a slit or slot in the upper portion of the end 104 that extends inwardly by a particular amount, and that is terminated by a sidewall 116a in the external surface 108a. The flange 624a and the channel 114a are correspondingly configured so as to promote an interlocking engagement between the flange 624a and the channel 114a.

Similarly, a flange 624b projects downwardly from a center region of the curved surface 612b. The flange 624b is configured to slideably engage with a channel 114b in the lower part of the receiving portion 112 of the wide end 104 of the barrel 102. In the drawings, the channel 114b is illustrated as a slit or slot in the lower portion of the end 104 that extends inwardly by a particular amount, and that is terminated by a sidewall 116b in the external surface 108b. The flange 624b and the channel 114b are correspondingly configured so as to promote an interlocking engagement between the flange 624b and the channel 114b. The flanges 624a, 624b form part of respective upper and lower second engagement configurations 640a, 640b of the base 600, and the channels 114a, 114b form part of a set of engagement configurations 117a, 117b of the barrel 102.

The flanges 624a, 624b include respective front (preferably coplanar) surfaces 626a, 626b formed on the front side of the base 600, that form respective contiguous surfaces with the planar surfaces 614a, 614b. The base 600 is configured to engage with the barrel 102 at the receiving portion 112 such that the flanges 624a, 624b slideably engage the corresponding channels 114a, 114b, which form part of engagement configurations 117a, 117b of the barrel 102. When the base 600 is engaged with the receiving portion 112, the surfaces the flanges 624a, 624b are inserted into the channels 114a, 114b such that portions of the surfaces 626a, 626b contact the respective sidewalls 116a, 116b (which restrict further movement of the base 600 into the interior portion of the barrel 102). In addition, portions of the curved surfaces 612a, 612b are brought into proximity (i.e., into near contact, or in some cases into contact) with portions of the respective regions 130a, 130b of the inner sidewall configuration 128.

It is noted that the flanges 624a, 624b and the channels 114a, 114b are correspondingly dimensioned so as to promote the corresponding configuration between the flanges 624a, 624b and the channels 114a, 114b, which that enables the interlocking slideable engagement between the flanges 624a, 624b and the channels 114a, 114b. The corresponding configuration between the flanges 624a, 624b and the channels 114a, 114b, while not necessarily a fixed interlocking engagement, is such that when the flanges 624a, 624b are received by the channels 114a, 114b, the base 600 is maintained in the receiving portion 112. A fixed engagement is preferably achieved by applying adhesive between portions of the base 600 and portions of the receiving portion 112, as will be discussed below. In certain non-limiting implementations, the flanges 624a, 624b and the channels 114a, 114b are correspondingly dimensioned such that a snap-type engagement is created, promoting a more secure interlocking engagement between the base 600 and the receiving portion 112.

The base 600 additionally includes a coupling configuration 628 formed on a back side of the base 600, in the form of a sidewall configuration that projects outward from the periphery of the surface 604 so as to bound the surface 604 on all sides. The coupling configuration 628 is configured for operatively coupling the image projector 100 to the LOE 50 and/or the optical coupling-in configuration 42, so as to form a unitary optical system 40. In certain non-limiting implementations in which the LOE 50 is associated with a reflective-type of optical coupling-in configuration 42, portions of the coupling configuration 628 are optically coupled to LOE 50 at the major external surface 52b, at part of an "optical coupling-in region" of the LOE 50. In some of such implementations, portions of the coupling configuration 628 are also optically coupled to the optical coupling-in configuration, as illustrated for example in FIGS. 17 and 18.

In the particular non-limiting implementation illustrated in the drawings, the coupling configuration 628 includes an upper portion 630a that has a surface that joins the curved surface 612a, and a lower portion 630b that has a surface that joins the curved surface 612b. The upper and lower portions 630a, 630b are optically coupled to the optical coupling region of the LOE 50. The coupling configuration 628 further includes a side portion 632 that extends between the portions 630a, 630b (whereby the portions 630a, 630b, 632 form a contiguous surface). The side portion 632 joins the side surface 606. In the present non-limiting implementation, the coupling configuration 628 also includes an elongated portion 634 generally opposite from the side portion 632, that extends along between the upper and lower portions 630a, 630b along the periphery of the base 600. The side portion 632 includes a pair of coupling configurations 636a, 636b positioned at or near the upper and lower ends of the elongated portion 634. These coupling configurations 636a, 636b are configured to optically couple the base 600 to the optical coupling-in configuration in certain particularly preferred implementations, for example, implementations in which the optical coupling-in configuration is implemented as a transparent plate of a prescribed thickness (as will be described with reference to FIGS. 33 and 34) deployed on the edge 56 of the LOE 50. In such a non-limiting implementation, the coupling configurations 636a, 636b are configured to optically couple the base 600 to an edge of the transparent plate. The aforementioned optical couplings are enabled, in certain preferred but non-limiting implementations, by mechanical attachment of the coupling configuration 628 to the LOE 50 and the coupling-in configuration.

It is noted that in implementation in which a wedge-base optical coupling-in configuration is used, the coupling configuration 628 includes surfaces that are configured to mechanically couple the base 600 to an external surface of the wedge so as to provide an optical coupling between the base 600 and the wedge.

The optical couplings between the coupling configuration 628 and the LOE and/or the optical coupling-in configuration may be implemented in various ways. One non-limiting example of an optical coupling is a direct coupling using adhesive techniques (i.e., optical cement). Another non-limiting example is a mechanical coupling, in which the image projector 100 is mechanically positioned so as to place the portions 630a, 630b, 632, 634 at the requisite positions relative to the LOE and/or the optical coupling-in configuration via a mechanical module or mechanical assembly.

The following paragraphs describe the process for assembling the image projector 100 according to embodiments of the present disclosure, which is a sub-process in the process of constructing (i.e., manufacturing) the image projector 100. The assembly process includes a sequence of steps, many of which can be performed in an order different than the particular order described herein.

The optical components of the optical assembly 160 are arranged in a stack configuration, whereby engagement configurations of each optical component engage with engagement configurations of adjacent optical component in the stack, all as described above. In general, the engagement configurations 226a, 226b of the lens 200 and the first engagement configurations 336a, 336b of the lens 300 engage with each other. The second engagement configurations 338a, 338b of the lens 300 and the first engagement configurations 436a, 436b of the lens 400 engage with each other. The second engagement configurations 438a, 438b of the lens 400 and the first engagement configurations 536a, 536b of the lens 500 engage with each other. The second engagement configurations 538a, 538b of the lens 500 and the first engagement configurations 638a, 638b of the base 600 engage with each other.

In certain non-limiting construction methods, the stack configuration may first be formed outside of the barrel 102. The stack may then be inserted into the hollow opening of the barrel 102, via the receiving portion 112 at the wide end 104 of the barrel 102. The portions 212a, 212b of the surface 210 come into contact with the sidewall (surface) 126 of the barrel 102, which restricts further movement of the stack into the interior portion of the barrel 102. Simultaneously, the second engagement configurations 640a, 640b of the base 600 engage with the engagement configurations 117a, 117b at the receiving portion 112 (i.e., the flanges 616a, 616b slideably engage with the channels 114a, 114b), so as to maintain the portion of the stack within the barrel 102.

In a preferable non-limiting construction method, the optical components are stacked one by one in the interior portion of the barrel 102. For example, the lens 200 may first be inserted into the barrel 102 (such that the surface portions 212a, 212b come into contact with the sidewall (surface) 126). The lens 300 may be then be inserted into the barrel 102 such that the engagement configurations 226a, 226b of the lens 200 and the first engagement configurations 336a, 336b of the lens 300 engage with each other. The lens 400 may be then be inserted into the barrel 102 such that the second engagement configurations 338a, 338b of the lens 300 and the first engagement configurations 436a, 436b of the lens 400 engage with each other. The lens 500 may be then be inserted into the barrel 102 such that the second engagement configurations 438a, 438b of the lens 400 and the first engagement configurations 536a, 536b of the lens 500 engage with each other. The base 600 may be then be engaged with the receiving portion 112 of the barrel 102 such that the second engagement configurations 538a, 538b of the lens 500 and the first engagement configurations 638a, 638b of the base 600 engage with each other, and such that the second engagement configurations 640a, 640b of the base 600 and the engagement configurations 117a, 117b at the receiving portion 112 engage with each other, so as to maintain the portion of the stack within the barrel 102. When the base 600 is engaged with the barrel 102 (i.e., when the engagement configurations 640a, 640b, 117a, 117b engage with each other), portions of the surfaces 606, 608 (near the front side of the base 600) are positioned within the barrel 102 (as can be seen in FIGS. 3 and 4). The surface 602 is also fully maintained within the housing defined by the barrel 102 and the exterior portions of the base 600.

The mechanical interlocking engagement between the adjacent optical components (via the cooperation between the correspondingly configured engagement configurations of the adjacent optical components), and the interlocking engagement of the base 600 with the receiving portion 112, enables deployment of the lenses of the optical assembly 160 such that the lenses are accurately coaxially positioned (i.e., centered and coaxially aligned with respect to each other), and further enables deployment such that the lenses are maintained within the barrel 102 without the use of any adhesives (e.g., optical cement) between the lenses. In addition, the engagement of the flanges 624a, 624b and the channels 114a, 114b generally limits the rotation of the base 600 about the optical axis of the optical assembly 160. Since the optical components of the optical assembly 160 are interlocked (by the aforementioned engagements configurations), the coaxial rotation of the optical components of the entire optical assembly 160 is limited by the engagement of the base 600 with receiving portion 112. The coaxial rotation of the optical components of the entire optical assembly 160 can be further limited by cooperation between one or more portions of the lenses and the regions 132a, 132b of the inner sidewall configuration 128 (which form rotation limiting configurations of the inner sidewall configuration 128).

In certain preferred but non-limiting implementations, one or more of the edges 131, 133, 322a, 332a, 322b, 332b, 422a, 424a, 422b, 424b, 522a, 526a, 522b, 526b (alone or in combination with one or more of their respective terminating corner regions) form rotation limiting configurations of the lenses 200, 300, 400, 500. These rotation limiting configurations cooperate with rotation limiting configurations formed from corresponding portions of the regions 132a, 132b of the inner sidewall configuration 128 to restrict movement of the one or more of the edges 131, 133, 322a, 332a, 322b, 332b, 422a, 424a, 422b, 424b, 522a, 526a,

522b, 526b (and/or corner regions), and thereby restrict the rotation of the corresponding lens 200, 300, 400, 500 and the entire optical assembly 160. As a result, the amount of rotation of the lenses of the optical assembly 160 about three major axes (the optical axis, as well as the two axes normal to the optical axis) is limited to a small degree of acceptable rotation (i.e., within an acceptable tolerance) by the rotation limiting configurations.

In certain embodiments, in order to more securely retain (and in some cases, fixedly retain) the relevant portion of the stack (i.e., the lenses 200, 300, 400, 500) within the barrel 102, the base 600 is attached to the end 104 using an adhesive (e.g., optical cement). For example, a layer of adhesive may be applied to the portions of the flanges 624a, 624b that engage with the channels 114a, 114b. Additional layers of adhesive may be applied at various portions of the surfaces 606, 608 which may contact portions of the regions 130a, 130b. The amount of adhesive is preferably minimal, so as to prevent leakage of excess adhesive into the interior portion of the barrel 102, thereby preventing the adhesive from entering the optical path of the optical assembly 160 and adversely affecting the trajectories of light rays propagating through the optical assembly 160.

After the optical assembly 160 is securely retained inside the barrel 102 (via cementing the base 600 to the wide end 104 of the barrel 102), the microdisplay device 136 may be deployed in the receiving portion 120 at the narrow end 106 of the barrel 102. Preferably, part of the procedure for deployment of the microdisplay device 136 includes aligning (actively aligning) the microdisplay device 136 with the optical assembly 160. The alignment may be performed using any well-known alignment techniques and procedures, which typically utilize optical test bench equipment, such as autocollimator devices, image capture devices, and the like. These alignment techniques and procedures are used in order to ensure that the quality of the image, generated by the microdisplay device 136, that propagates through the optical assembly 160 (and through the LOE 50) is of sufficient quality in accordance with one or more image quality metrics and optical system design specifications. The alignment may include, for example, rotation (about one or more rotational axis), lateral positioning, front-back positioning or any other adjustment of the microdisplay device 136 within the receiving portion 120 while analyzing output images (at the image projector 100 output and/or the LOE 50 output) captured by an image capture device (e.g., camera).

The microdisplay device 136 is deployed with the image-emitting surface 140a of the emissive-display 138 in the receiving portion 120 such that a portion (e.g., an edge portion) of the image-emitting surface 140a contacts (or nearly contacts) a portion of a planar surface 119 that is coplanar with, or forms part of, the surface 118. The planar surface 119 forms an edge on one side with the inner sidewall 134b, and is bounded on the side opposite the edge by a projecting sidewall 122 (i.e., protruding rim or ridge) that projects outward from the surface 119 to form a step with the surface 119. The surface 119 is bounded on its remaining sides by a projecting sidewall configuration 124. In preferred embodiments, the deployment of the microdisplay device 136 is effectuated by adhesively attaching a mounting adapter element 144 (hexagonally shaped with a rectangular aperture) to the surface 140b opposing the image-emitting surface 140a. A layer (or layers) of adhesive may be applied to peripheral portions of the mounting adapter 144 so as to adhesively attach the mounting adapter 144 (with the emissive-display 138) to the receiving portion 120. The mounting adapter 144 may preferably be attached to the walls of the projecting sidewall configuration 124. In the illustrated embodiment, the projecting sidewall configuration 124 is implemented as a three-sided structure that projects outward from the surface 118, and includes two parallel sidewalls 125a, 125b and a third sidewall 125c that is perpendicular to the two sidewalls 125a, 125b, and that extends between the two parallel sidewalls 125a, 125b at end portions of the parallel sidewalls 125a, 125b. The sidewall 125c may form part of the inner sidewall 134a. The two parallel sidewalls 125a, 125b of the projecting sidewall configuration 124 also bound the projecting sidewall 122, which extends between the two parallel sidewalls at end portions opposite from the third sidewall 125c of the projecting sidewall configuration 124. It is also noted that the projecting sidewall configuration 124 projects further out than the projecting sidewall 122. The mounting adapter 144 may be adhesively attached to the sidewalls 125a, 125b, 125c. The sidewalls 125a, 125b, 125c terminate at respective coplanar surfaces 127a, 127b, 127c.

Preferably, a cover member 146 (implemented, for example, as a substantially rectangular plate) is attached to the projecting sidewall configuration 124 after the emissive-display 138 is attached to the receiving portion 120 of the barrel 102. In the illustrated embodiment, the cover member 146 includes a main (rectangular) body 148 and a flange 150 that projects from one of the sides of the main body 148 in a direction normal to the main body 148. The flange 150 extends only partially across the length of the side of the main body 148 from which the flange 148 projects. In addition, the cover member 146 and the projecting sidewall configuration 124 are correspondingly configured, meaning that geometric shapes formed by the projections of the main body 148 and the projecting sidewall configuration 124 in the two-dimensional plane are identical (or nearly identical, within a small margin). When the cover member 146 is attached to the barrel 102, the main body 148 is seated on the three surfaces 127a, 127b, 127c of the projecting sidewall configuration 124, and the flange 150 extends inward through the gap formed between the two parallel sidewalls 125a, 125c of the projecting sidewall configuration 124 and is aligned with the projecting sidewall 122. A gap (or opening) is formed between the terminating surface of the flange 150 and the projecting sidewall 122, that is of sufficient dimension to allow the electronic interfacing element 142 (connected at one end to the emissive-display 138) to pass through the gap and out of the receiving portion 120 so as to connect (at another end thereof) to one or more electronic elements (e.g., power supply, display driver electronics, computerized storage, computerized processor, etc.).

The attachment of the base 600 and the cover 146 to the opposing ends 104, 106 of the barrel 102 provide respective sealing engagements which seal the emissive-display 138 and the optical elements of the optical assembly 160 within the barrel 102, thereby preventing environmental debris and/or contaminants from entering into the hollow interior portion of the barrel 102 and contacting elements of the optical assembly 160. The result is a modular and lightweight image projector 100, which can be attached (i.e., optically coupled) to the remaining components of the optical system 40 (i.e., the LOE 50 and/or the optical coupling-in configuration 42) as described above.

According to a particularly preferred but non-limiting implementation, several of the components of the image projector 100 are constructed from plastic material in order to provide a lightweight optical image projector 100. In a preferred implementation, the barrel 102 and the optical components of the optical assembly 160 are constructed from plastic material (each component may be constructed from the same plastic material, or different plastic materials may be used to construct the different components). In another non-limiting implementation, one or more of the optical components of the optical assembly 160 is constructed from glass. In one non-limiting example, all of the components of the optical assembly 160 are constructed from glass. In preferred but non-limiting implementations, optical components of the optical assembly 160 (and in particular the lenses of the optical assembly 160) are constructed from a material (or materials) that have a similar coefficient of thermal expansion so as to reduce the thermal stress of the optical assembly 160, thereby reducing (and preferably altogether preventing) the chances of fracturing or deformation of the components of the image projector 100.

As part of the process for constructing the image projector 100 according to embodiments of the present invention, a plurality of molds corresponding to the barrel 102 and the optical components of the optical assembly 160 are preferably obtained. Obtaining the molds may include producing (i.e., creating) the molds. The molds define the shape of the barrel 102 and the optical components, where each shape also includes the relevant engagement configurations and portions thereof (e.g., legs, protrusions, terminating regions, beveled grooves, beveled edges, surfaces, etc.). The components (i.e., barrel 102 and optical components of the optical assembly 160) are then manufactured, for example in plastic, glass or polymer material, using the respective molds, by casting or injecting the plastic, glass or polymer material into the molds. The injected or casted molds are allowed to set, and the barrel 102 and optical components are then removed (ejected) from the molds. The optical components can then be deployed (i.e., stacked) in the barrel 102, as described above.

Although the non-limiting embodiments of the engagement configurations described thus far have pertained to particular mechanical structures, such as beveled grooves, beveled edges, and surfaces, these structures are only exemplary. Other structures can be used, including non-beveled edges and grooves (although the bevels may reduce stress at the edges/grooves, preventing cracking/breaking of the optical components at the edges/grooves). Moreover, although the engagement configurations in the described non-limiting embodiments have pertained to specific numbers of the correspondingly configured beveled edges and grooves, additional edges and grooves (beveled or non-beveled) may also be included to form part of one or more of the engagement configurations of the optical components.

In addition, although the non-limiting embodiments described have pertained to an image projector having an optical assembly consisting of four lenses, as previously mentioned other embodiments are possible in which fewer than four lenses or more than four lenses are deployed. In general, the size of the barrel, and in particular the hollow interior portion of the barrel should be designed to accommodate all of the lenses of the optical assembly. For example, when deploying an optical assembly utilizing five lenses, the barrel should be larger in size than the barrel 102 illustrated in the drawings.

Furthermore, although the embodiments described thus far have pertained to particular surface profiles of the lenses (e.g., aspheric, spheric), other surface profiles and combinations of surface profiles may be considered. In certain cases, the material from which the lenses are manufactured may contribute (at least in part) to the type of surface profile of the lenses that should be used. For example, when constructing the lenses from glass materials, the surface profiles of the surfaces 202, 204, 302, 304, 402, 404, 502, 504 may be chosen to be spheric surfaces.

The following paragraphs describe the propagation of light from the microdisplay device 136 through each of the optical components of the optical assembly 160. Referring to FIGS. 16-19, it is noted that the presence of the base 600 allows the central optical axis of the lenses of the image projector 100 (extending from the center of the microdisplay device 136 through the center of each lens of the optical assembly 160) to be positioned at an oblique angle relative to the major surfaces of the LOE 50 (due at least in part to the oblique positioning of the surface 604 relative to the surface 602). In the configuration illustrated in FIGS. 16-19 (as well as many other configurations of the present invention), illumination from the image projector 100 is coupled into the LOE 50 at relative shallow angles (high angle of incidence) and emerges from the LOE 50 (i.e., is coupled out of the LOE 50) close to perpendicular to the surface 52*b*. Such a configuration inherently tends to generate chromatic aberration. The cross-sectional prism shape of the base 600 at least partially compensates for the chromatic aberration effects, by modifying the image illumination prior to the image illumination reaching the optical coupling-in configuration.

With particular reference to FIG. 19, there is shown a schematic representation of the traversal of light from the microdisplay device 136 through the optical assembly. Light waves emitted by the microdisplay device 136, represented schematically by the three sets of light rays 80A, 82A, 84A, 86A, 88A, 90A corresponding to light emitted from three different regions of the microdisplay device 136, are transmitted (and refracted) by the surfaces 202, 204 of the lens 200, thereafter which they impinge on the lens pair 300, 400 and are transmitted (refracted) by the surfaces 302, 304, 402, 404 of the lenses 300, 400, and after which they impinge on the collimating lens 500 and are transmitted (refracted) by the surfaces 502, 504 of the lens 500 to form three sets of parallel rays 80B, 82B, 84B, 86B, 88B, 90B (i.e., rays 80B, 82B are parallel, rays 84B, 86B are parallel, and rays 88C, 90C are parallel). As a result, light rays emanating from the same region (corresponding to like colors) of the microdisplay device 136 are generally parallel to each other (due to the collimation by the lens 500). However, parallel light rays of one set may not necessarily be parallel to light rays of other sets (i.e., light rays 80B, 82B are not necessarily parallel to light rays 84B, 86B).

The collimated light waves (represented schematically by the three sets of parallel light rays 80B, 82B, 84B, 86B, 88B, 90B) impinge on the base 600 (formed as a wedge/prism in the horizontal cross-sectional plane). The collimated light waves are refracted twice by the base 600 (once by each of the surfaces 602, 604), and exit the image projector 100 (i.e., are transmitted out of the base 600 through the surface 604) as image light waves (represented schematically by the three sets of parallel light rays 80C, 82C, 84C, 86C, 88C, 90C, i.e., the rays 80C, 82C are parallel, the rays 84C, 86C are parallel, and the rays 88C, 90C are parallel).

The image light waves that are output by the image projector 100 impinge on the optical coupling-in configuration 42 (implemented in FIGS. 17 and 18 as a reflective-type optical coupling-in configuration). As a result of the prism shape of the base 600 (i.e., the oblique angle between the surfaces 602, 604) the different wavelengths of image light (from the microdisplay device 136) that traverse through the surfaces 602, 604 of the base 600 are separated (i.e., dispersed) such that the base 600 at least partially compensates for the chromatic aberration introduced by the coupling-in (to the LOE 50) and coupling-out (from the LOE 50).

Turning now to another aspect of the present invention, various implementations of an optical coupling-in configuration that reduce the presence of ghost images (and stray light rays) will now be discussed with particular reference to FIGS. 33-36. By way of introduction, ghost images may occur when light rays corresponding to parts of the image are coupled out of the LOE at unwanted angles. When the optical coupling-in configuration 42 is implemented as a reflective surface (e.g., a mirror) deployed at the slant edge 56 of the LOE 50 (as illustrated in FIG. 2), multiple reflections of light rays (emanating from the image projector 100) at the reflective surface (i.e., at the slant edge 56) may result in the coupling out of image light rays from the LOE 50 at such unwanted angles.

Figure 33:
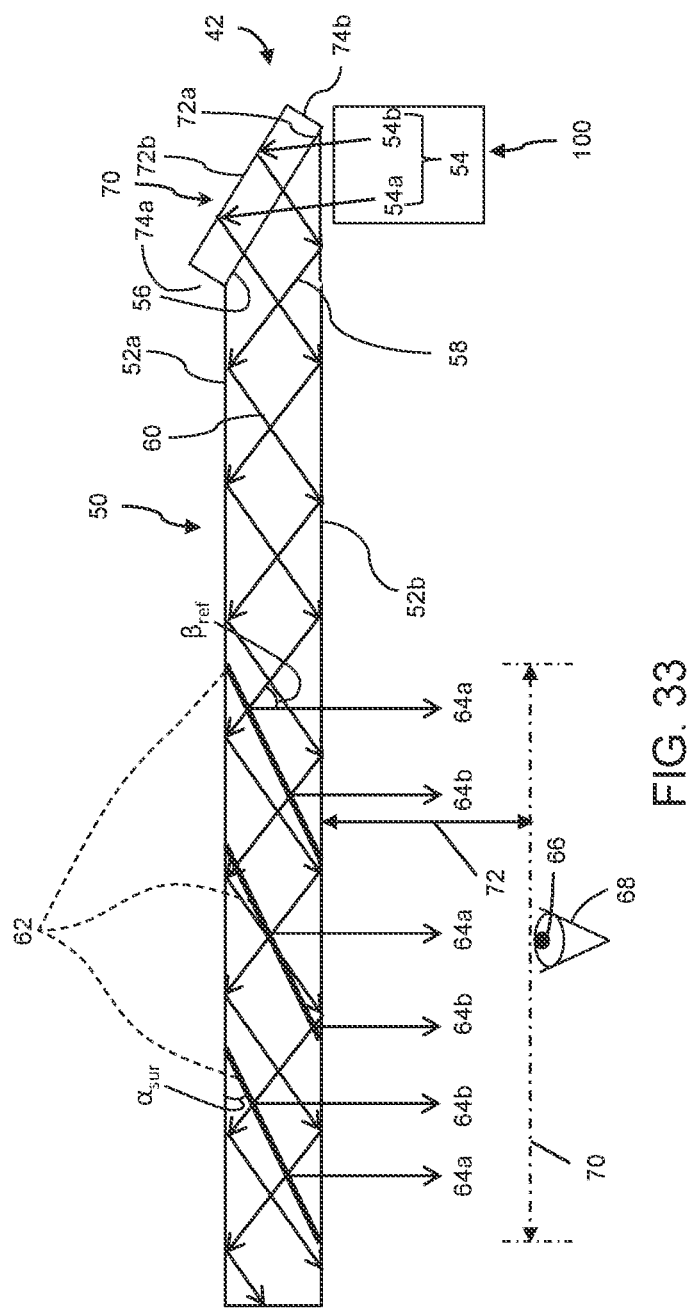
FIG. 33 is a schematic side view of an optical system having an image projector that generates image light that is coupled into a light-guide optical element by an optical coupling-in configuration, implemented as a plate having a reflective surface, for reducing ghost images, according to an embodiment of the present invention.

Referring first to FIG. 33, there is shown an optical coupling-in configuration 42 that reduces ghost images and stray light rays according to an embodiment of the present invention. The optical coupling-in configuration 42 includes a plate 70 formed from transparent material (i.e., the plate 70 is a light-transmitting substrate) and having parallel external surfaces (faces) 72a, 72b as well as external surfaces (also referred to as "edges") 74a, 74b. In the non-limiting implementation illustrated in the drawings, the surfaces/edges 74a, 74b are also parallel, such that the two pairs of parallel external surfaces 72a, 72b, 74a, 74b form a rectangular cross-section. It is noted, however, that the surfaces 74a, 74b need not be parallel. For example, the length of the surface 72b may be less than the length of the surface 72a, such that the surfaces 74a, 74b are non-parallel. The plate 70 is deployed with surface 72a at the slant edge 56 such that surface 72a overlies and is coincident with the slant edge 56. In certain preferred but non-limiting embodiments, the coupling configurations 636a, 636b are configured to optically couple (via adhesive or mechanical attachment) the base 600 to portions of the edge surface 74b. FIGS. 17 and 18 are top and bottom views, respectively, that illustrate the coupling configurations 636a, 636b in contact with respective portions of the surface 74b.

In certain embodiments, the plate 70 is optically coupled to the LOE 50 by adhesive attachment, for example, by applying a layer of optical cement between the surface 72a and the edge 56. In other embodiments, the optical coupling between the plate 70 and the LOE 50 is effectuated mechanically via a mechanical module or mechanical assembly that positions the plate 70 adjacent to the slant edge 56 (preferably without an air gap between the surface 72a and the slant edge 56). The plate 70 and the LOE 50 are preferably constructed from the same type of material so as to ensure that the plate 70 and the LOE 50 have same index of refraction. When using an adhesive to optically attach the plate 70 to the LOE 50, the adhesive is preferably an index-matching material.

The surface 72b is a reflective surface (e.g., a mirror), which may be formed from a surface of the plate 70 that is coated with one or more layers of coating. In certain embodiments, the coating is a reflective coating, such as a dielectric coating, or a metallic coating (in which the reflective surface 72b is implemented as a "silver mirror"), that reflects light waves emitted by the image projector 100. In other embodiments, the coating may be an angular selective coating, such that the surface 72b only reflects light from the image projector 100 that impinges on the surface 72b at a prescribed range of angles of incidence. In another embodiment, a simple mirror can be deployed at the surface 72b external to the plate 70.

In order to prevent stray light rays (that may be manifested as ghost images at the output of the LOE) from entering the LOE 50, a light absorber material is preferably deployed at the surface (edge) 74a of the plate 70. The light absorber material may be deployed at the other surface 74b as well, however, it is the deployment of the light absorber material at the surface 74a which has the most significant effect on prevention of stray light rays from entering the LOE 50. These stray light rays include light rays that, if not for the presence of the plate 70, would otherwise be reflected twice by the slant edge 56 and coupled into the LOE 50. However, in the presence of the plate 70, light rays that would have been reflected twice by the slant edge 56 are instead absorbed by the light absorber material. The light absorber material is configured to absorb the majority of the intensity of light in the optical spectrum of light that is emitted by the image projector 100 (i.e., the visible light spectrum). Light absorbing materials are well-known in the art and are readily commercially available.

Figure 34:
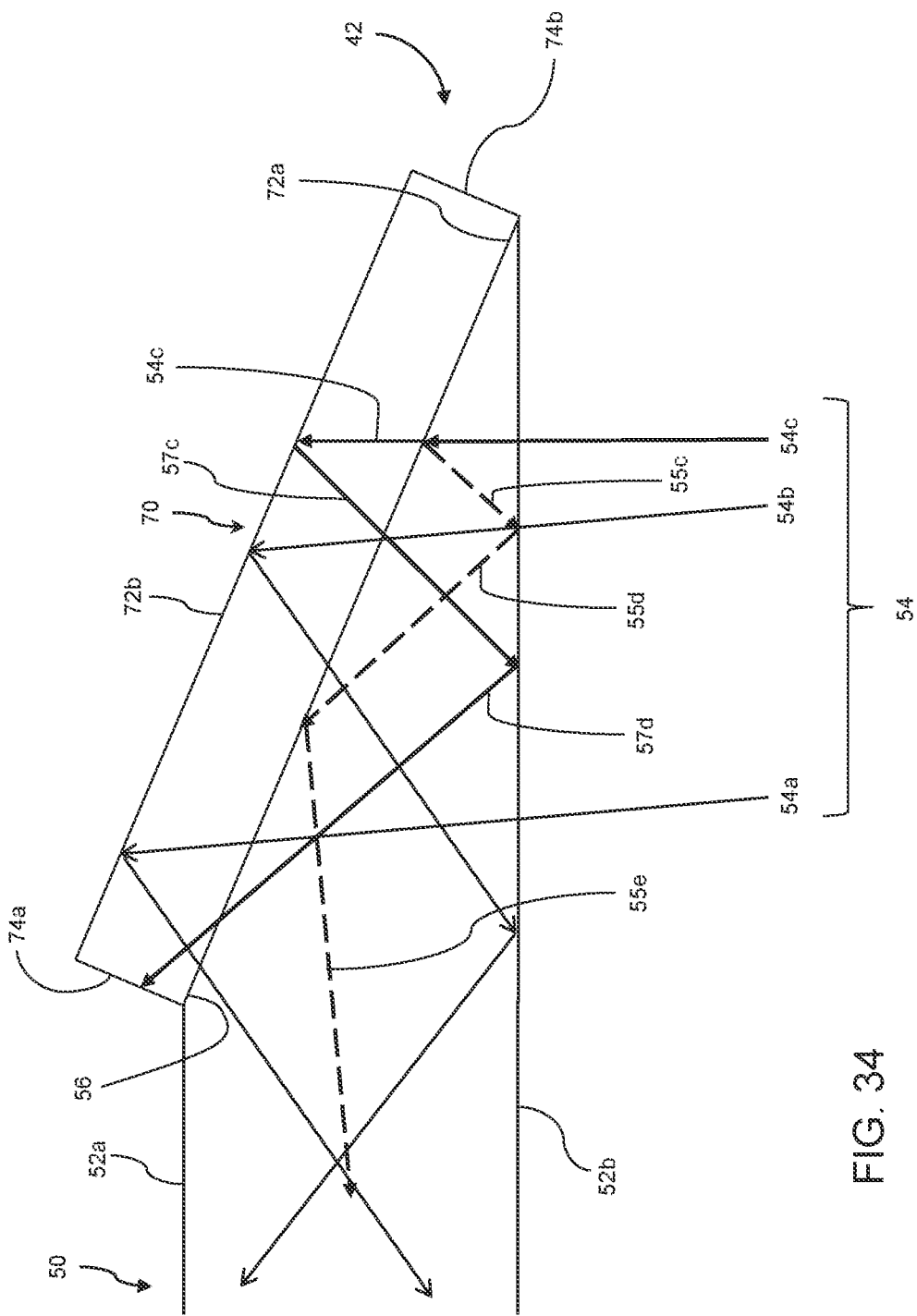
FIG. 34 is an enlarged view of a portion of FIG. 33, showing some image light rays being reflected from the reflective surface of the plate so as to be coupled into the light-guide optical element, and some image light rays being absorbed by an edge of the plate.

FIG. 34 shows an enlarged view of a portion of FIG. 33 to illustrate the effect of the plate 70 with the light absorber material on light rays injected (introduced) by the image projector 100. Sample light rays 54a and 54b (which are two of the light rays that span the beam 54) are reflected from the surface 72b and enter the LOE 50, as intended. Another sample light ray 54c (being another one of the light rays that spans the beam 54) is representative of unwanted light that would otherwise enter the LOE 50 in the absence of the plate 70. In the absence of the plate 70, the light ray 54c impinges on the slant edge 56 (similar to as in FIG. 2). The light ray 54c is reflected by the slant edge 56 (which acts as the optical coupling-in configuration, implemented as a reflective surface), generating reflected light ray 55c (represented by the dashed arrow). The reflected light ray 55c impinges on the surface 52b of the LOE 50, where the light ray 55c undergoes internal reflection from the surface 52b thereby generating reflected light ray 55d. The reflected light ray 55d is then reflected by the slant edge 56, generating reflected light ray 55e which is eventually coupled out as a ghost light ray toward the eye of the viewer 68 by the optical coupling-out configuration 62. Note that the light ray 55e may be coupled out of the LOE 50 before undergoing further internal reflections from the surfaces 52a, 52b, or may undergo one or more internal reflections from the surfaces 52a, 52b prior to being coupled out of the LOE 50 by the optical coupling-out configuration 62.

In the presence of the plate 70, however, the light ray 54c is transmitted by the slant edge 56 and the surface 72a, and impinges on the surface 72b. The light ray 54c is reflected by the surface 72b, generating reflected light ray 57c. The reflected light ray 57c is transmitted by the surfaces 72a, 56 and impinges on the surface 52b of the LOE 50, where the light ray 57c undergoes internal reflection from the surface 52b thereby generating reflected light ray 57d. The reflected light ray 57d is transmitted by the surfaces 56, 72a and impinges on the surface 74a which absorbs the light ray 57d (due to the light absorber material), thereby providing extinction of the potential ghost light ray. As a result of the presence of the plate 70 with the absorber material, the light ray 54c is not ultimately coupled into the LOE 50, and therefore is not coupled out of the LOE 50 (by the optical coupling-out configuration 62) toward the eye 68 of the viewer.

The thickness of the plate 70 (measured as the distance between the surfaces 74a, 74b) that is to be prescribed may be determined by performing analyses of the optical design and manufacturing process. For example, a preferable prescribed thickness may be calculated by performing a quantitative analysis on the number of ghost rays that occur based on the angle of the slant edge 56 and the incident angles of injected illumination 54. However, manufacturing considerations may or may not support the preferable thickness determined by the quantitative analysis. In certain non-limiting implementations, the prescribed thickness is a fraction of the thickness of the LOE 50, for example no more than half of the LOE thickness.

It is noted that in an alternative embodiment, a diffusive element (e.g., a light diffuser) can be deployed at the surface 74a instead of the light absorber material. The diffusive element scatters light that is incident to the surface 74a (e.g., light ray 57d), such that the scattered light exits out of the plate 70 via the surface 74a. Note, however, that some of the scattered light may be reflected back and enter the LOE 50.

Figure 35:
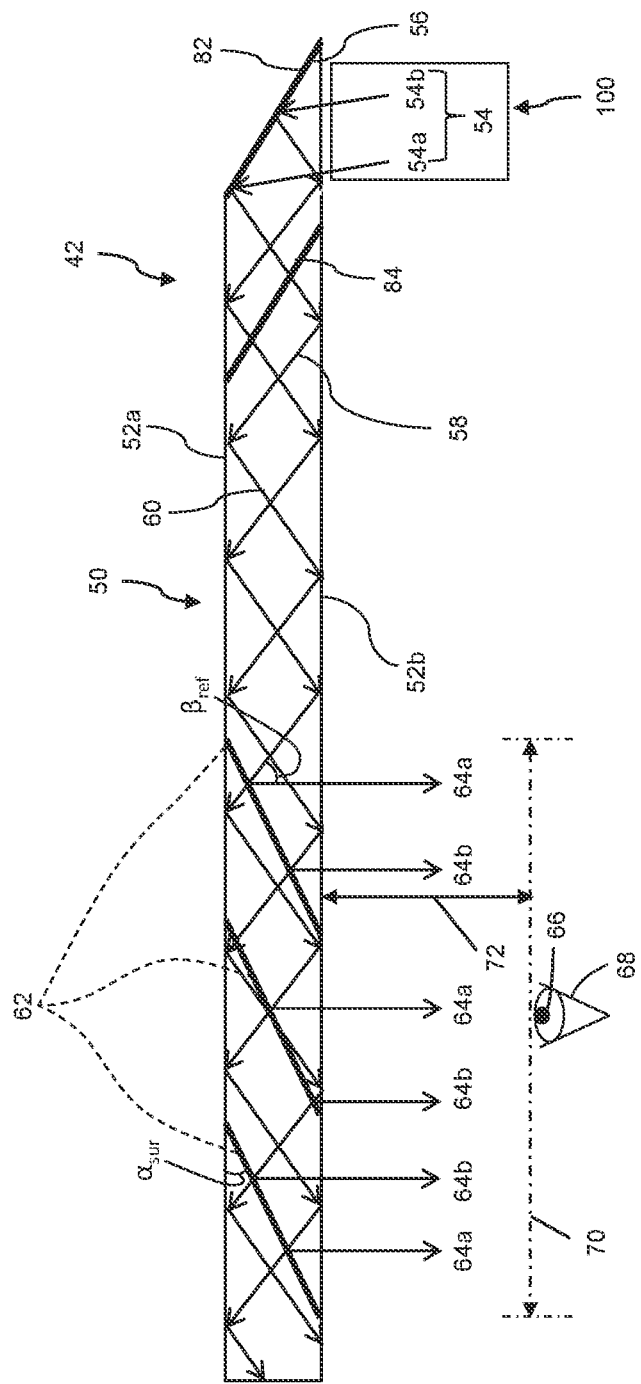
FIG. 35 is a schematic side view of an optical system having an image projector that generates image light that is coupled into a light-guide optical element by an optical coupling-in configuration, implemented as a reflective surface and partially reflective surface, for reducing ghost images, according to an embodiment of the present invention.

Referring now to FIG. 35, there is show an optical coupling-in configuration 42 for reducing ghost images and stray light rays according to another embodiment of the present invention. In this embodiment, the optical coupling-in configuration 42 includes a pair of preferably (but not necessarily) parallel surfaces 82, 84. The surface 82 is a reflective surface (e.g., a mirror), which in preferred embodiments is formed from a surface that is coated with one or more layer of metallic coating. In such embodiments, the surface 82 is preferably a silver mirror. The surface 84, deployed in the optical path between the surface 82 and the optical coupling-out configuration 62, is a selectively reflective (also selectively transmissive) surface, preferably an angular selective reflective surface. In preferred embodiments, the surface 84 is formed from a surface coated with one or more layer of dielectric coating. The dielectric coating is designed such that the surface 84 reflects light impinging on the surface 84 at shallow angles (large angles of incidence, measured relative to the normal to the surface 84), and transmits light impinging on the surface at steep angles (small angles of incidence, measured relative to the normal to the surface 84). As a result, light from the image projector 100 that is reflected from the surface 82, that impinges on the surface 84 at a range of shallow angles is reflected by the surface 82. Preferably, these reflected light rays impinge on the surface 52a of the LOE 50 at an angle less than the critical angle required to trap light between the surfaces 52a, 52b by total internal reflection, such that the reflected light rays exit the LOE 50 (and therefore do not propagate by internal reflection from the surfaces 52a, 52b, and therefore are not coupled out of the LOE 50 by the optical coupling-out configuration 62). Light from the image projector 100 that is reflected from the surface 82, and that impinges on the surface 84 at a range of steep angles is transmitted by the surface 82. These transmitted light rays enter the LOE 50 at a trajectory whereupon the angle of incidence at which they impinge upon the surfaces 52a, 52b is greater than the critical angle required to trap light between the surfaces 52a, 52b by total internal reflection. As a result, these light rays propagate through the LOE 50 by internal reflection and are ultimately coupled out of the LOE 50 by the optical coupling-out configuration 62.

In certain non-limiting implementations, the slant edge 56 of the LOE 50 may be coated with the coating so as to form the surface 82. In such an implementation, an additional surface, deployed in the LOE 50 downstream from the surface 82 and upstream from the optical coupling-out configuration 62 is coated with the dielectric coating to form the surface 84. In another non-limiting implementation, the slant edge 56 of the LOE 50 may be coated with the dielectric coating to form the surface 84. In such an implementation, a block of light-transmitting material (formed as a parallelogram and dimensioned with a thickness similar to the thickness of the LOE 50) may be optically attached (e.g., via optical cement or via a mechanical module) to the LOE 50 at the slant edge 56. The surface of the block of light-transmitting material that is parallel to the slant edge 56 may be coated with the metallic coating to form the surface 82. In another non-limiting implementation, a block of light-transmitting material (formed as a parallelogram and dimensioned with a thickness similar to the thickness of the LOE 50) may be provided with dielectric and metallic coatings on parallel surfaces so as to form the surfaces 82 and 84, respectively. The block of light-transmitting material may then be optically attached (e.g., via optical cement or via a mechanical module) to the LOE 50 such that the surface 82 is cemented to the slant edge 56 or positioned adjacent to the slant edge 56.

As mentioned above, the cross-sectional wedge/prism geometry of the base 600 enables the placement of the image projector 100 relative to the LOE 50 at an angle $\theta_{proj}$. The major components of the optical system (i.e., the optical coupling-in configuration 42, the LOE 50, and the image projector 100) are designed so as to have a deployment angle $\theta_{proj}$ such that light rays emitted by the image projector 100 impinge on the major external surface 52b at oblique angles (prior to reaching the optical coupling-in configuration 42 (for example as shown in FIGS. 33-36). When implementing the optical coupling-in configuration according to the embodiment described with reference to FIG. 35, the deployment angle $\theta_{proj}$ and the angle ($\alpha_{edge}$) of the slant edge 56 should be considered when designing the dielectric coating that is used to form the surface 84. For the non-limiting case of $\theta_{proj}=120°$ and $\alpha_{edge}=72°$, a range of angles of incidence (measured normal to the surface 84) at which the dielectric coating reflects light and transmits light, respectively, that has been found to be particularly effective for reducing ghost images is 51°-66° and 15°-30°.

Figure 36:
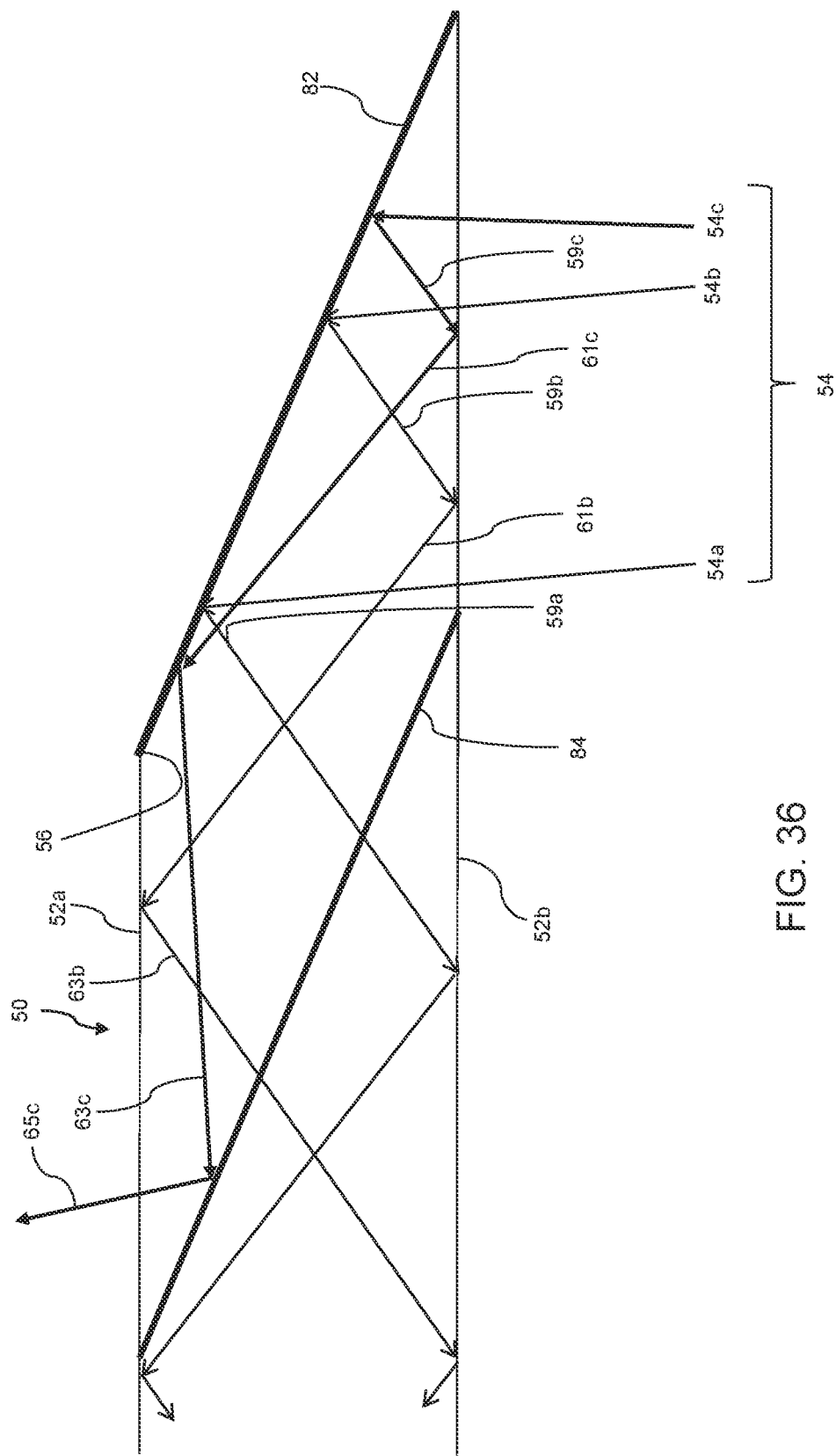
FIG. 36 is an enlarged view of a portion of FIG. 35, showing some image light rays being transmitted by the partially reflective surface so as to be coupled into the light-guide optical element, and some image light rays being reflected by the partially reflective surface so as to be coupled out of the light-guide optical element.

FIG. 36 shows an enlarged view of a portion of FIG. 35 to illustrate the effect of the surfaces 82, 84 on light rays injected (introduced) by the image projector 100. Sample light rays 54a and 54b (which are two of the light rays that span the beam 54) are reflected from the surface 82 as light rays 59a and 59b. The light ray 59b undergoes internal reflection at the surface 52b thereby generating reflected light ray 61b. The reflected light ray 61b undergoes internal reflection from the surface 52a thereby generating reflected light ray 63b. The light rays 59a and 63b are both incident to the surface 84 at angles of incidence that are within the transmission angular range (e.g., 15°-30° such that the light rays 59a and 63b are transmitted by the surface 84 and enter the LOE 50 as intended (where they continue propagating by internal reflection and are coupled out by the optical coupling-out configuration 62).

Another sample light ray 54c (being another one of the light rays that spans the beam 54) is representative of unwanted light that would otherwise enter the LOE 50 in the absence of the surface 84. The light ray 54c is reflected by the surface 82 as reflected light ray 59c. The light ray 59c undergoes internal reflection at the surface 52b thereby generating reflected light ray 61c. The reflected light ray 61c is reflected by the surface 82 thereby generating reflected light ray 63c. The reflected light ray 63c impinges on the surface 84 at an angle of incidence that is within the reflection angular range (e.g., 51°-66°) such that the light ray 63c is reflected by the surface 84 as reflected light ray 65c toward the major surface 52a of the LOE 50. The reflected light ray 65c impinges on the surface 52a at an angle that is less than the critical angle required for maintaining conditions for total internal reflection, and is therefore transmitted out of the LOE 50 via the surface 52a.

The techniques for combatting ghost images and stray light described thus far have relied on optical coupling-in configuration design approaches that prevent light, emitted by the image projector 100, from being coupled into the LOE 50 at unwanted angles. Other approaches are possible, which can be used in combination with, or instead of, the approaches described above, which rely on designing the components of the image projector 100 in a way which reduces the amount of light that is output by the image projector 100 at unwanted angles, which can manifest as ghost images at the LOE output. It has been found that unwanted reflections from the sidewalls of the optical components (in particular the lenses) of the optical assembly 160 and/or the inner sidewalls of the barrel 102 can contribute to the effects of outputting light from the image projector 100 at unwanted angles. Since the optical components (and the barrel) are manufactured using specially designed molds (as discussed above), the molds can be designed in a way that reduces or altogether prevents these unwanted reflections. One method of handling the unwanted reflections is to design the lens (200, 300, 400, 500) molds with a particularly located parting line at a preferred prescribed sidewall angle.

With particular reference to FIGS. 13, 14 and 16, it can be seen that the side surfaces 206, 208, 306, 308, 406, 408, 506, 508 are tapered inward to define side surface angles for the lenses 200, 300, 400, 500 of $\theta_{Lens200}$, $\theta_{Lens300}$, $\theta_{Lens400}$, $\theta_{Lens500}$, respectively. In this particular non-limiting example, the molds used to manufacture the lenses 200, 300, 400, 500 have a bottom parting line (in this context, "bottom" being closer to the optical surface of the lens that is farther from the base 600), with a side surface angle of approximately 8°. The sidewall angles $\theta_{Lens200}$, $\theta_{Lens300}$, $\theta_{Lens400}$, $\theta_{Lens500}$ are measured as the angle between the side surface (e.g., 206, 208, 306, 308, 406, 408, 506, 508) and a line parallel to the shared central optical axis of the lenses (which is the vertical axis in FIG. 13, and is along the normal to the plane of the microdisplay device 136). The bottom parting line and relatively small side surface angle enable the manufactured lenses to be extracted from the molds with general ease. In addition, it has been found that this particular parting line and sidewall angle configuration of the molds significantly reduces the number of reflections from the side surfaces 206, 208, 306, 308, 406, 408, 506, 508, as compared with alternative parting line and sidewall angle configurations.

One such alternative parting line and sidewall angle configuration of molds contemplated herein is a configuration having a center parting line, resulting in each lens having sidewall surfaces formed from a pair of segments. In this configuration, the side surface segments form a sidewall angle of approximately 2°. Although this alternative configuration has advantages in the ease with which the lenses can be removed from the molds (due to the center parting line and small sidewall angle), the lens side surface segments impart a considerable number of unwanted reflections which introduce an appreciable amount of stray light rays.

In certain instances, a proportion of the intensity of light that is incident to one (or more) lens of the optical assembly 160 may be transmitted out of the lens via the side surface of the lens (or the top or bottom portion of the lens) so as to exit the lens (and exit the optical assembly 160). Light that exits the side surface of a lens impinges on the inner sidewall 134a, 134b or region 130a, 132a, 130b, 132b that is proximate to the light-exiting side surface of the lens. The impinging light may be reflected by the inner sidewall 134a, 134b or region 130a, 132a, 130b, 132b back toward the lenses and re-enter the optical assembly 160 as stray light rays, causing distortion of the image that is to be injected into the LOE 50. In order to prevent unwanted reflections from the inner sidewalls 134a, 134b or regions 130a, 132a, 130b, 132b, the barrel 102 itself can also be designed with specialized inner sidewalls that reduce unwanted reflections from interior sidewall portions of the barrel 102.

In certain embodiments, one or more of the inner sidewalls 134a, 134b or regions 130a, 132a, 130b, 132b are coated with a light absorbing coating that prevents light from re-entering through the side surfaces of one or more of the lenses 200, 300, 400, 500. In addition to, or instead of the coating, one or more of the inner sidewalls 134a, 134b or regions 130a, 132a, 130b, 132b can be provided with a pattern, such as a corrugated pattern (e.g., a zig-zag type pattern), to prevent unwanted reflections. The pattern may be provided on the aforementioned sidewalls or regions of the barrel 102 by utilizing a specially designed mold, having the corresponding shape of the barrel 102 with the patterned sections, to manufacture the barrel 102. As a result of the patterned sidewalls and/or regions, light that exits out of the side surfaces of one or more of the lenses 200, 300, 400, 500 may impinge on a portion of the patterned surface/region at an angle so as to reflect the light at a reflected angle that prevents the reflected light from re-entering through the side surfaces of one or more of the lenses 200, 300, 400, 500. Preferably the zig-zag pattern at the sidewalls 134a, 134b corresponds to the general outline shape of the nested configuration of the lenses 200, 300, 400, 500 (described above with reference to FIG. 15), such that the zig-zag pattern generally follows the shape of the legs 310a, 310b, 410a, 410b, 510a, 510b. This prevents light from re-entering the lenses through the surfaces 312a, 312b, 412a, 412b, 512a, 512b.

It is noted that throughout the present disclosure wherever light is referred to as being trapped within the LOE by internal reflection, the internal reflection may be in the form of total internal reflection, whereby propagating image illumination that is incident at the major external surfaces 52a, 52b of the substrate (LOE) at angles greater than a critical angle causes reflection of the illumination at the major external surfaces 52a, 52b. Alternatively, the internal reflection may be effectuated by a reflective coating (e.g., an angularly selective reflective coating) applied to the major external surfaces 52a, 52b such that propagating image illumination that is incident to the major external surfaces within a given angular range defined by the coating is reflected at the major external surfaces 52a, 52b.

Although only the structure of the image projector, LOE, and optical coupling-in configuration is illustrated in most of the drawings, it will be understood that the optical system according to the embodiments of the present invention is intended for use as part of a display, typically a head-up display, which is preferably a near-eye display such as a head-mounted display or an eyeglasses-frame supported display (i.e., eye-glasses form factor). In particularly preferred embodiments, the optical system is implemented as part of an eyeglasses-frame supported display. In such implementations, the geometry of the lenses of the optical assembly enables the image projector 100 to be advantageously attached to the eyeglasses-frame so as to be mounted to a temple portion of the eyeglasses-frame, providing the user with a comfortable wearable head-mounted and compact optical device.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for constructing an optical system, comprising:
    obtaining a hollow mechanical body that includes a first end and a second end, the first end having a set of engagement configurations;
    molding a plurality of optical components using a corresponding plurality of molds that define a shape of the optical components, each shape including a set of engagement configurations;
    deploying the optical components in a stack configuration with at least a portion of the stack configuration within the hollow mechanical body, wherein for each pair of adjacent optical components in the stack configuration at least some of the engagement configurations of a first optical component in the pair engage with at least some of the engagement configurations of a second optical component in the pair, and wherein some of the engagement configurations of the optical component at a first end of the stack configuration engage with the engagement configurations at the first end of the hollow mechanical body so as to maintain the portion of the stack within the hollow mechanical body; and
    deploying an emissive display device at the second end f the hollow mechanical body.

2. The method of claim 1, wherein the molding includes casting or injecting a plastic material into the molds.

3. The method of claim 1, wherein obtaining the hollow mechanical body includes, obtaining a mold defining a shape the hollow mechanical body, and casting or injecting a material into the mold defining the shape the hollow mechanical body.

4. The method of claim 1, further comprising: applying adhesive between the optical component at the first end of the stack configuration and at least one portion of the first end.

5. The method of claim 1, wherein the hollow mechanical body is tapered from the first end to the second end.

6. The method of claim 1, wherein the second end of the hollow mechanical body includes a receiving portion for receiving the emissive display device, and an outwardly projecting sidewall configuration, the method further comprising: deploying a cover member at the outwardly projecting sidewall configuration of the second end of the hollow mechanical body.

7. The method of claim 6, wherein the optical component at the first end of the stack configuration and the cover member cooperate to seal the hollow mechanical body so as to substantially prevent environmental debris from contacting the optical components deployed within the hollow mechanical body.

8. The method of claim 1, further comprising: adhesively attaching a mounting adapter to the emissive display device; and adhesively attaching the mounting adapter to a portion of the second end of the hollow mechanical body.

9. The method of claim 8, further comprising: aligning the emissive display device with the optical components prior to adhesive attachment of the mounting adapter to the portion of the second end of the hollow mechanical body.

10. The method of claim 1, wherein the molds have parting lines that produce sidewall geometries of the respective optical components that reduce reflections of light, transmitted by the optical components, from interior portions of the hollow mechanical body.

11. The method of claim 1, wherein the hollow mechanical body further includes an inner sidewall configuration that is configured to reduce reflections of light, transmitted by the optical components, from interior portions of the hollow mechanical body.

\* \* \* \* \*